(12) United States Patent
Rucine et al.

(10) Patent No.: US 10,318,613 B2
(45) Date of Patent: Jun. 11, 2019

(54) SYSTEM AND METHOD OF DIGITAL NOTE TAKING

(71) Applicant: MyScript, Nantes (FR)

(72) Inventors: Nicolas Rucine, Nantes (FR); Nathalie Delbecque, Nantes (FR); Robin Mélinand, Nantes (FR); Arnoud Boekhoorn, Nantes (FR); Cédric Coulon, Nantes (FR); François Bourlieux, Nantes (FR); Thomas Penin, Nantes (FR); Aristote Laval, Nantes (FR); Olivier Patry, Nantes (FR); Thibault Lelore, Nantes (FR); Lionel Blestel, Nantes (FR); Maixent Nziengui Moubamba, Nantes (FR)

(*) Notice: Subject to any disclaimer, the term of this patent is extended or adjusted under 35 U.S.C. 154(b) by 98 days.

(21) Appl. No.: 15/215,716

(22) Filed: Jul. 21, 2016

(65) Prior Publication Data
US 2017/0060821 A1 Mar. 2, 2017

Related U.S. Application Data

(63) Continuation-in-part of application No. 14/886,195, filed on Oct. 19, 2015, now Pat. No. 9,965,175.

(30) Foreign Application Priority Data

Aug. 25, 2015 (EP) .................................. 15290219
Mar. 31, 2016 (EP) .................................. 16290058

(51) Int. Cl.
G06F 17/22 (2006.01)
G06F 17/21 (2006.01)
(Continued)

(52) U.S. Cl.
CPC ........ *G06F 17/212* (2013.01); *G06F 3/04883* (2013.01); *G06F 17/242* (2013.01);
(Continued)

(58) Field of Classification Search
CPC .... G06F 3/017; G06F 3/04883; G06F 17/242; G06F 17/212; G06K 9/00402; G06K 9/222; G06K 9/00442
See application file for complete search history.

(56) References Cited

U.S. PATENT DOCUMENTS 5,590,257 A 12/1996 Forcier
5,596,350 A 1/1997 Capps et al.
(Continued)

*Primary Examiner* — Maikhanh Nguyen

(57) ABSTRACT

A system, method and computer program product for use in digital note taking with handwriting input to a computing device are provided. The computing device is connected to an input device, or an input surface. A user provides input by applying pressure to or gesturing above the input surface using a finger or an instrument. The present system and method monitors the input strokes. The computing device includes a processor controlling an application for recognizing the handwriting input. The system application causes display of, on a display interface, a guide element for handwriting input and digital ink in a block layout in accordance with a layout of blocks of the handwriting input and a configuration of the computing device display interface. The guide element is displayed based on the digital ink block content and layout and typeset ink block content and layout formed from the recognized handwriting input.

14 Claims, 54 Drawing Sheets

(51) Int. Cl.
*G06K 9/00* (2006.01)
*G06F 3/0488* (2013.01)
*G06F 17/24* (2006.01)
*G06K 9/22* (2006.01)

(52) U.S. Cl.
CPC ..... *G06K 9/00402* (2013.01); *G06K 9/00442* (2013.01); *G06K 9/222* (2013.01)

(56) References Cited

U.S. PATENT DOCUMENTS

| | | | |
|---|---|---|---|
| 5,613,019 A | 3/1997 | Altman et al. | |
| 6,021,218 A * | 2/2000 | Capps | G06K 9/222 382/187 |
| 6,499,043 B1 * | 12/2002 | Forcier | G06F 3/0488 715/273 |
| 6,525,749 B1 | 2/2003 | Moran et al. | |
| 7,050,632 B2 | 5/2006 | Shilman et al. | |
| 7,096,432 B2 | 8/2006 | Huapaya et al. | |
| 7,167,165 B2 | 1/2007 | Keely et al. | |
| 7,174,042 B1 * | 2/2007 | Simmons | G06K 9/00402 345/169 |
| 7,266,769 B2 | 9/2007 | Thacker | |
| 7,295,708 B2 | 11/2007 | Chen et al. | |
| 7,358,965 B2 | 4/2008 | Barabe et al. | |
| 7,698,340 B2 | 4/2010 | Ye et al. | |
| 7,751,623 B1 * | 7/2010 | Simmons | G06K 9/00402 345/173 |
| 2003/0038788 A1 * | 2/2003 | Demartines | G06F 3/0485 345/173 |
| 2003/0214491 A1 * | 11/2003 | Keely | G06F 3/0481 345/179 |
| 2004/0021701 A1 * | 2/2004 | Iwema | G06F 3/0481 715/863 |
| 2006/0001656 A1 * | 1/2006 | LaViola, Jr. | G06F 3/04883 345/179 |
| 2006/0221064 A1 * | 10/2006 | Sawada | G06F 17/242 345/173 |
| 2009/0002392 A1 * | 1/2009 | Hou | G06F 17/242 345/619 |
| 2009/0161958 A1 * | 6/2009 | Markiewicz | G06F 3/0237 382/186 |
| 2014/0363074 A1 * | 12/2014 | Dolfing | G06F 3/04883 382/156 |
| 2014/0365978 A1 | 12/2014 | Fish et al. | |
| 2016/0179772 A1 * | 6/2016 | Perrin | G06F 3/04883 715/268 |

* cited by examiner

FIG. 12A

| Total | Column Count | | | | | | | | | | | | | | | |
|---|---|---|---|---|---|---|---|---|---|---|---|---|---|---|---|---|
| | 1/x | 2/x | 3/x | 4/x | 5/x | 6/x | 7/x | 8/x | 9/x | 10/x | 11/x | 12/x | 13/x | 14/x | 15/x | 16/x |
| x/1 | 1/1 | | | | | | | | | | | | | | | |
| x/2 | 1/2 | | | | | | | | | | | 2/2 | | | | |
| x/4 | 1/4 | | | 2/4 | | | | 3/4 | | | | 4/4 | | | | |
| x/6 | 1/6 | | 2/6 | | | 3/6 | | | 4/6 | | | 5/6 | | | 6/6 | |
| x/8 | 1/8 | 2/8 | | 3/8 | | 4/8 | | 5/8 | | 6/8 | | 7/8 | | 8/8 | | |
| x/12 | 1/12 | 2/12 | 3/12 | 4/12 | 5/12 | 6/12 | 7/12 | 8/12 | 9/12 | 10/12 | 11/12 | 12/12 | | | | |
| x/16 | 1/16 | 2/16 | 3/16 | 4/16 | 5/16 | 6/16 | 7/16 | 8/16 | 9/16 | 10/16 | 11/16 | 12/16 | 13/16 | 14/16 | 15/16 | 16/16 |

FIG. 12B

| Total | Column Count | | | | | | | | | | | | | | | |
|---|---|---|---|---|---|---|---|---|---|---|---|---|---|---|---|---|
| | 1/x | 2/x | 3/x | 4/x | 5/x | 6/x | 7/x | 8/x | 9/x | 10/x | 11/x | 12/x | 13/x | 14/x | 15/x | 16/x |
| x/1 | 1/1 | | | | | | | | | | | | | | | |
| x/2 | 1/2 | | | | | | | | | | | 2/2 | | | | |
| x/4 | 1/4 | | | 2/4 | | | | 3/4 | | | | 4/4 | | | | |
| x/8 | 1/8 | 2/8 | | 3/8 | | 4/8 | | 5/8 | | 6/8 | | 7/8 | | 8/8 | | |
| x/16 | 1/16 | 2/16 | 3/16 | 4/16 | 5/16 | 6/16 | 7/16 | 8/16 | 9/16 | 10/16 | 11/16 | 12/16 | 13/16 | 14/16 | 15/16 | 16/16 |

2500

I wish the ring had never come to me,
I wish none of this had ever happened.
So do all who live to see such times,
but that is not for them to decide.
All we have to decide is what to do
with the time that's been given to us.

410

I wish the ring had never come to me, I wish none of this had ever happened.
So do all who live to see such times, but that is not for them to decide.
All we have to decide is what to do with the time that's been given to us.

SYSTEM AND METHOD OF DIGITAL NOTE TAKING

CROSS-REFERENCE TO RELATED APPLICATIONS

This application is a Continuation-in-Part of U.S. application Ser. No. 14/886,195 filed on Oct. 19 2015, which claims priority to European Application No. 15290219.3 filed on Aug. 25, 2015. This application also claims priority to European Application No. 16290058.3 filed on Mar. 31, 2016. The entire contents of these applications are incorporated by reference herein.

TECHNICAL FIELD

The present description relates generally to the field of digital note taking systems and methods using computing device interfaces. The present description relates more specifically to digital note taking systems and methods capable of recognizing user input handwriting of various characters, symbols and objects.

BACKGROUND

Computing devices continue to become more ubiquitous to daily life. They take the form of computer desktops, laptop computers, tablet computers, hybrid computers (2-in-1s), e-book readers, mobile phones, smartphones, wearable computers, global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. A further input device is a position detection system which detects the relative position of either touch or non-touch interactions with a non-touch physical or virtual surface. Any of these methods of input can be used generally for drawing or inputting text. The user's handwriting is interpreted using a handwriting recognition system or method.

One application of handwriting recognition in portable computing devices, such as smartphones, phablets and tablets, is in note taking. This particularly occurs in education and business settings where the user of the computing device captures notes, for example, during a lecture or meeting. This is usually done by the user launching a handwritten note taking application on the computing device which accepts and interprets, either locally in the device or remotely via a communications link of the device, handwritten notes input on the touch sensitive surface. Conventionally such handwritten note taking applications are limited in their capabilities to provide a full document creation experience to users from the notes taken, since the focus of these applications has primarily been recognition accuracy rather than document creation. That is, available applications provide recognition of handwriting and conversion of the recognized handwriting into typeset text, with various feedback mechanisms to the user, but that is generally the extent of the interaction with the input.

If the user desires any further interaction with the output text, such as editing the content, manipulating the layout of the notes, or converting or adding the notes into a document, the text generally needs to be imported into a separate document processing application. This in itself is no great problem, however as the original layout of the handwritten notes and the actual input handwriting itself, so-called digital ink, is typically discarded in the import process, the user must refer back to the original notes in order to ascertain the intent in the notes taken. For example, the user may have emphasized certain words or passages in the notes either by annotation or decoration, or through the layout of the notes content itself.

Further, once the import is performed into the separate application the ability to add or edit content through further note taking is generally lost, and the user must in effect begin a new note which must itself be imported into the document. Such a cumbersome method clearly limits the ability of continuing or updating notes for inclusion in documents over different sessions, e.g., over multiple lectures or multiple business meetings, or through collaboration and sharing. Of course, users could delay importation to a document processing application until the note taking is finished over such multiple sessions, with or without multiple users. However, since many people nowadays have multiple portable computing devices which are interconnected it may be desired to perform these multiple sessions on these different computing devices, or at least access the notes on these different devices.

For example, a user may begin a note on their laptop during a lecture or meeting, then wish to add to that note using their tablet during a conversation with a colleague or friend, and then later share the updated note using their smartphone. The available input and display space on the screens of these devices can vary significantly. Further, some devices allow display at different orientations, i.e., portrait and landscape. As such, the user's layout of the notes using one device at one orientation may be significantly changed when the notes are displayed and interacted with on a different device or at a different orientation. Accordingly, continued note taking on specific note layout over these different display scenarios is presently difficult.

Other issues with the note taking layout occur without even considering the complexities of multiple devices and orientations. Available handwritten note taking applications generally provide users with the ability to typeset the handwritten input either manually or automatically (e.g., on-the-fly). However, as typeset text is generally smaller and more uniform than handwritten text (described in detail later), the user's layout of the handwritten input, such as in sentences in paragraphs, may not translate well to typeset text, e.g., the sentences become too short such that the paragraphs lose visual meaning and look more like lists than paragraphed text. This can be overcome by reflowing the typeset text so that the layout appears to be preserved, e.g., paragraphs are retained. However, the user's original handwritten layout may have actually been a list not a paragraph, for example, and without an explicit indication of such layouts it is difficult for the handwriting recognition process to detect these instances.

Conventional processes require users to input certain symbols or characters, e.g., bullet points for list input (see, for example, U.S. Pat. No. 5,613,019), or use particular gestures to indicate such layouts, or implement input methods for such which otherwise disturb the handwriting flow of the user (see, for example, U.S. Pat. No. 7,751,623 which discloses display of a guide for list input). However, the user should be able to input handwritten notes in their desired layout without needing to consider the manner in which the handwritten note taking application will handle that input. This is because, the Applicant has found that when using handwriting note taking applications users generally are unable or do not desire to learn specific input methods or gestures that are not natural or intuitive, or to make settings through menus and the like.

Further, note taking generally takes many forms, and user's don't only take notes using text characters. For example, notes may include many types of content, such as text, drawings, diagrams, mathematical or chemical equations and music notation. Further, the user may want to insert other media into the note, such as images and audio or video recordings. Accordingly, such multi-content and multi-media input should be supported whilst respecting the user's layout of these inputs.

The user's note layout however should be made in a fashion that assists in the effective recognition of the handwritten content as well as the sensible typesetting of that content. Some conventional systems provide assistance for recognition by guiding the handwritten input through use of ruled lines, similar to paper. U.S. Pat. Nos. 5,613,019, 7,096,432, 7,167,165 and 7,266,769 disclose note taking systems with such lines provided in various forms. With respect to the line height, e.g., the space between the lines, U.S. Pat. No. 7,167,165 discusses setting it based on the size of the handwritten input, U.S. Pat. No. 7,266,769 discusses making it user settable and U.S. Pat. No. 5,613,019 discusses setting it in a manner which allows discrimination between handwritten text input and drawing input. Such considerations do not take the eventual typesetting of the handwritten text into account however and therefore the set spacing and distribution of the lines may be made independently of the typeset ink which is not preferable for sensible typesetting of the handwritten note content and layout.

SUMMARY

The examples of the present invention that are described herein below provide systems and methods for use in digital note taking with handwriting input to a computing device. The computing device may include a processor and at least one non-transitory computer readable medium for recognizing handwriting input under control of the processor.

In one example, the disclosed system includes the non-transitory computer readable medium configured to cause display of, on a display interface of a computing device, a guide element for handwriting input and digital ink in a block layout in accordance with a layout of blocks of the handwriting input and a configuration of the computing device display interface. The guide element is displayed based on the digital ink block content and layout and typeset ink block content and layout formed from the recognized handwriting input.

The guide element may include a plurality of substantially parallel lines displayed on the display interface. The displayed spacing between each of the plurality of substantially parallel lines may be based on a display size of the typeset ink.

The non-transitory computer readable medium may be configured to detect, under control of the processor, list content elements of the handwriting input based on the recognized handwriting input and relative locations of recognized content elements of the handwriting input, and cause the display of the guide element to guide handwriting input of further list content elements in a list layout. The list layout may be defined by the at least one system application in accordance with a layout of the detected list content elements.

The non-transitory computer readable medium may be configured to detect, under control of the processor, a hierarchical structure of the detected list content elements based on the detected list content elements.

In another example, the disclosed method includes causing, with the at least one non-transitory computer readable medium, display of, on a display interface of a computing device, a guide element for handwriting input and digital ink in a block layout in accordance with a layout of blocks of the handwriting input and a configuration of the computing device display interface. The guide element is displayed based on the digital ink block content and layout and typeset ink block content and layout formed from the recognized handwriting input.

The guide element may include a plurality of substantially parallel lines displayed on the display interface. The displayed spacing between each of the plurality of substantially parallel lines may be based on a display size of the typeset ink.

The disclosed method may include the non-transitory computer readable medium configured to detect, under control of the processor, list content elements of the handwriting input based on the recognized handwriting input and relative locations of recognized content elements of the handwriting input, and cause the display of the guide element to guide handwriting input of further list content elements in a list layout. The list layout may be defined by the at least one system application in accordance with a layout of the detected list content elements.

The disclosed method may include the non-transitory computer readable medium configured to detect, under control of the processor, a hierarchical structure of the detected list content elements based on the detected list content elements.

In another example, the disclosed non-transitory computer readable medium has a computer readable program code embodied therein which is adapted to be executed to implement a method for recognizing input of handwriting note taking to a computing device. The method includes causing, with the at least one non-transitory computer readable medium, display of, on a display interface of a computing device, a guide element for handwriting input and digital ink in a block layout in accordance with a layout of blocks of the handwriting input and a configuration of the computing device display interface. The guide element is displayed based on the digital ink block content and layout and typeset ink block content and layout formed from the recognized handwriting input.

The guide element may include a plurality of substantially parallel lines displayed on the display interface. The displayed spacing between each of the plurality of substantially parallel lines may be based on a display size of the typeset ink.

The disclosed non-transitory computer readable medium may be configured to detect, under control of the processor, list content elements of the handwriting input based on the recognized handwriting input and relative locations of recognized content elements of the handwriting input, and cause the display of the guide element to guide handwriting input of further list content elements in a list layout. The list layout may be defined by the at least one system application in accordance with a layout of the detected list content elements.

The disclosed non-transitory computer readable medium may be configured to detect, under control of the processor, a hierarchical structure of the detected list content elements based on the detected list content elements.

BRIEF DESCRIPTION OF THE DRAWINGS

The present system and method will be more fully understood from the following detailed description of the examples thereof, taken together with the drawings. In the drawings like reference numerals depict like elements. In the drawings:

FIGS. 12A and 12B shows tables of rules for adaption of the columns with respect to the input surface size;

FIG. 25 shows an example digital ink paragraph and its typeset equivalent;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference to and discussion of directional features such as up, down, above, below, lowest, highest, horizontal, vertical, etc., are made with respect to the Cartesian coordinate system as applied to the input surface on which the input to be recognized is made. Further, the use of the term 'text' in the present description is understood as encompassing all alphanumeric characters, and strings thereof, in any written language and common place non-alphanumeric characters, e.g., symbols, used in written text. Furthermore, the term 'non-text' in the present description is understood as encompassing freeform handwritten content and rendered text and image data, as well as non-alphanumeric characters, and strings thereof, and alphanumeric characters, and strings thereof, which are used in non-text contexts.

The various technologies described herein generally relate to capture, processing and management of handwritten content on portable and non-portable computing devices in a manner which allows conversion of that content into publishable documents. The systems and methods described herein may utilize recognition of users' natural writing or drawing styles input to a computing device via an input surface, such as a touch sensitive screen, connected to, or of, the computing device or via an input device, such as a digital pen or mouse, connected to the computing device. Whilst the various examples are described with respect to recognition of handwriting input using so-called online recognition techniques, it is understood that application is possible to other forms of input for recognition, such as offline recognition in which images rather than digital ink are recognized. The terms hand-drawing and handwriting are used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye.

Figure 1:
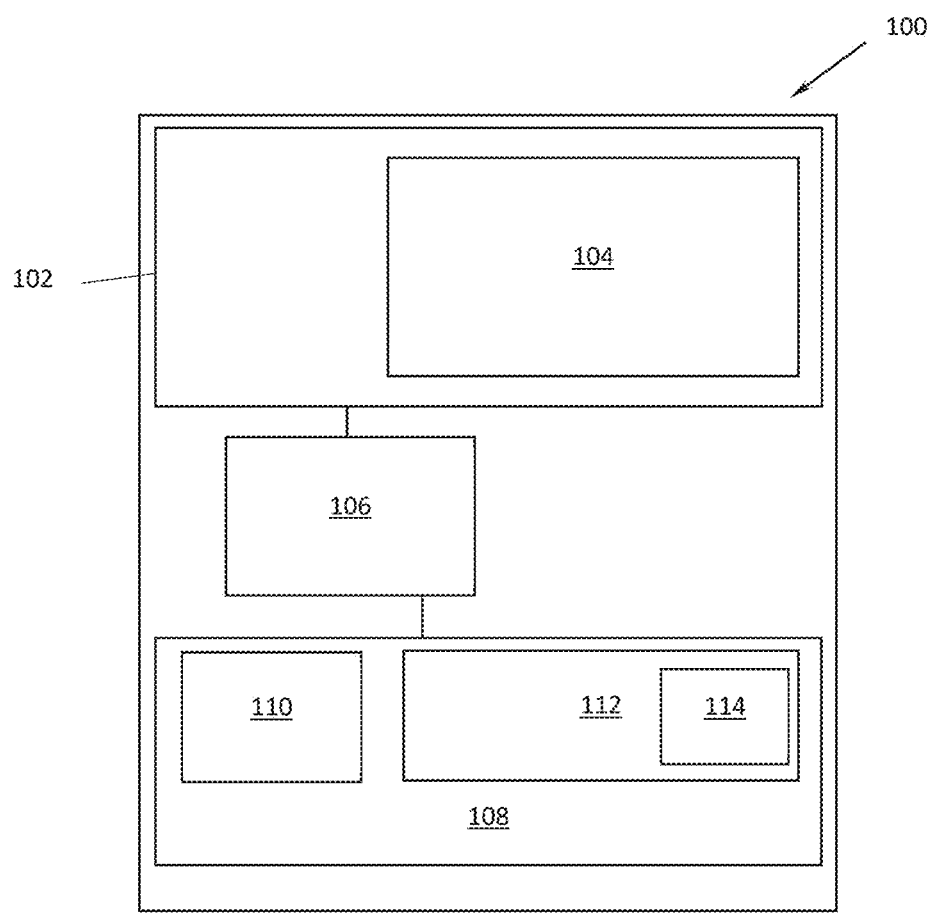
FIG. 1 shows a block diagram of a computing device in accordance with an example of the present system and method.

FIG. 1 shows a block diagram of an example computing device 100. The computing device may be a computer desktop, laptop computer, tablet computer, hybrid computers (2-in-1s), e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The illustrated example of the computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. At least some of the display 102 is co-located with at least one input surface 104. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input surface 104 may be bounded by a permanent or video-generated border that clearly identifies its boundaries. Instead of, or additional to, an on-board display, the computing device 100 may have a projected display capability.

The computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The computing device 100 also includes a processor 106, which is a hardware device for executing software, particularly software stored in the memory 108. The processor can be any custom made or commercially available general purpose processor, a central processing unit (CPU), commercially available microprocessors including a semiconductor based microprocessor (in the form of a microchip or chipset), microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art.

The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD), or any other magnetic, resistive or phase-change nonvolatile memory). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110 and an application 112 in the form of a non-transitory computer readable medium having a computer readable program code embodied therein. The software optionally further includes a handwriting recognition (HWR) system 114 which may each include one or more separate computer programs. Each of these has an ordered listing of executable instructions for implementing logical functions. The operating system 110 controls the execution of the application 112 (and the HWR system 114). The operating system 110 may be any proprietary operating system or a commercially or freely available operating system, such as WEBOS, WINDOWS®, MAC and IPHONE OS®, LINUX, and ANDROID. It is understood that other operating systems may also be utilized. Alternatively, the application 112 of the present system and method may be provided without use of an operating system.

The application 112 includes one or more processing elements related to detection, management and treatment of the layout of user input (discussed in detail later). The software may also include one or more other applications related to handwriting recognition, different functions, or both. Some examples of other applications include a text editor, telephone dialer, contacts directory, instant messaging facility, computer-aided design (CAD) program, email program, word processing program, web browser, and camera. The application 112, and the other applications, include program(s) provided with the computing device 100 upon manufacture and may further include programs uploaded or downloaded into the computing device 100 after manufacture.

The HWR system 114, with support and compliance capabilities, may be a source program, executable program (object code), script, application, or any other entity having a set of instructions to be performed. When a source program, the program needs to be translated via a compiler, assembler, interpreter, or the like, which may or may not be included within the memory, so as to operate properly in connection with the operating system. Furthermore, the handwriting recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, and Ada; or (c) functional programming languages for example but no limited to Hope, Rex, Common Lisp, Scheme, Clojure, Racket, Erlang, OCaml, Haskell, Prolog, and F#. Alternatively, the HWR system 114 may be a method or system for communication with a handwriting recognition system remote from the device, such as server or cloud-based system, but is remotely accessible by the computing device 100 through communications links using the afore-mentioned communications I/O devices of the computing device 100. Further, the application 112 and the HWR system 114 may operate together or be combined as a single application. Further still, the application 112 and/or the HWR system 114 may be integrated within the operating system 110.

Strokes entered on or via the input surface 104 are processed by the processor 106 as digital ink. A user may enter a stroke with a finger or some instrument such as a pen or stylus suitable for use with the input surface. The user may also enter a stroke by making a gesture above the input surface 104 if technology that senses or images motion in the vicinity of the input surface 104 is being used, or with a peripheral device of the computing device 100, such as a mouse or joystick, or with a projected interface, e.g., image processing of a passive plane surface to determine the stroke and gesture signals. A stroke is characterized by at least the stroke initiation location, the stroke termination location, and the path connecting the stroke initiation and termination locations. Further information such as timing, pressure, angle at a number of sample points along the path may also be captured to provide deeper detail of the strokes. Because different users may naturally write the same object, e.g., a letter, a shape, a symbol, with slight variations, the HWR system accommodates a variety of ways in which each object may be entered whilst being recognized as the correct or intended object.

Figure 2:
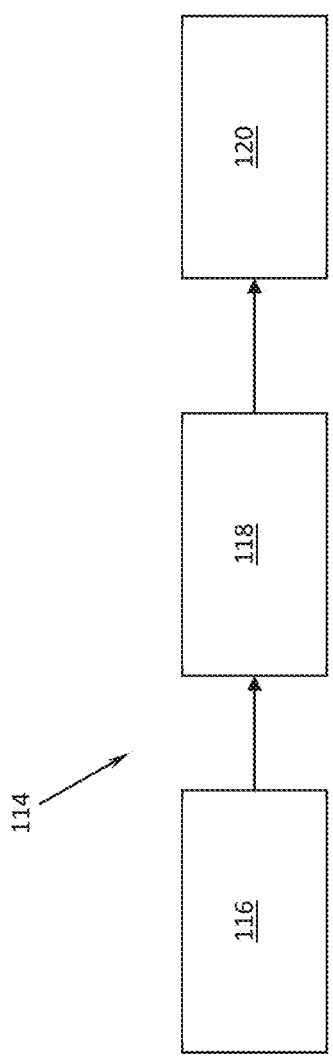
FIG. 2 shows a block diagram of a system for handwriting recognition in accordance with an example of the present system and method.

FIG. 2 is a schematic pictorial of an example of the HWR system 114, in either its local (i.e., loaded on the device 100) or remote (i.e., remotely accessible by the device 100) forms. The HWR system 114 includes stages such as preprocessing 116, recognition 118 and output 120. The preprocessing stage 116 processes the digital ink to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized objects are then output 120 to the display 102 generally as a typesetted version of the handwritten elements/characters.

Figure 3:
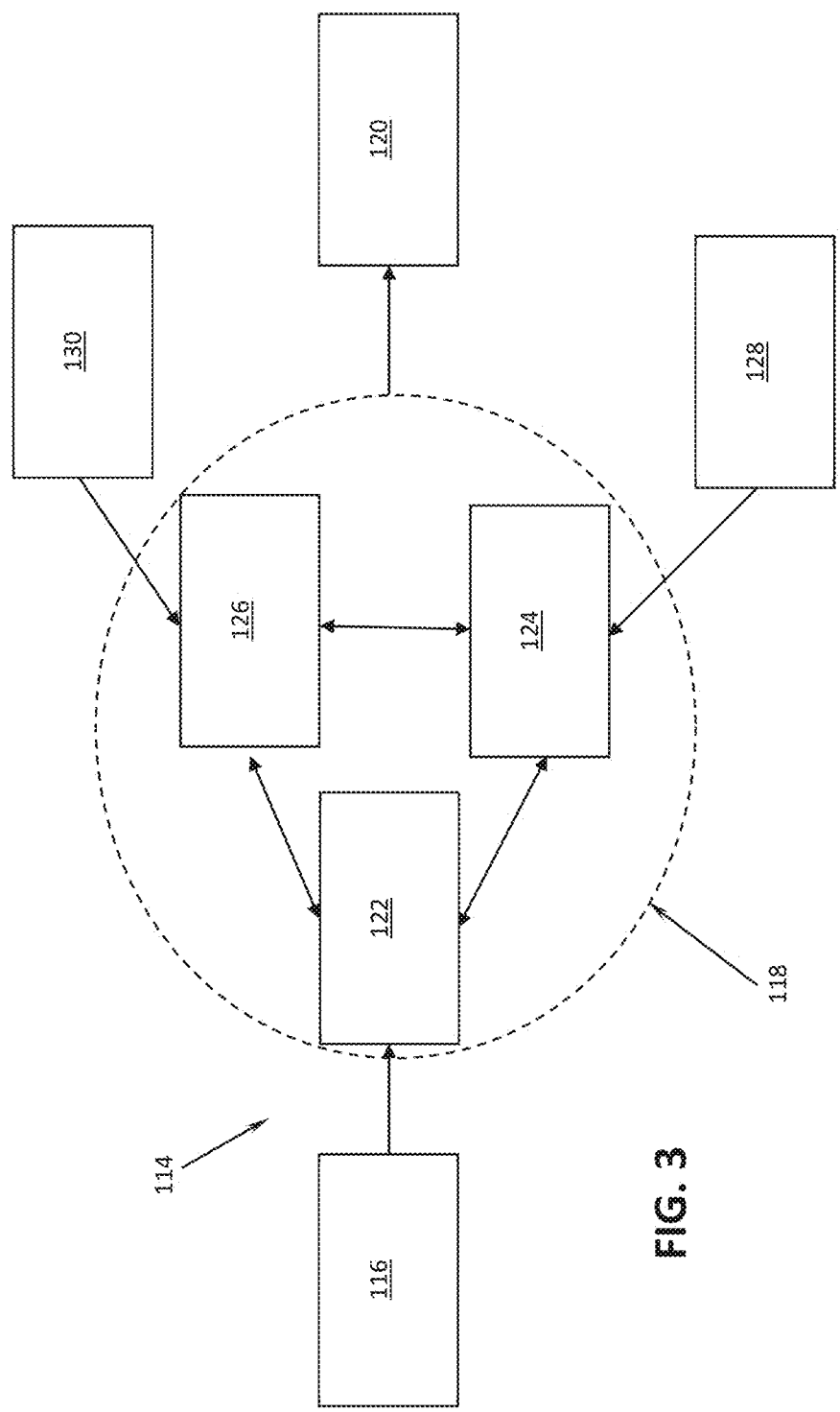
FIG. 3 shows a block diagram illustrating detail of the handwriting recognition system of FIG. 2 in accordance with an example of the present system and method.

The recognition stage 118 may include different processing elements or experts. FIG. 3 is a schematic pictorial of the example of FIG. 2 showing schematic detail of the recognition stage 118. Three experts, a segmentation expert 122, a recognition expert 124, and a language expert 126, are illustrated which collaborate through dynamic programming to generate the output 120.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, equations, and music notation.

The recognition expert 124 provides classification of the features extracted by a classifier 128 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon, regular expressions, etc. and is the storage for all static data used by the language expert 126 to execute a language model. A language model can rely on statistical information on a given language. The linguistic information 130 is computed off-line, with or without adaption according to the results of recognition and user interactions, and provided to the linguistic expert 126. The language expert 126 aims at finding the best recognition path. In one example, the language expert 126 does this by exploring a language model such as final state automaton (FSA) representing the content of linguistic information 130. In addition to the lexicon constraint, the language expert 126 may use a language model with statistical information modeling for how frequent a given sequence of elements appears in the specified language or is used by a specific user to evaluate the linguistic likelihood of the interpretation of a given path of the segmentation graph.

The present system and method make use of the HWR system 114 in order to recognize handwritten input to the device 100. As mentioned earlier, the application 112 includes application(s) for handling the layout of the recognized user input. Such applications may be provided in an architecture with separate layers for handling different processing. One or more of these layers may be remote to the device 100 accessible via the communications channels mentioned earlier. The layers may include application wrapper(s), platform wrapper(s) and (platform specific) application user interface(s).

The application 112 provided by the present system and method allows users, such as students, academic and working professionals, to take handwritten notes, such as during lectures, meetings and brainstorming sessions, which they can transform into sharable formatted documents on their portable or non-portable computing devices. The application allows taking of 'clean' notes which can be searched and memorized properly using their computing devices. The present system and method further allow natural writing to be input since the writing is made on (ruled) lines, and paragraphs and other layout elements are respected responsive to orientation (i.e., portrait or landscape) and device display capacity. Synchronization of the captured notes between devices and auto-saving of notes are also supported. Typesetting of the handwritten notes, via the HWR system, either on-demand or on-the-fly is also supported. Searching of both the recognized typeset text and the digital ink, such as with the systems and methods described in US Patent Application Publication US 2009/0077053 assigned to the present Applicant, the entire contents of which is incorporated by reference herein, is also supported, including indexation-on-the-fly. Export options to various formats, such as a text, Latex, HTML, image, pdf, etc., is also supported. These and other aspects are now described.

The application 112 utilizes a framework for the definition and handling of documents and document elements so as to provide structured content allowing layout definition and preservation. This document model handles different types of document elements, which are best described with HTML5 reference, for example, see W3C HTML5 DOM—Kinds of content: http://www.w3.org/TR/htm15/dom.html#kinds-of-content. The document model utilized by the application 112 does not reproduce HTML specifications, rather it takes inspiration from them. A subset of the elements of the document model is flow, sectioning, heading, phrasing, embedded and interactive.

Regarding flow, most elements that are used in the body of documents and applications are categorized as flow content. Content flow basically works just like an HTML DOM, being a structured tree of nodes rendered vertically into main text view. All input goes by default into content flow, cascading vertically from top of the document and left-aligned for left-to-right written languages or right-aligned for right-to-left written languages. Sectioning content is content that defines the scope of headings and footers. Heading content defines the header of a section (whether explicitly marked up using sectioning content elements, or implied by the heading content itself). Phrasing content is the text of the document, as well as elements that mark up that text at the intra-paragraph level. Runs of phrasing content form paragraphs. Embedded content is content that imports another resource into the document, or content from another vocabulary that is inserted into the document. Interactive content is content that is specifically intended for user interaction. These document elements, and others elements, are utilized in the document model with respect to the content.

An initial aspect of the document model and feature of the application 112 is the provision of an effectively infinite vertical scrolling interface for the input of handwritten notes and other content by a user. A thousand years ago, content was written on scrolls that one would unroll to read/write. The Codex (ancestor of the book) was invented based on user experience optimization as large rolls were cut into pages thereby providing random and faster access to any part of the content, instead of unrolling the scroll from start to end. This completely and permanently changed the recording of written content, and the book has been the one and only content holder for the last millennium. However, the current digital era in which writing is performed on a dynamic screen interface provides the potential for different paradigms to be adopted. Accordingly, note taking applications and associated user interfaces need not blindly mimic the page paradigm, rather solutions which offer more or enhanced features over either simple page-turn or (infinite) scroll should be evaluated.

Conventional handwritten note taking applications are based on separated and fixed-dimensions pages, imitating real world pages. This 'card' approach is convenient for users to intuitively embrace creating content using handwriting on-screen, however it does not fit with other digital document contexts which all have unlimited height, such as:
  Websites, which care freely scrollable
  ePubs, which are paginated and freely scrollable
  text editors, which use pagination with freely scrollable pages.

The Applicant has found that users of existing digital note taking applications have issues understanding how text behaves when editing, with text reflow and uncontrolled text/object position. In order to lower the learning curve for use of such applications, handwriting should be closer to what users are familiar with. That is, writing with keyboard in text editing software/web services, with the same model, behaviors and infinite scrollable pages. Any digital device user is already accustomed to scrolling (either reading or writing). Scrolling is also a natural and intuitive pattern on touch devices. A quick solution in the handwritten note taking environment would be to just change the way pages are laid out, such as:

fixed page size (defined by device screen or viewport when creating content)
  pages stacked vertically
  allow page breaks for users who prefer paginated content
  allow free vertical scroll for users who prefer scrolling.

However, such a solution does not address all the issues discussed earlier. For example, users would still face layout issues when typesetting. Accordingly, the note taking application of the present system and method provides a typeset 100% compatible solution as it utilizes a pure vertical scroll model featuring an infinite-height single page. This model allows:

users to write on an infinite page or 'scroll page' as in a digital document, where:
    users are not limited by fixed page size;
    scroll pages can be sliced into fragments, with one fragment being about 500 sections or more, for example;
    time to load a large scroll page of content is about 50 milliseconds;
    users can scroll using gestures on or above the touch sensitive surface of the device interface, such as using two fingers
  users to select page mode display where:
    the infinite page is broken into sections;
    a visualization option is provided to select between displaying the sections on top of each other or displaying top and bottom margins between sections as a strong visual separator of vertical pages
  responsive display in which notes are displayed correctly independent of device size/orientation
  users to find existing content and sections easily via navigation
  conversion of existing notes into scroll pages flawlessly.

Using vertical scroll for digital note taking means that writing is performed in a content flow instead of absolute positioned blocks, with all text cascading vertically just like an HTML page or a word processing document. By default, vertical content order defines model structure and all layout changes have impact on all content below, pushing down or pulling up. Accordingly, these changes to the users' layout must be considered and taken account of. However, users should still be provided with the ability to write anywhere on the page, i.e., both vertically and horizontally, create two-dimensional objects, move things around and create layout on-the-fly. These abilities need to be balanced however so that a 'perfect' looking responsive document is created. This means:

all input goes into content flow
  writing offset from margins creates floating blocks that are anchored to content flow
  document model can create invisible container nodes to handle responsive layout of floating blocks
  document model regularly edits and moves content from node/fragment to another to reflect layout/model changes in real-time
  all paragraphs/blocks are aligned to a (vertical and horizontal) grid during content input (along with reflow action and typeset/beautification).

Figure 4:
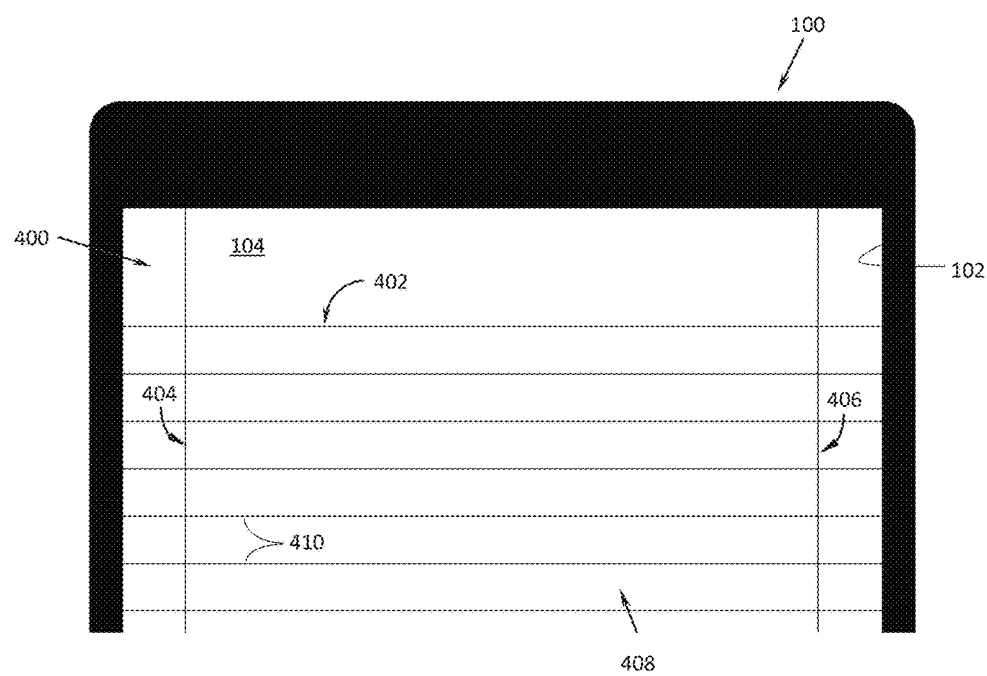
FIG. 4 shows a schematic view of an example visual rendering of a scroll page on a portion of an input surface of the computing device.

These and other features of the present system and method are now described in detail. FIG. 4 shows a schematic view of an example visual rendering of a scroll page 400 on a portion of the input surface 104 of an example computing device 100. The scroll page 400 is shown in editing view in which all content input is performed. Other views may be used for document structure editing and notebook navigation. Besides providing user interface (UI) controls (described later), the main object of the editing view is to provide a full-width page that overflows vertically from the display 102 of the device 100. The infinite scroll page 400 embodies a page of flexible height. In order to maximize writing space for users (particularly on smaller devices), an empty scroll page is defined to occupy at least the whole editing view height.

In the editing view (and other views as appropriate) several page elements are displayed including a top padding 402, a left margin 404 and a right margin 406. The padding and margins define an input area 408 which has a line pattern background 410 as a guide element. The line pattern 410 has a plurality of substantially parallel (horizontal) lines separated by a multiple of the vertical rhythm height unit being the density independent pixel (dp). Regardless of the particular device 100, the vertical distance between the horizontal lines 410 is defined by a line pattern unit (LPU) and the vertical rhythm height unit provides a graduated measure of the LPU on a particular device. For example, the LPU may be set at about one centimeter for any device being a certain multiple of the vertical rhythm height unit or users may be allowed to customize the line pattern unit to a different multiple of the vertical rhythm height unit according to their writing style. Alternatively, the vertical rhythm may be based on typeset text size (e.g., the minimum text size) and the LPU is provided as a multiple of this typeset text size. All lines 410 are displayed with the same very light and subtle color, e.g., grey, that is just between visible and faded. In this way the line pattern is noticeable but unobtrusive so as to guide the handwriting input without distracting from the note taking itself. The line pattern background 410 is displayed in handwritten text context and serves multiple purposes:

forces users to write onto it so that handwriting recognition is optimized
  helps users adopt regular vertical rhythm writing leading to same writing size and better block dimensions and positions (described later)
  gives users a hint about expected content, for example, dedicated backgrounds can be displayed for other contexts, such as drawings and equations
  helps users control line skipping to define paragraphs (described later).

The top padding 402 is displayed on any new page or section and does not contain the line pattern background. This helps users write with proper vertical spacing, i.e., not too close from the interface 104 border and leaves room for other elements, such as section titling and tagging. The top padding 402 is defined by multiples of the LPU, e.g., in the example of FIG. 4 the top padding is two times the LPU.

The left and right margins 404 and 406 are displayed with vertical lines. In the example of FIG. 4 these lines are similar to the line pattern 410 in color and definition, however these lines may be more boldly displayed if desired. The vertical line margins are positioned from the corresponding left and right 'page' edges with a multiplying factor of the vertical rhythm unit. This multiplying factor changes according to the particular device 100, defining different margin width calculations. Example multiplying factors are detailed in Table 1.

TABLE 1

| Device | Screen size | Multiplier | Margin width |
| --- | --- | --- | --- |
| Smartphone | less than about 17 cm (<7") | 2/3 | 32 dp |
| Phablet | about 17 to about 25 cm (7" < 10") | 3/3 | 48 dp |
| Tablet | about 25 to about 32 cm (10" < 13") | 4/3 | 64 dp |
| Laptop computer | about 32 cm to about 37 cm (13" < 15") | 5/3 | 80 dp |
| Desktop computer | about 37 cm to about 50 cm (15" < 21") | 6/3 | 96 dp |
| Television | greater than about 50 cm (>21") | 8/3 | 128 dp |

Alternatively, the width of the margins may be defined based on a percentage of the width of the interface 104 of the device 100 rather than by the vertical rhythm unit. In this way, the relative size of the margins is defined independent of the orientation of the device 100 and/or display 102.

The margins 404, 406 are displayed in handwritten text context, and serve multiple purposes:
- help users write with proper alignment for direction of written language, and not too close from interface border
- allow secure single-point scrolling within right and/or left margin (described later)
- offer dedicated zone in left and/or right margin for content tagging
- offer dedicated zone in left and/or right margin for slice gesture to define sections of the content input on the scroll page.

In the example of FIG. 4, the margins 404, 406 are not displayed in the top padding 402 and start from the first line pattern 410 horizontal line. However, the margins may extend into the top padding if desired. Further, the line pattern 410 is not displayed in the margin elements in order to discourage writing in these areas. However, it may be desired to allow writing in the margins for annotations and the like. Alternatively, the margins may only be displayed on hover-over or contact interaction with the horizontal extents of the page 400 or totally omitted, thereby, for example, relying on natural handwriting behaviors of users to not write too close to the screen/UI edges.

Figure 5B:
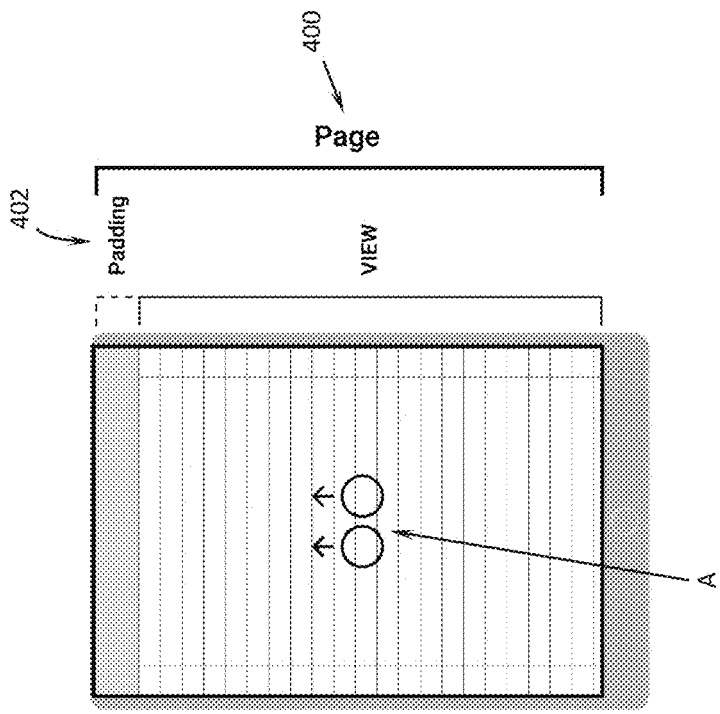
FIGS. 5A and 5B show schematic views of the scroll page with and without input content in different scrolled positions.
Figure 5A:
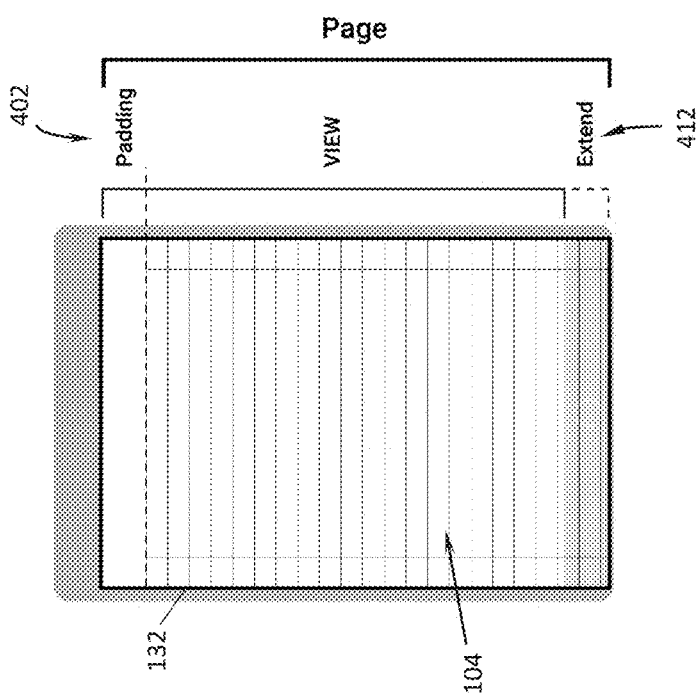

FIGS. 5A to 7B show schematic views of the example visual rendering of the scroll page 400 with and without input content in various scrolled positions in relation to the interface 104 of the device 100. In the present example, the default height of an empty scroll page is slightly larger than the height of the interface 104 so as to compensate for the top padding 402 and to allow discoverability of the scrolling feature of the application 112 by users. The empty page height is defined by the editing view height plus the top padding height, such that the editing view extends below a viewable area 132 of the interface 104. That is, as shown in FIG. 5A, the empty scroll page has the padding 402 within the viewable area 132 and an extend area 412 outside of the viewable area. In FIG. 5B, the empty scroll page has been scrolled upwards, using a multi-point scroll gesture A (described later), such that the padding 402 is outside of the viewable area 132 and the extend area is now part of the viewed scroll page 400. This empty page height is adapted when the scroll page is rendered on other devices with different screen sizes.

Figure 6B:
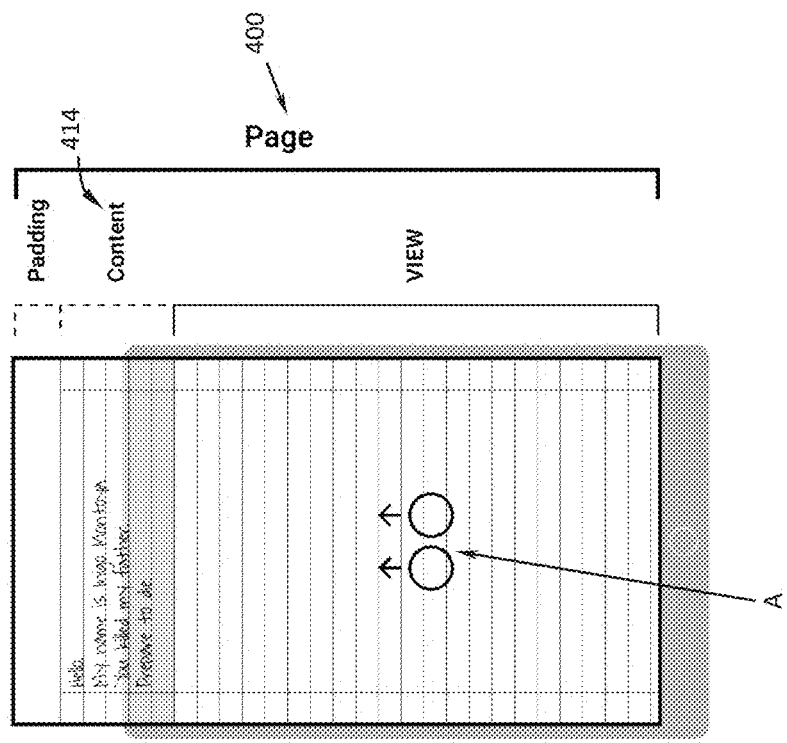
FIGS. 6A and 6B show schematic views of the scroll page with and without input content in different scrolled positions.
Figure 6A:
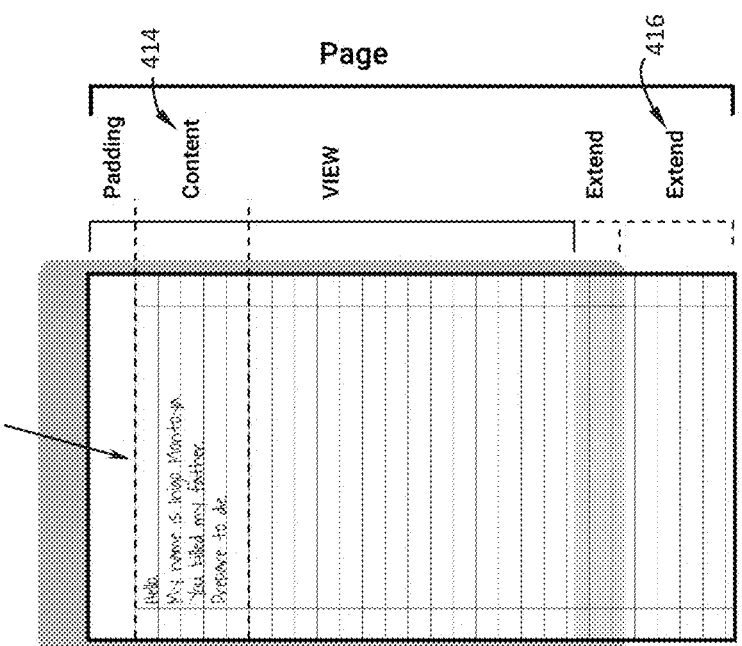

Any time content input occurs, the page height extends accordingly and remains scrollable to offer an uninterrupted way of writing by removing paper size limitations. That is, as shown in FIG. 6A, the height of input content B defines a content area 414 and a further extend area 416 is defined at the bottom of the scroll page 400 having the same dimensions. In this way, whatever content is entered, users are able to push it upwards outside of view to "clear" writing space without needing to create a new section (as shown in FIG. 6B), and even without writing any content the page is scrollable so that users understand the navigable aspects of the scroll page 400.

Any content input updates page properties in real-time (or as soon as possible), allowing users to scroll and push content outside of view. Page height extension equals content input height (starting from top of the first line to bottom of the last line=number of lines+1). This gives on a tablet for instance:
- 1 line of content: (1+1)×vertical rhythm unit=2×48=96 dp
- 2 lines of content: (2+1)×vertical rhythm unit=3×48=144 dp
- 4 lines of content: (4+1)×vertical rhythm unit=5×48=240 dp
- and so on . . . .

Figure 7B:
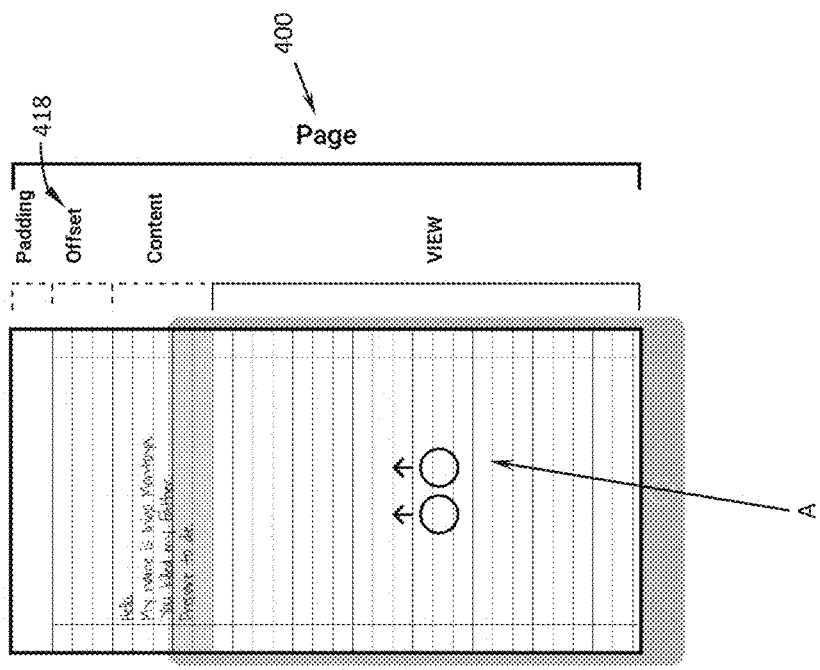
FIGS. 7A and 7B show schematic views of the scroll page with and without input content in different scrolled positions.
Figure 7A:
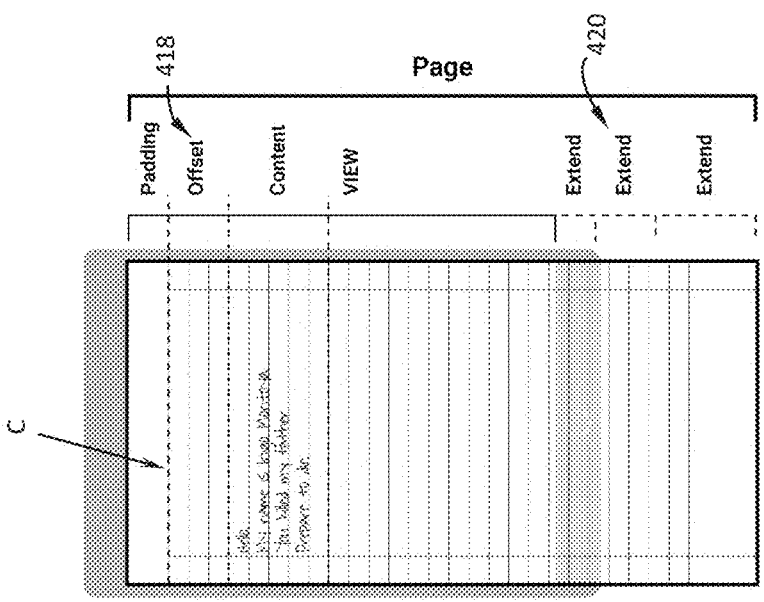

Content input may occur at any position on the page 400, with offset from the topmost position, or may be moved after input to any position on the page. That is, as shown in FIG. 7A, the height of an offset C of the input content B from the top padding 402 defines an offset area 418 and a further extend area 420 is defined at the bottom of the scroll page 400 having the same dimensions. In this way, whatever content is entered, users are able to push it upwards outside of view to "clear" writing space without needing to create a new section (as shown in FIG. 7B). Accordingly, the page height extension integrates a content offset, giving on a tablet for instance:
- 1 line of content with 1 line offset: ((1+1)+(1))×vertical rhythm unit=3×48=144 dp
- 2 lines of content with 3 lines offset: ((2+1)+(3))×vertical rhythm unit=6×48=288 dp
- 4 lines of content with 2 lines offset: ((4+1)+(2))×vertical rhythm unit=7×48=336 dp
- and so on . . . .

Vertical scroll may be handled differently depending on the ability of the computing device 100 to differentiate a users' finger from a stylus or pen (by which the device defines passive and active styli) or the ability of a stylus to indicate or communicate to the device that it is being used for handwriting or the ability of users to provide such an indication. By default, and in devices which do not differentiate, any single-point touch or hover event within the input area 408 is to be considered as content input. Thus, in order for a user to scroll the page 400 without inputting new content a multi-point interaction can be used anywhere on the input area, such as the multi-point vertical scroll gesture A using two fingers touching or hovering over the interface 104 at about the same time shown in FIG. 8.

Figure 8:
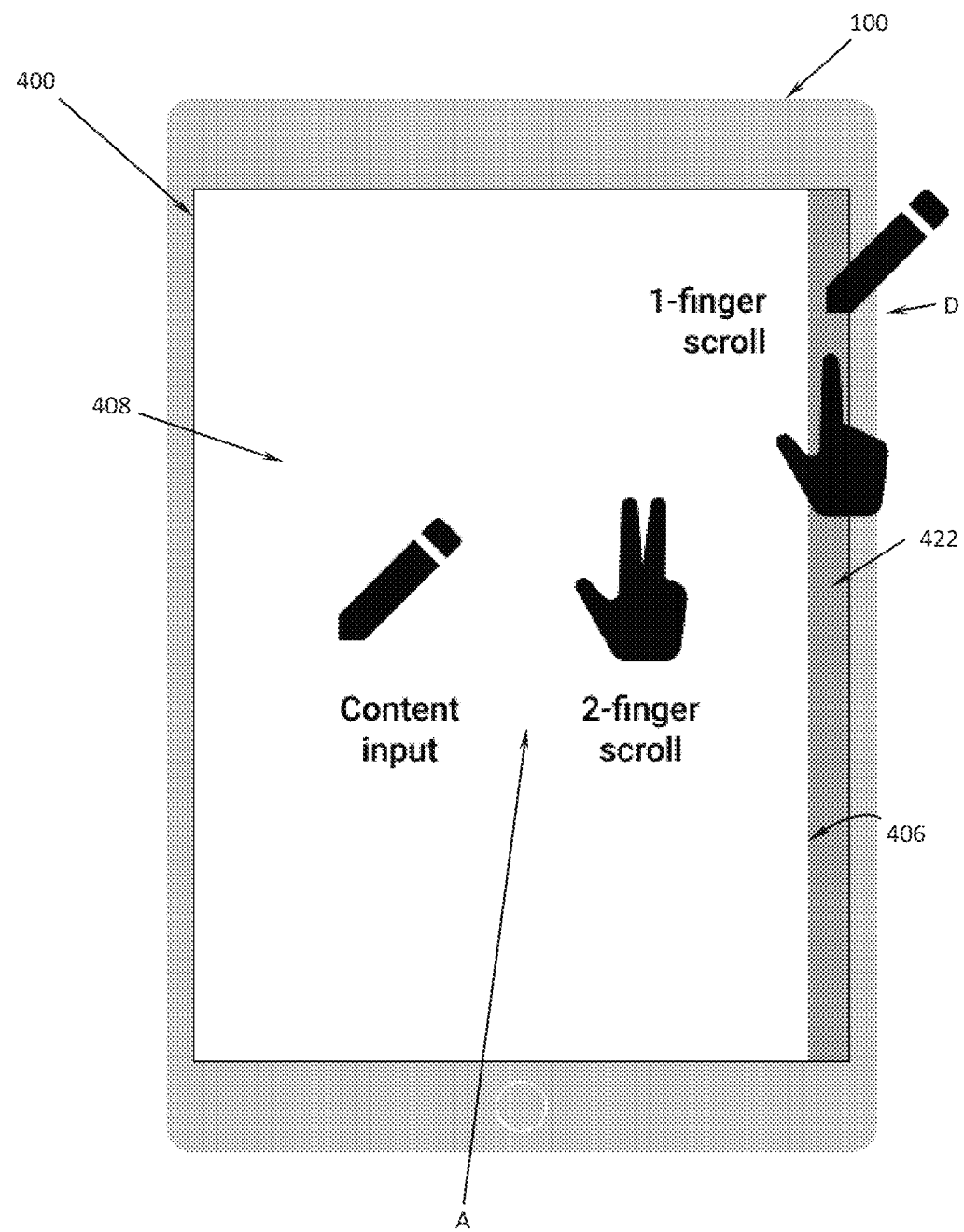
FIG. 8 shows a schematic view of an example visual rendering of the scroll page on the device input surface.

However, in order to allow scrolling without forcing multi-point interaction, a dedicated area may be defined in one or more of the margins, e.g., in FIG. 8 the right margin 406 is defined with a scroll zone 422. A single-point gesture D (shown as a one-finger or stylus gesture touching or hovering over the interface 104 in FIG. 8) which starts in this zone and has subsequent movement that (wholly or partly)

occurs within this zone is not considered as content input but as a scroll gesture. The width of the scrolling area may be defined by the margin width or independent therefrom. For example, the scroll zone may be defined by touch target dimensions of users' fingers and stylus tips (about 48 dp) so that the scrolling area remains the same even with responsive resizing of the margins (e.g., wider with bigger devices).

Once a scroll sequence is launched (either with multi-point anywhere or single-point in the margin area) and until the page stops moving, scrolling may be continued using just a one-point gesture anywhere. When using a device that is able to differentiate finger from stylus, or a stylus which indicates its use to the device, or the user provides this indication, thus defining an active stylus for content input for example, multi-point interaction is not necessary and scrolling is available with a one-finger vertical scroll gesture anywhere on the interface surface 104.

Figure 9:
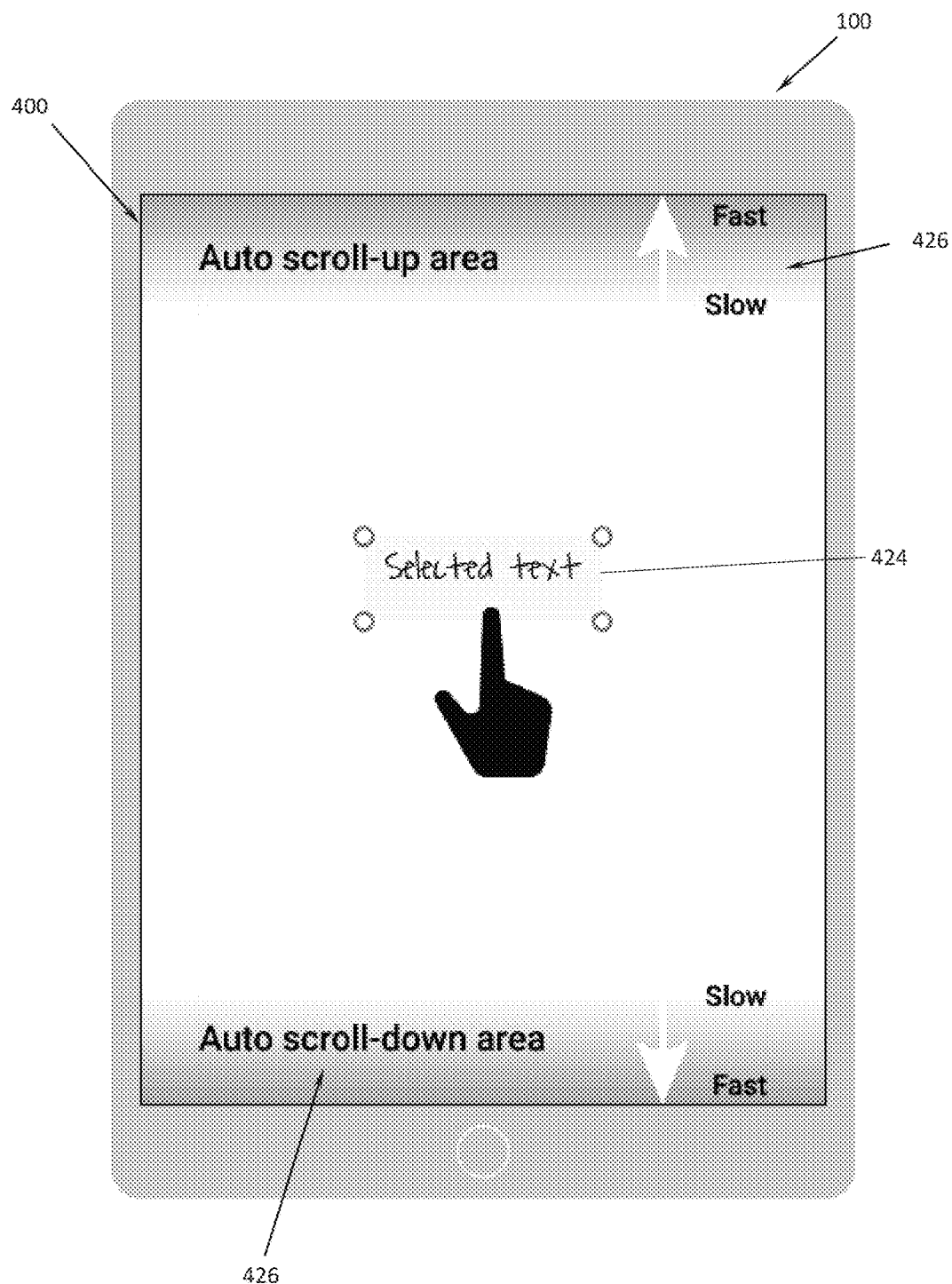
FIG. 9 shows a schematic view of an example visual rendering of the scroll page on the device input surface.

The scroll page 400 is not automatically scrolled during writing input. This allows users to have control of page position. However, automatic scrolling does occur when a user drags selected content near the top or bottom edges of the viewable area so as to allow dropping anywhere on the infinite page. That is, when selecting any type of content (text or objects), users may want to reposition that content anywhere else on the page including above or below the visible part of the page. In the example shown in FIG. 9, content 424 is selected (in a manner described later) and then dragged or pushed (with sequence display of the dragging) to move the selected content into automatic scroll areas 426 temporarily defined during selection and/or dragging/pushing close to the top or bottom edges of the viewable area 132. Once the content is dragged/pushed into the scroll areas 426, the scroll page 400 is scrolled with the scrolling speed bound to the drag position, i.e., the closer to the edge of the page 400 the faster the page scrolls. As long as content is not dropped, both top/bottom automatic scrolling areas are active to allow users to scroll in the opposite direction if scrolling went too far, for example. When content is dropped and the drag/push sequence ends, top/bottom automatic scrolling areas are disabled so that content input is re-enabled on the full viewable page.

The scroll page can be provided as either a constraint-free canvas that allows users to create object blocks (blocks of text, drawings, etc.) anywhere without worrying about sizing or alignment. However, in order to provide professionally formatted documents containing structured content, an alignment pattern may be defined onto which all content is to be aligned/defined (either at input or along user interaction). In one example of the present system and method, the alignment pattern is defined as responsive to the device size/orientation and is not itself displayed but used by the application 112 to define alignment of content elements. Various elements of an example alignment pattern 1000 are now described with reference to FIGS. 10 to 14.

The alignment pattern 1000 has left and right padding areas 1002 that prevent content from being input too close to the edges of the interface 104 of the device 100. The size of the padding areas 1002 is based on the text size related to the root element font size (rem), e.g., the font size of the <html> element. As with CSS styling (see, for example, https://developer.mozilla.org/en/docs/Web/CSS/length), the rem unit represents the default font size of the root element (e.g., one rem=16 pixels (px) for web browsers). The rem unit is considered as a responsive unit with text size being built on a modular scale for the responsive vertical rhythm unit (dp). The rem unit principle is that when the default font size for the root element is changed, all other properties inherit from this single change and all elements are adapted accordingly. However, as some browser applications may not support the rem unit, such layout can be achieved using the "em" unit instead. This definition of unit size is related with mobile device operating system (OS) Dynamic Type which implements the same behavior with other wording and variables (see, for example, https://developer.apple.com/library/ios/documentation/StringsTextFonts/Conceptual/TextAndWebiPhoneOS/CustomTextProcessing/CustomTextProcessing.html#//apple_ref/doc/uid/TP40009542-CH4-SW65).

Figure 10:
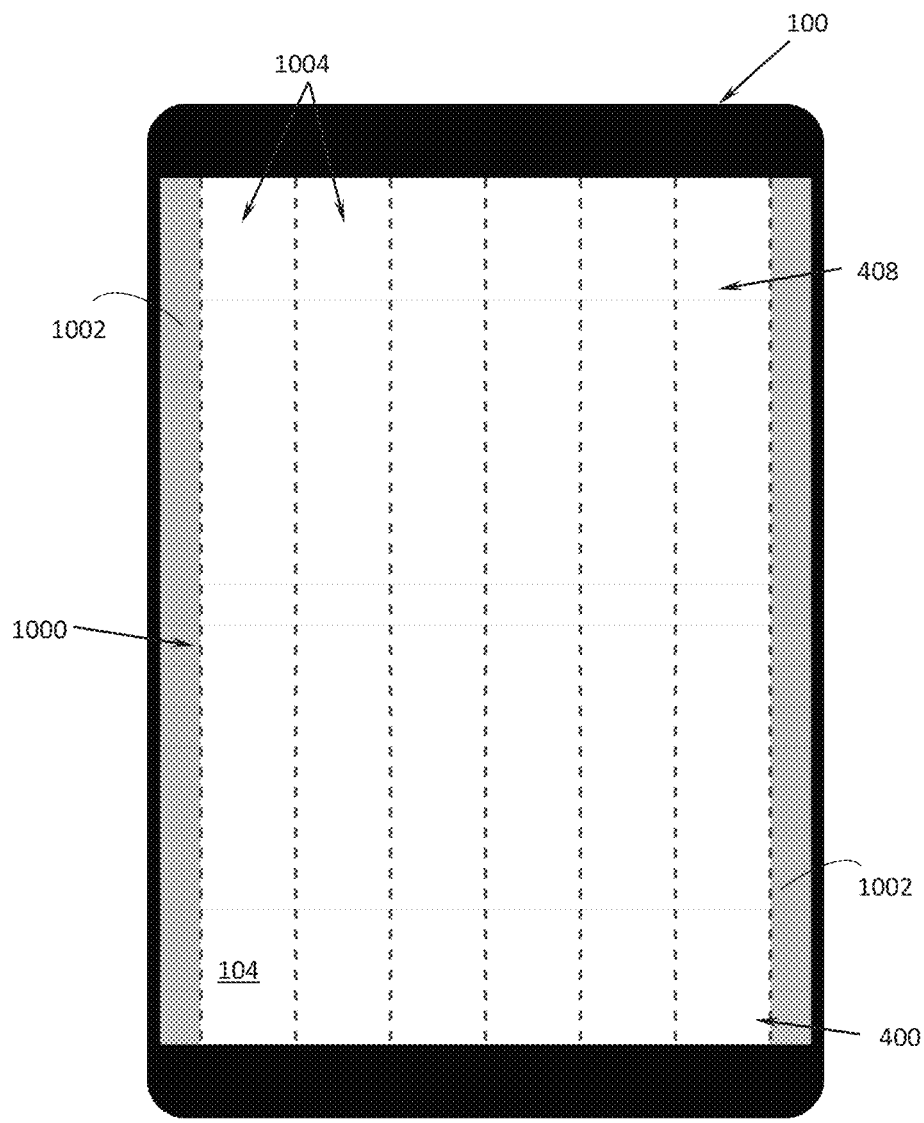
FIG. 10 shows a schematic view of an example of alignment elements of the scroll page.

The area between the padding areas 1002 defines the available horizontal space as the input area 408. The alignment pattern 1000 defines a variable number of columns 1004, which are all the same width and flexible to fill up the whole available horizontal space between the padding 1002 (shown divided with dashed lines). Accordingly, the input area 408 is equally divided into the columns 1004 as shown in FIG. 10. The columns define breakpoints as minimum application width values in dp, e.g., the screen width when the application 112 is provided in full-screen or just window width when reduced, such as on desktop/laptop, or split-screen on tablet.

Figure 11:
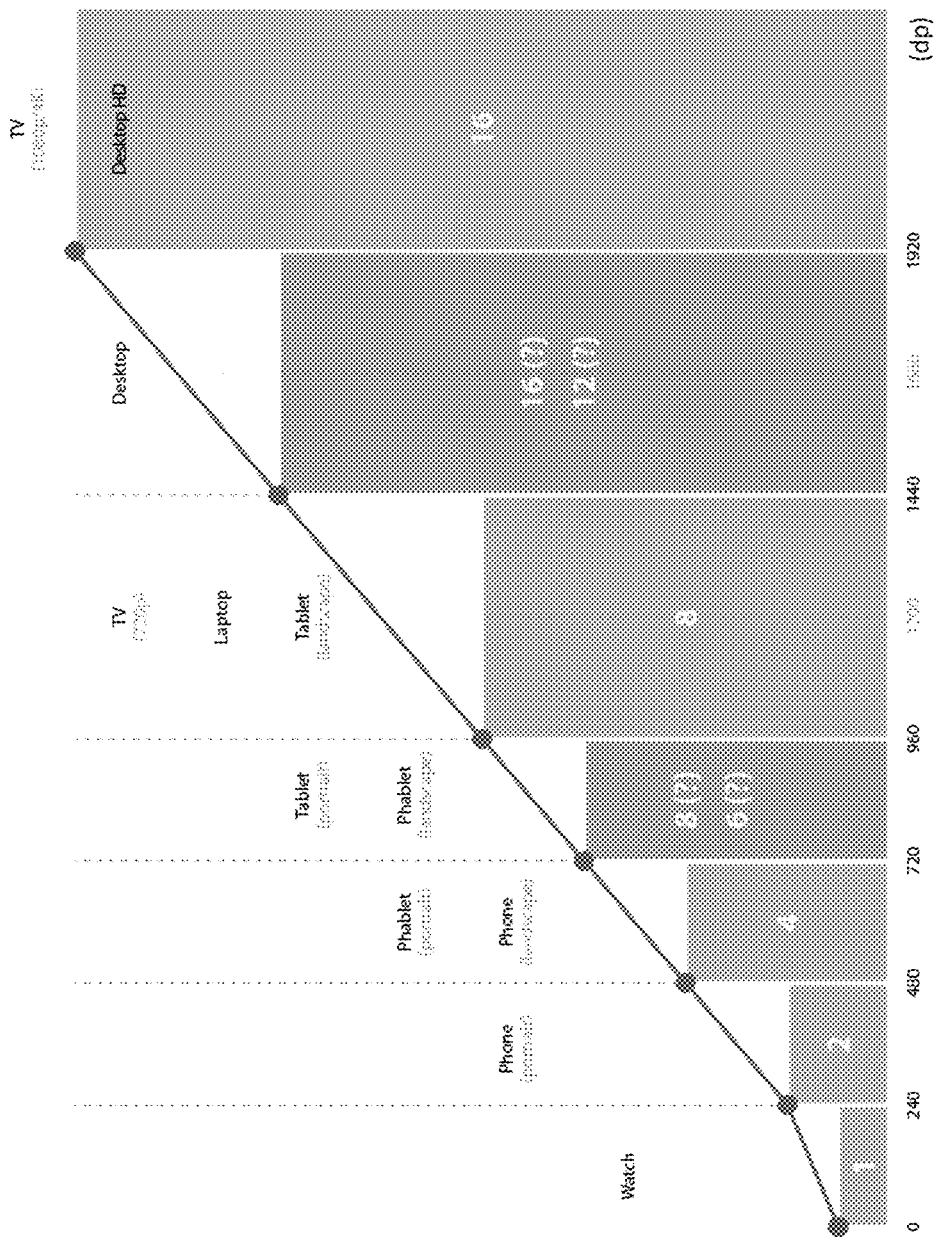
FIG. 11 shows a graph of different column counts of the alignment elements with respect to input surface size of different devices.
Figure 13:
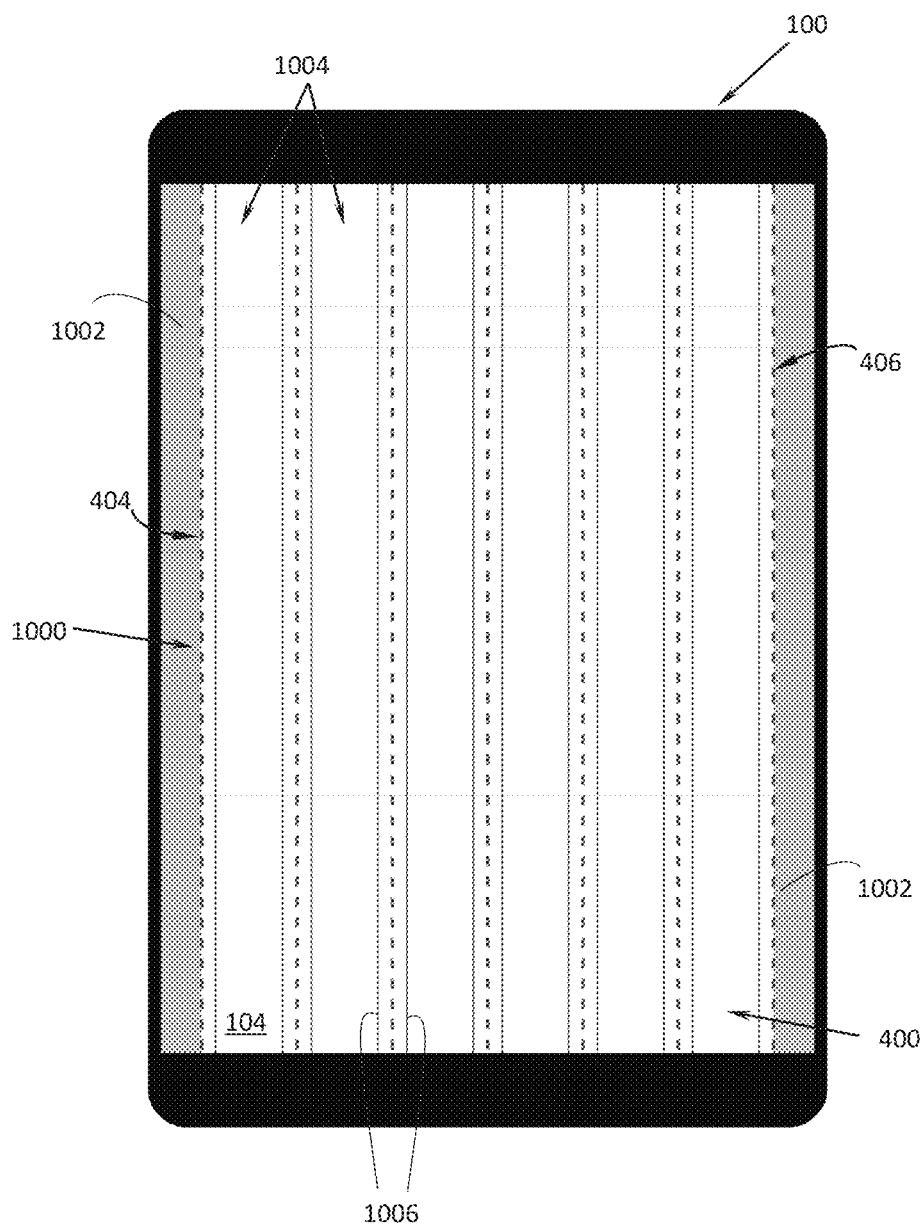
FIG. 13 shows a schematic view of an example of alignment elements of the scroll page.
Figure 14:
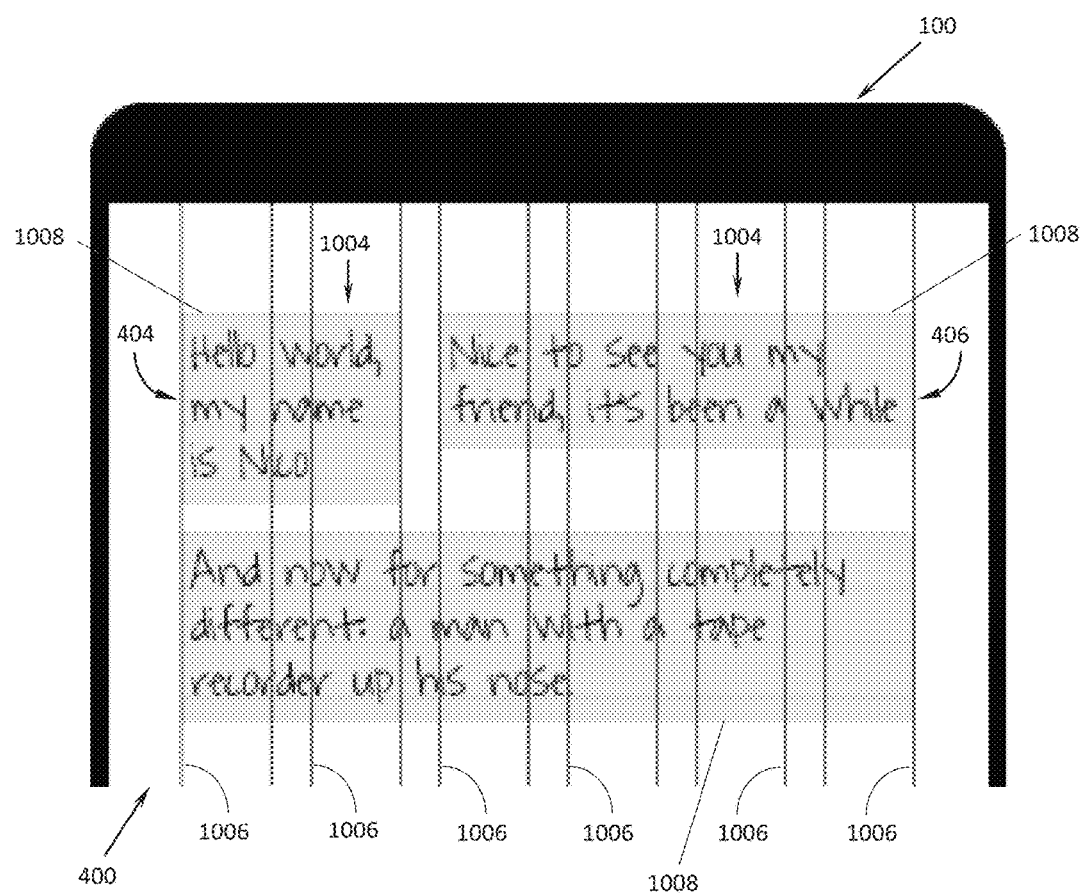
FIG. 14 shows a schematic view of an example visual rendering of the scroll page on a portion of the device input surface with the alignment elements.

Column sizing depends on the column count, so column width is defined by the percentage of the whole available horizontal space, that is the input area 408 (e.g., four columns=25%). The column count is provided so as to provide minimum content display within each column so that meaningful layout can be provided. FIG. 11 shows a graph of different column counts depending on the screen size of different devices. Certain device examples in accordance with this graph are (in full screen context):

iPhone® 6 (portrait)=375 dp=2 columns
Nexus 6 (landscape)=730 dp=6 (or 8) columns
iPad Air® (portrait)=768 dp=6 (or 8) columns
Surface® Pro 3 (landscape)=960 dp=8 columns
HP® Chromebook 14"=1366 dp=8 columns
Dell® Inspiron® 23"=1920 dp=16 columns The devices and column counts shown in FIG. 11 are merely illustrative of the concept of using columns to provide responsive layout display. The actual values may be different, such that more or less columns are used for any given device. For example, for large screen devices, such as big-screen televisions, electronic/interactive whiteboards, and large-screen touch monitors, the propensity of users to handwrite using larger character sizes may be accommodated by using a lower column count than illustrated in FIG. 11, and for small screen devices, such as smartphones, the ability of users to handwrite using small character sizes due to precise stylus use may be accommodated by using a higher column count than illustrated in FIG. 11. When changing window size or rotating the device, the alignment pattern adds or retrieves columns along which content has to adapt and align/snap to new columns (described later). Various column-wide blocks are adapted using the rules detailed in FIGS. 12A and 12B.

The alignment pattern 1000 further has a gutter space 1006 (shown in FIG. 13) defined about vertical boundaries of each column 1004 on both the left and right edges so as to prevent object blocks from being positioned too close to each other. Like the other elements of the alignment pattern, the gutters 1006 are defined relative to the rem unit and define actual guides onto which layout of object blocks 1008 is performed (see FIG. 14). Alternatively, as with the margins, the gutter width may be defined based on a percentage of the width of the interface 104 of the device 100 rather than by the vertical rhythm unit. In this way, the relative size of the gutters is defined independent of the orientation of the device 100 and/or display 102. This means that all object blocks are aligned/snapped onto the gutter edges and not column edges themselves and the UI page margins 404, 406 are positioned onto the leftmost and rightmost column gutters (see FIGS. 13 and 14). In this way, the alignment pattern elements are all defined using a text-related unit since the layout spacing depends on text size. The gutters could be omitted if desired and absolute column boundaries used instead.

As explained previously, the metrics used are based on both the input area 408 width and the rem unit for responsive sizing. These different metrics are related as shown in Table 2.

TABLE 2

| Minimum width (dp) | No. of columns | Column width (% of input area width) | Margin width (rem) | Gutter width (rem) |
|---|---|---|---|---|
| 0 | 1 | 100 | 0 | 0.75 |
| 240 | 2 | 50 | 1.5 | 0.75 |
| 480 | 4 | 25 | 1.5 | 0.75 |
| 720 | 6 | 16.66666667 | 2.25 | 0.75 |
| 960 | 8 | 12.5 | 2.25 | 0.75 |
| 1440 | 12 | 8.33333333 | 3.0 | 1.0 |
| 1920 | 16 | 6.25 | 4.0 | 1.0 |

Alternatively, in examples where all metrics are based on the application UI width, e.g., the margin and gutter widths, and the input area 408 width, e.g., the column width, for responsive sizing, the different metrics are related as shown in Table 3, for example. In Table 3, the upper percentage value of each range of percentage values for the margin and gutter widths is defined by the corresponding dp width value of the lower percentage value of the next highest margin and gutter width. For example, for a 240 dp UI application width, the upper percentage value of 12.5% for the margin width corresponds to 30 dp, which is the corresponding dp value to provide the lower percentage value of 6.25% for the margin width for a 480 dp UI application width.

TABLE 3

| Minimum width (dp) | No. of columns | Column width (% of input area width) | Margin width (% of UI width) | Gutter width (% of UI width) |
|---|---|---|---|---|
| 0 | 1 | 100 | 6.25 | 3.125 |
| 240 | 2 | 50 | 6.25-12.5 | 3.125-6.25 |
| 480 | 4 | 25 | 6.25-9.375 | 3.125-4.687 |
| 720 | 6 | 25 | 6.25-8.33 | 3.125-4.166 |
| 960 | 8 | 12.5 | 6.25-9.375 | 3.125-4.687 |
| 1440 | 16 | 6.25 | 6.25-8.33 | 3.125-4.166 |
| 1920 | 16 | 6.25 | 6.25 | 3.125 |

As mentioned earlier, snap-to-pattern behavior is used for object block alignment. Vertical snap is handled through reference to the line pattern 410 in two ways, either by making sure that all object block heights are integer multiples of the LPU or at least the top boundary of each block is aligned with the next available line of the line pattern background 410. In the former case, whatever the user interaction (e.g., new, edited, moved, resized), all object blocks are always LPU-rounded and positioned according to vertical LPU (e.g., top and bottom boundaries are aligned with the line pattern background 410). Either way a LPU portion of a snap-to-grid mechanism is provided. For horizontal snap, whatever the user interaction (e.g., new, edited, moved, resized), left and right boundaries of all object blocks stay aligned with the columns 1004 (or gutters 1006) in any case. This provides a layout portion of the snap-to-grid mechanism. Accordingly, the vertical and horizontal snap operations provide vertical alignment and horizontal alignment to the LPU (vertical) and layout (horizontal) grid.

Alternatively, in order to provide fluid interaction and let users feel that they are in control of the layout, any move/resize of an object block may be updated in real-time and aligned with current touch or hover position during the interaction (i.e., not aligned or snapped with the LPU and layout grid). For instance, during block resize (detailed later) object block boundaries are updated with exact touch or hover position even though it might be in the middle of a column/line.

Besides updating other surrounding elements in real-time to preview the overall result, users should have a visual feedback indicating what layout will become once an object is snapped onto the LPU and layout grid. One possible feedback would be to display a darkened/colored snapped-to-grid overlay beneath the interacted block during interaction. Once a user stops interacting with an object block, all block boundaries are snapped to the LPU and layout grid with a swift animation. When writing, text appears substantially where the finger or stylus is in relation to the device interface so as to preserve the free writing experience for the user. However, paragraph boundaries are aligned with the LPU and layout grid no matter what (discussed in more detail later). For example, the left boundary of the paragraph is aligned with closest left gutter 1006 and the right boundary of the paragraph is aligned with closest right gutter 1006. Further, in order to assist users' perception of appropriate spacing display of the line pattern background within the gutters of at least a current input column may be omitted during input. For example, during input in the second column of a four column grid, the line pattern background is omitted/masked in the left and right gutters of the second column, and may further be omitted/masked in the right gutter of the first column and the left column of the third column. Internal paragraph features, such as indentations (e.g., text horizontally offset from paragraph left origin for left-to-right written languages) may either be aligned with the columns or stored as a property, for example in the memory 108, for each line of the paragraph unrelated with LPU and layout grid sizing.

Certain example operations involving object block creation and management are now described with reference to FIGS. 15 to 24. The examples shown in these drawings are in a left-to-right written language context, and therefore any reference to positions can be adapted for written languages having different directional formats. In each of FIGS. 15 to 24 part of the scroll page 400 is shown in schematic form as depicted in the viewable area of the device interface. The scroll page 400 is shown with the LPU and layout grid 1500 configured from the line pattern background 410, as horizontal lines 1502 of the grid 1500, and the alignment pattern 1000, defined by vertical lines 1504 of the grid 1500 which divide the page 400 into a number of columns 1004, e.g., six columns in all the drawings (except FIGS. 22B and 24 in which three columns are depicted). The top padding and margins of the scroll page, and the padding areas and column gutters of the alignment pattern are omitted in the drawings (except in FIG. 22) for ease of description. Accordingly, except in FIG. 22, the layout elements described are shown aligned to the vertical lines 1504 of the grid 1500 rather than the column gutters. As described earlier, the alignment grid itself is not displayed to users and acts as an invisible guide for the management of the layout of object blocks for the application 112, however the line pattern background 410 may be displayed to users to provide guidance on writing size and placement.

The layout management employed by the present system and method handles the way object blocks are defined and can be manipulated by users generally through use of simple gestures. This is done in a way that lets users feel they are in control of the layout, such that there are limited automatic behaviors and some flexibility is provided for users to position the content as desired. As the digital note taking application 112 is primarily for the handwritten capture of notes, the main object block can be considered to be a paragraph of text or a text block, with sub-elements being line breaks and alinea (i.e., subsets of paragraphs between two line breaks). The management of paragraphs includes the ability for users to create multiple paragraphs, split paragraphs, merge paragraphs, remove content in a paragraph, move paragraphs and resize paragraphs. Other object blocks that can be created and need to be managed, particularly in relation to the text blocks, include content such as images, drawings and equations.

The layout management provides the ability to create the different object blocks in a desired layout and perform operations on the separate object blocks, such as:
block insertion or drag/push & drop (where there is empty room) to right or left of a block/paragraph
block insertion or drag/push & drop (where there is empty room) below or above a block/paragraph
insertion inside a paragraph (inline)
insertion in between paragraphs.

Figure 15:
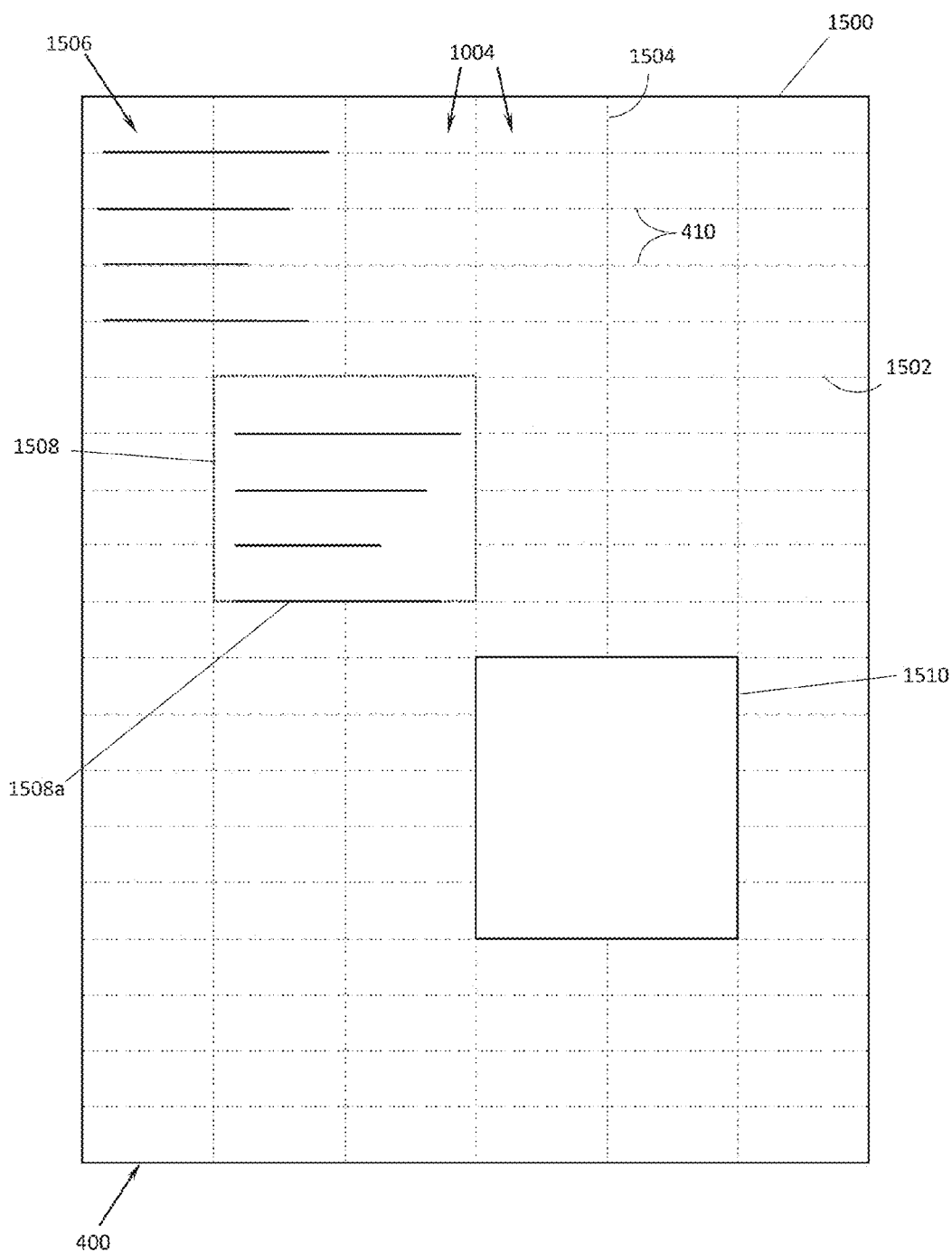
FIG. 15 shows a schematic view of part of the scroll page with example input content object blocks.

In FIG. 15 a first paragraph is shown as a margin-aligned paragraph 1506, which is aligned to the left-most or first vertical line 1504 of the grid 1500 and spans four of the horizontal lines 1502 of the grid 1500, or four LPUs. The paragraph contains handwritten text depicted as solid horizontal lines. A second paragraph is shown as a floating text block 1508, which is aligned to the second vertical line 1504 of the grid 1500 and spans four LPUs. The snapped-to-grid extent of the floating text block 1508 is shown by the dashed boundary 1508a, inside of which the grid pattern is suppressed for clarity. The concepts of 'margin-aligned' and 'floating' in the context of the present example scroll page 400 are provided to distinguish those blocks which are aligned to a margin of the page, such as paragraphs of text that are left- or right-aligned on a page of a document editor application, and those blocks which are freely (with constraint to the grid) positioned relative to the margins. As shown the text of the paragraphs 1506, 1508 itself is not snapped to the grid so that the user does not gain the feeling that their control is lost. The actual input position of the text within the paragraph is provided by defining and storing, for example in the memory 108, the text indentation which is a property of each line of a paragraph corresponding to the distance between the start of the content and the closest column on the left of the paragraph.

Another floating block 1510 is shown which is aligned to the fourth vertical line 1504 of the grid 1500 and spans five LPUs. The floating block 1510 may contain text or a drawing, image, diagram, equation, etc. Both aligned and floating blocks are anchored to a part or section of the scroll page, with the margin-aligned blocks being further anchored to the margin, and move vertically with it as the page is scrolled. If the block is moved (i.e., selected to be dropped somewhere else), it is associated to the new part or section of the scroll page to which it is moved (described in detail later). It is noted that the boundaries of the illustrated blocks are those used by the present system and method to determine the extent of the input elements in relation to the alignment pattern and as such are not typically displayed by the application 112 to users. However, during editing operations, such as movement of blocks, etc., the boundaries may be displayed to assist users in proper placement of the elements relative to other elements of a layout.

Figure 16A:
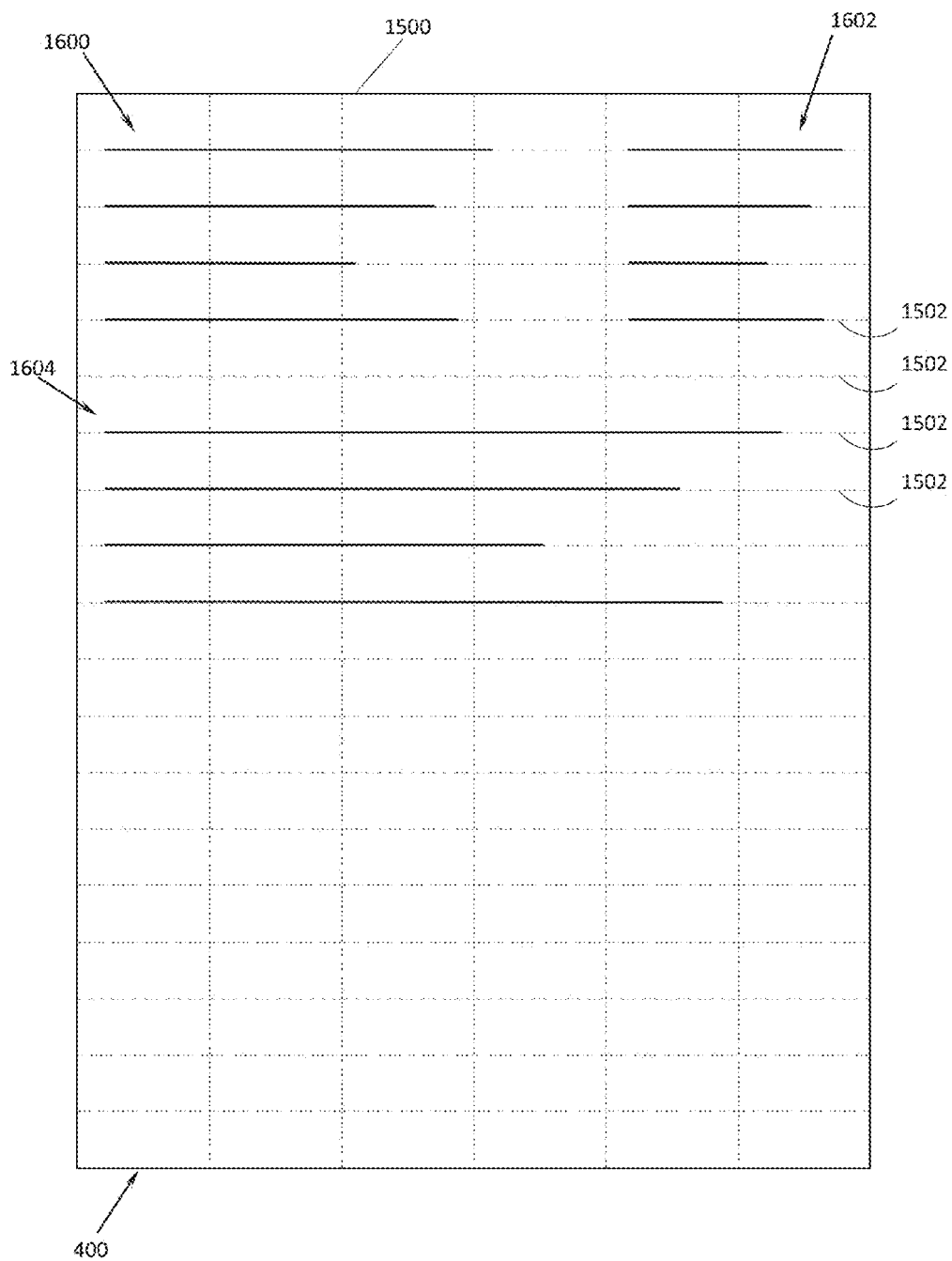
FIGS. 16A and 16B shows a schematic view of part of the scroll page with object blocks and example operations thereon.
Figure 16B:
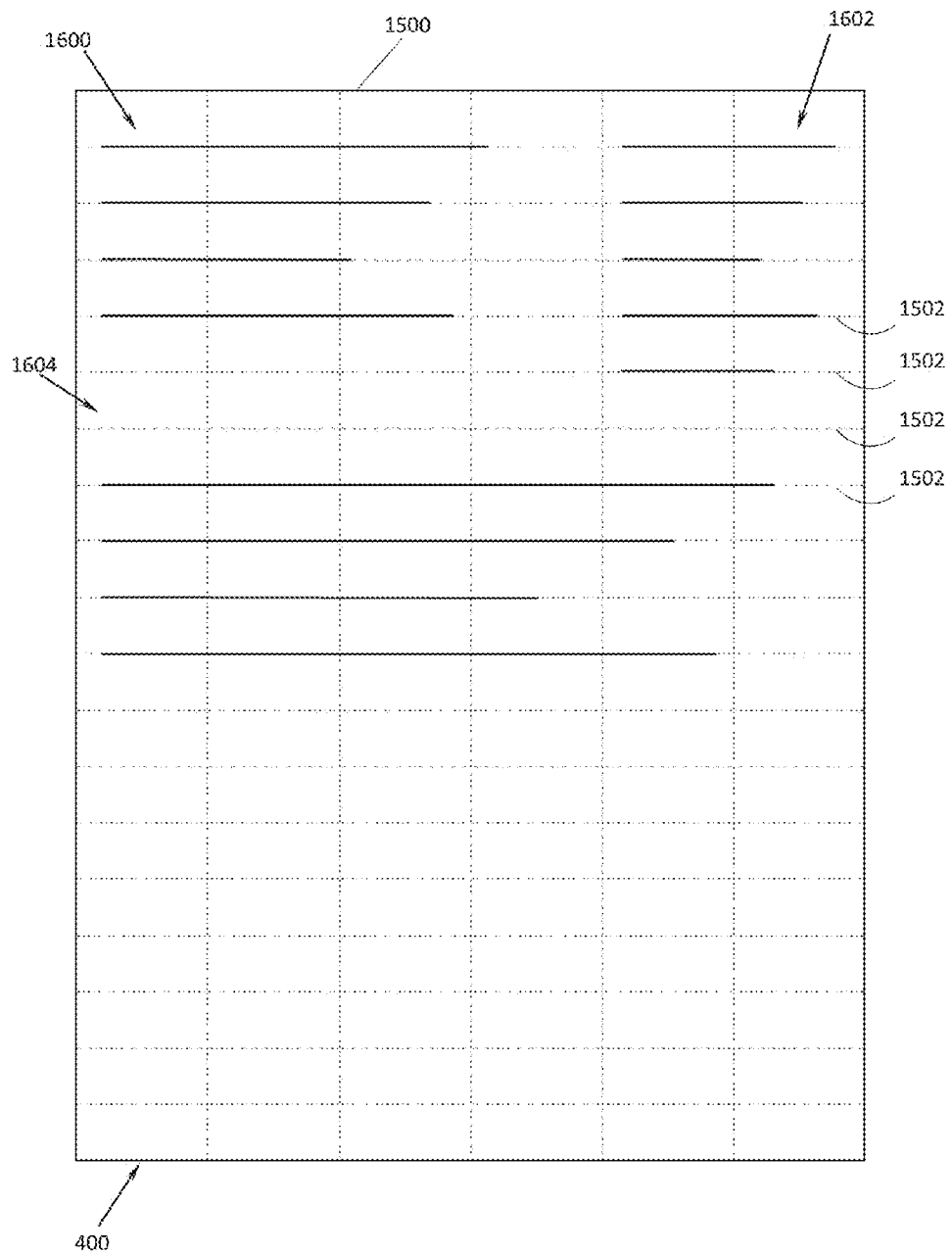

FIG. 16A shows several paragraphs residing in margin-aligned and floating blocks. In particular, a first paragraph 1600 has been created spanning four columns, followed by a second paragraph 1602 horizontally adjacent the first paragraph 1600 and spanning two columns, and a third paragraph 1604 vertically below both the paragraphs 1600 and 1602 and spanning all six columns. The use of blocks and the alignment grid allow content within blocks to be edited while retaining the relative layout of the blocks. For example, in FIG. 16B the user has added further text to the second paragraph 1602 on the next horizontal line 1502 of the alignment grid 1500, however since the paragraph 1604 is below the paragraph 1602 in the vertical flow of the scroll page 400, the lower paragraph 1604 is consequentially moved down to the next horizontal line 1502 of the alignment grid 1500 so as to retain the spacing of two LPUs between the paragraphs 1602 and 1604. Indeed, any content below is shifted down by the same amount so that relative layout is retained, since the user has not specifically changed those layouts. Accordingly, text written upstream in a block moves below content down if there is not enough space to expand the text block. This mechanism is the same as that of the extension of the scroll page 400 by the height of input content described earlier with reference to FIG. 6A, such that the content moved below is moved out of the viewable area 132 of the interface 104.

Figure 17A:
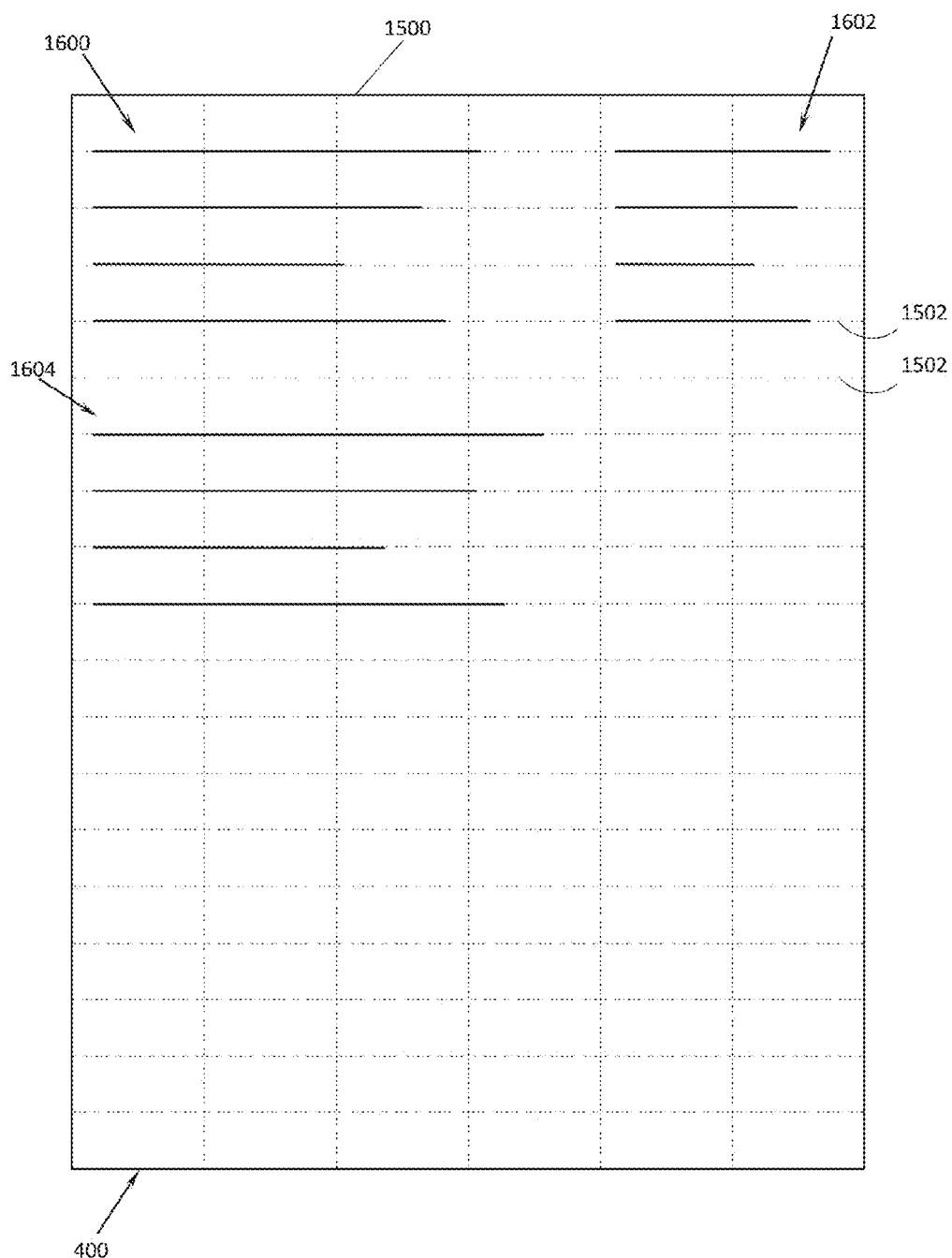
FIGS. 17A and 17B shows a schematic view of part of the scroll page with object blocks and example operations thereon.
Figure 17B:
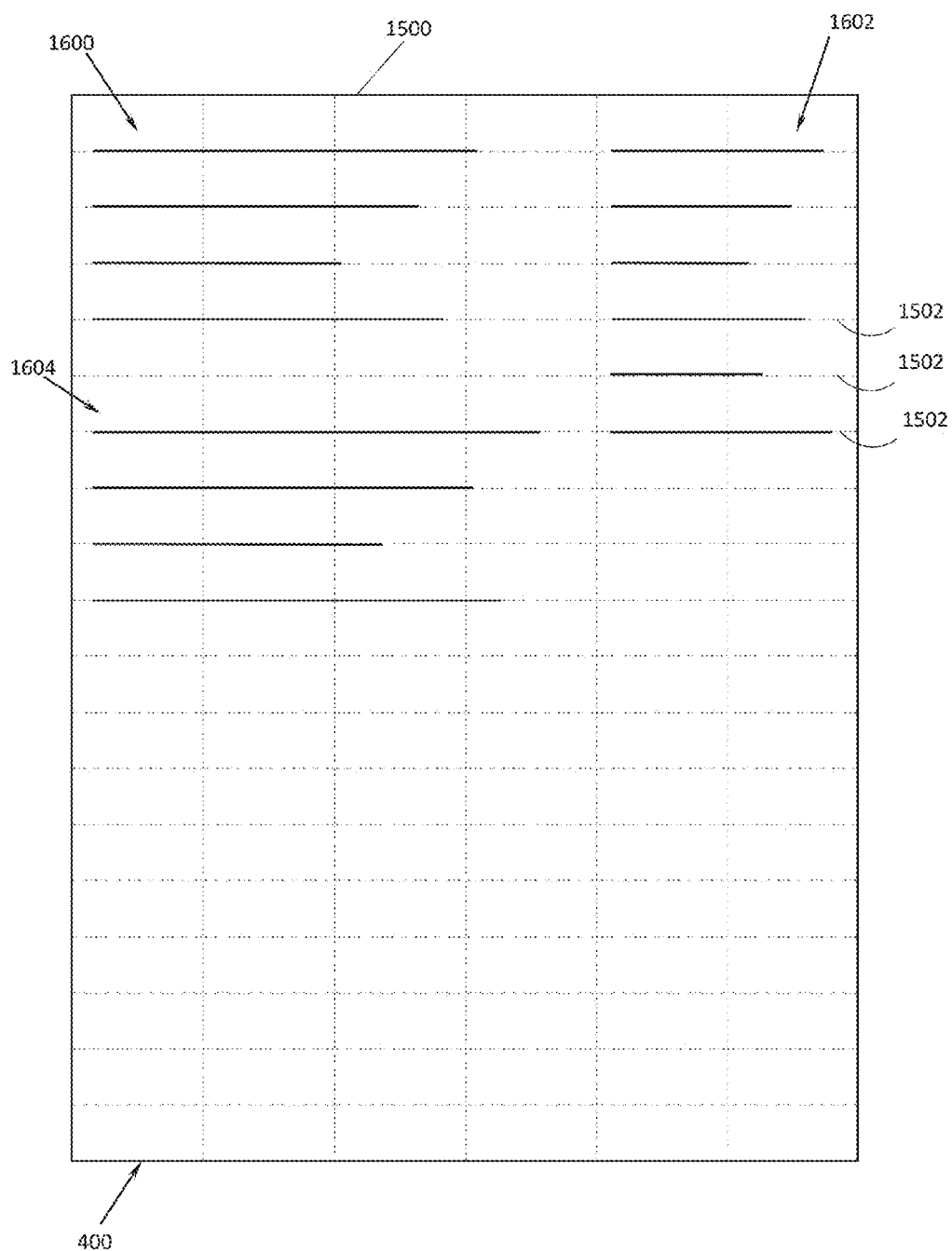

Alternatively, if there is enough space, then the text block will be expanded without movement of lower blocks. For example, FIG. 17A shows the paragraphs 1600, 1602 and 1604 but with the third paragraph 1604 only being vertically below the first paragraph 1600 and spanning only four columns. As such, as shown in FIG. 17B, when the user adds further text to the second paragraph 1602 on the next horizontal lines 1502 of the alignment grid 1500 the text block bounding the second paragraph 1602 can freely expand adjacent the lower paragraph 1604.

The operation of writing text upstream causing movement of the whole below content downwards if there is not sufficient layout space for that text is applicable to whatever content is below, i.e., text or non-text blocks. For example, in FIG. 18A a paragraph 1800 has been created and an object block 1802 (either text or non-text) has been created (or dropped) vertically below the paragraph 1800. In FIG. 18B the user has added further text to the paragraph 1800 on the last text line carrying onto the next horizontal line 1502 of the alignment grid 1500. However, since the block 1802 is below the paragraph 1800 in the vertical flow of the scroll page 400, the block 1802 is consequentially moved down to the next horizontal line 1502 of the alignment grid 1500 so as to retain the spacing of three LPUs between the objects 1800 and 1802.

In the example of FIGS. 16 to 18, the text added to the existing paragraph (or being added during creation of the paragraph) is a continuation of the text of the paragraph onto the next line of the line pattern background 410, where either it is written directly on the next line or added to the existing last line of text and continued onto the next line. In either case, it is considered that the added text belongs to the existing paragraph since it is added to the immediate next line 410 in the vertical flow. Determination of the added text actually being part of a new paragraph could be made using the recognition stage 118 of the HWR system 114, particularly with reference to the offset of the text of the adjacent lines and their relationship to the left margin or aligned edge of the (existing) paragraph. However, the result of such recognition is not known by the user. That is, without some specific indication (such as, display of a paragraphing symbol or automatic shifting of the existing and/or new paragraph blocks, which may be too intrusive on the note taking process and therefore distracting for the user) misrecognition of separate paragraphs would not been known until some manipulation of the layout occurs (such as display of the note on a different device or in a different orientation) by which time context of the original input may be forgotten.

Accordingly, a simple constraint is placed on the input of separate paragraphs (and object blocks) in the vertical flow, in a manner which is easily understood and applied by users. This constraint is that there is always to be an empty line 410 between object blocks, e.g., a spacing of two LPUs, which overlap horizontally, e.g., overlap in at least one column 1004. This rule provides a way of cleanly maintaining relative layout between object blocks in the vertical flow of the scroll page 400 which can be applied to directly input content and dragged & dropped or pushed & dropped blocks.

Figure 18A:
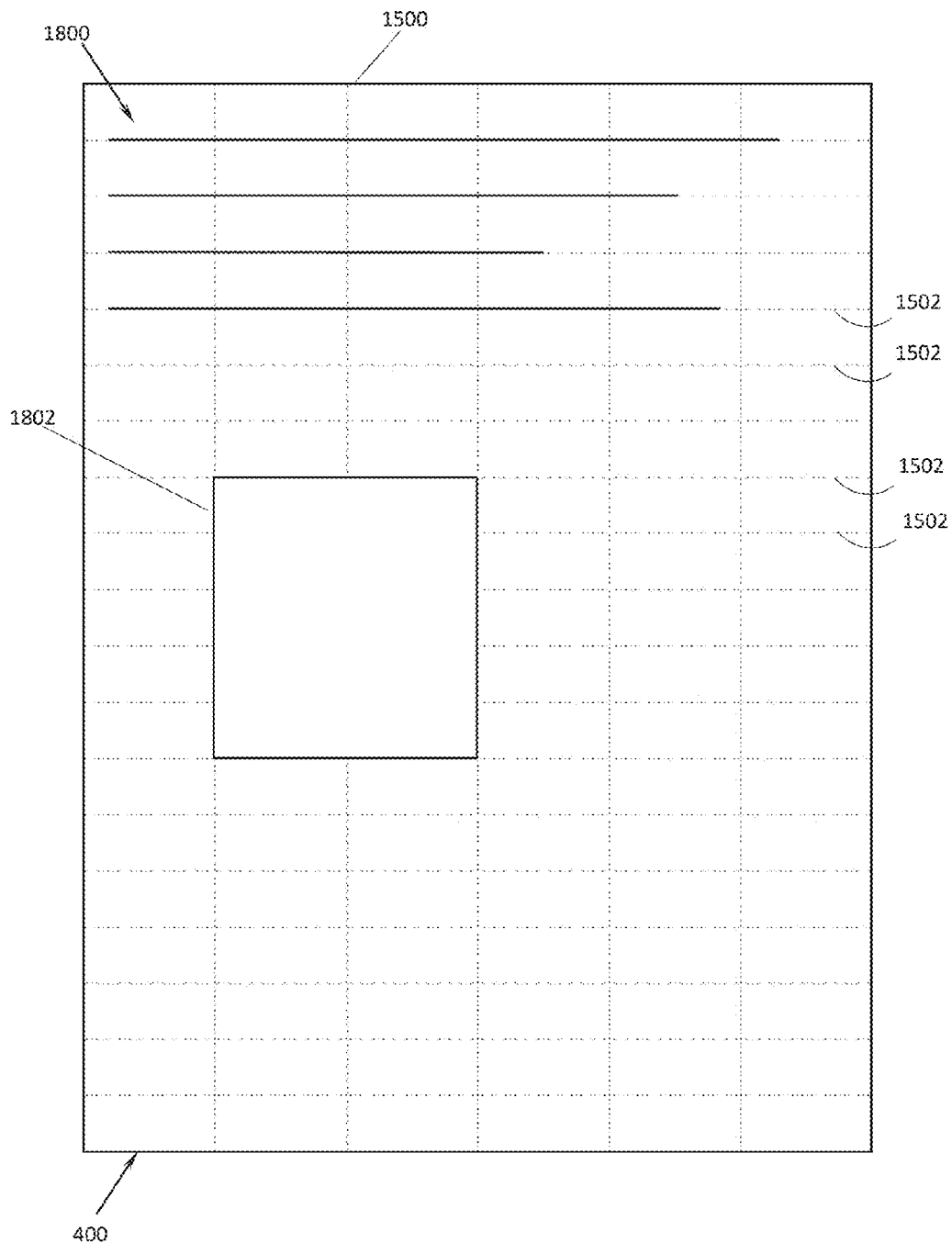
FIGS. 18A to 18E shows a schematic view of part of the scroll page with object blocks and example operations thereon.
Figure 18B:
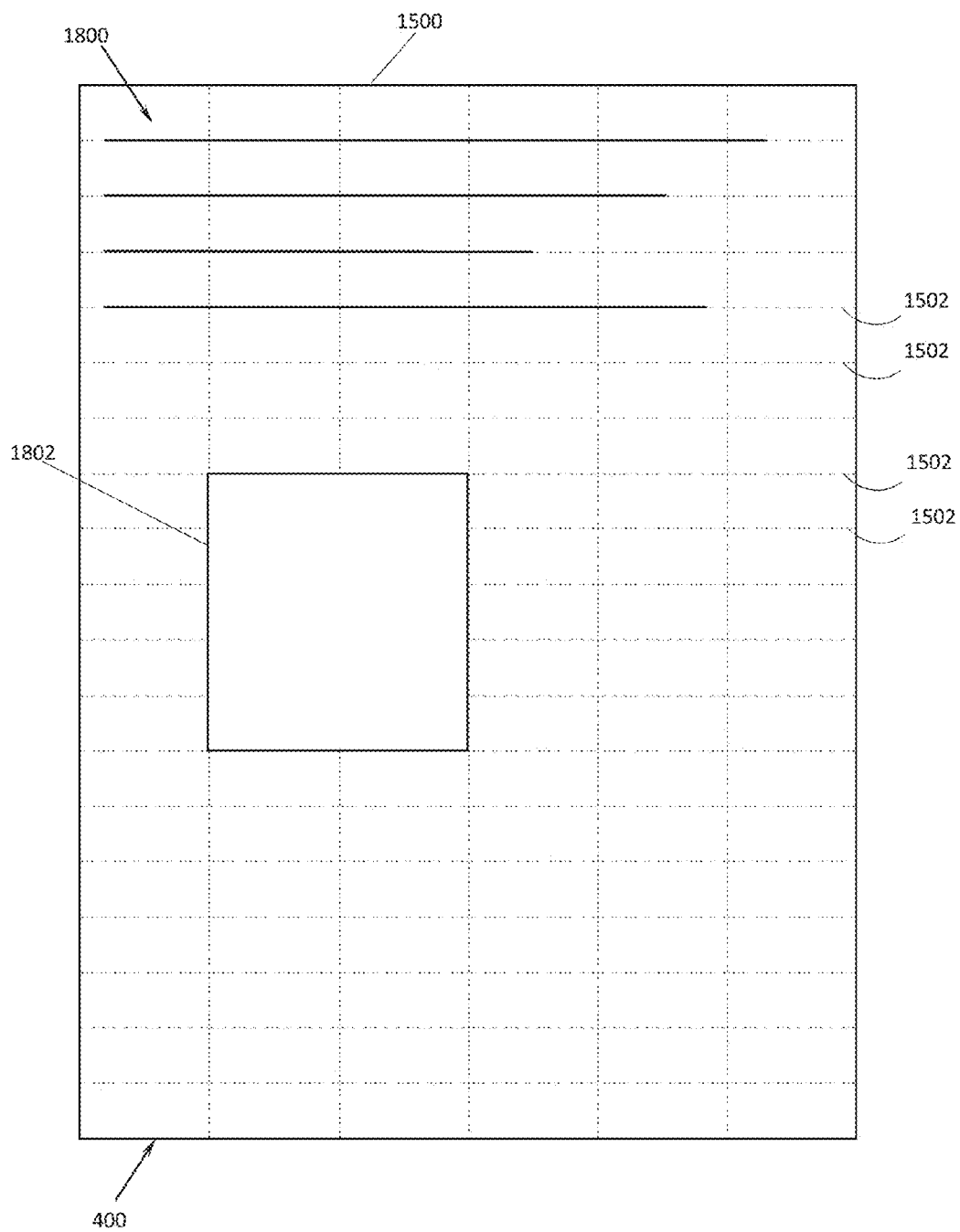
Figure 18C:
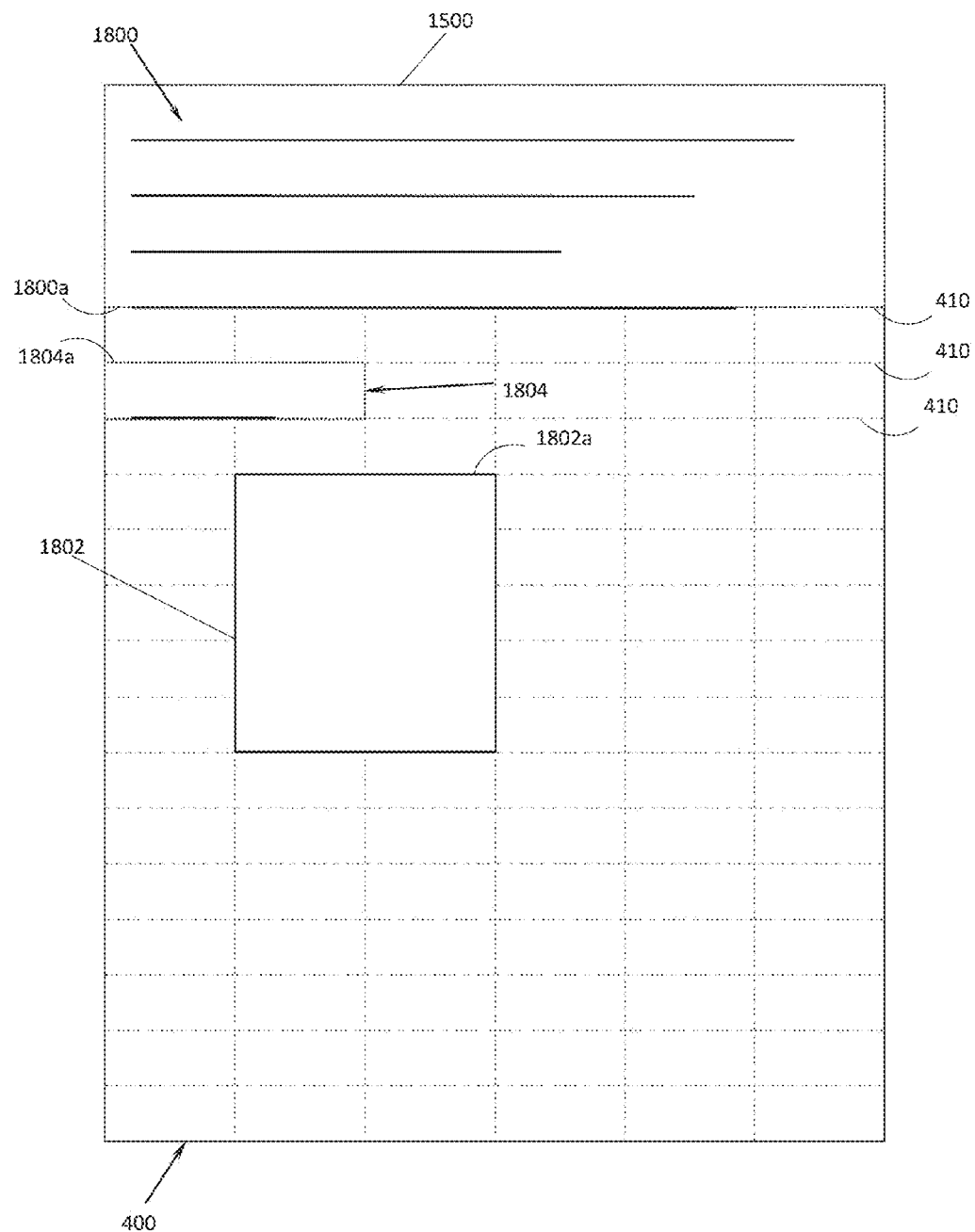

For example, in the operation described in relation to FIGS. 18A and 18B, the three LPU spacing between the paragraph 1800 and the block 1802 was maintained when vertical content was added to the paragraph 1800. Alternatively, because the spacing after addition of the extra content to the paragraph 1800 remains equal to or more than two LPUs, the block 1802 (and any other lower object blocks) need not be consequently moved. Accordingly, if space between new and existing content is larger than one line, nothing is moved downward in the vertical stream, letting the new content fill up available space. This is shown in the example of FIG. 18C where a paragraph 1806 is input two lines 410 below the last line 410 of the paragraph 1800 (e.g., the lower side of boundary 1800a of the block 1800 is spaced one LPU from the upper side of boundary 1804a of the block 1804, such that the text lines are two LPUs apart) and since there remains an empty line 410 between the new paragraph 1804 and the block 1802, the block 1802 is not moved (e.g., the lower side of the boundary 1804a of the block 1804 is spaced one LPU from the upper side of boundary 1802a of the block 1802, such that if the block 1802 is a text block the text lines are two LPUs apart). As such, this rule is more correctly defined as the text lines of text blocks must be spaced apart by two LPUs, meaning that vertically adjacent block boundaries can be spaced one LPU apart.

Figure 18D:
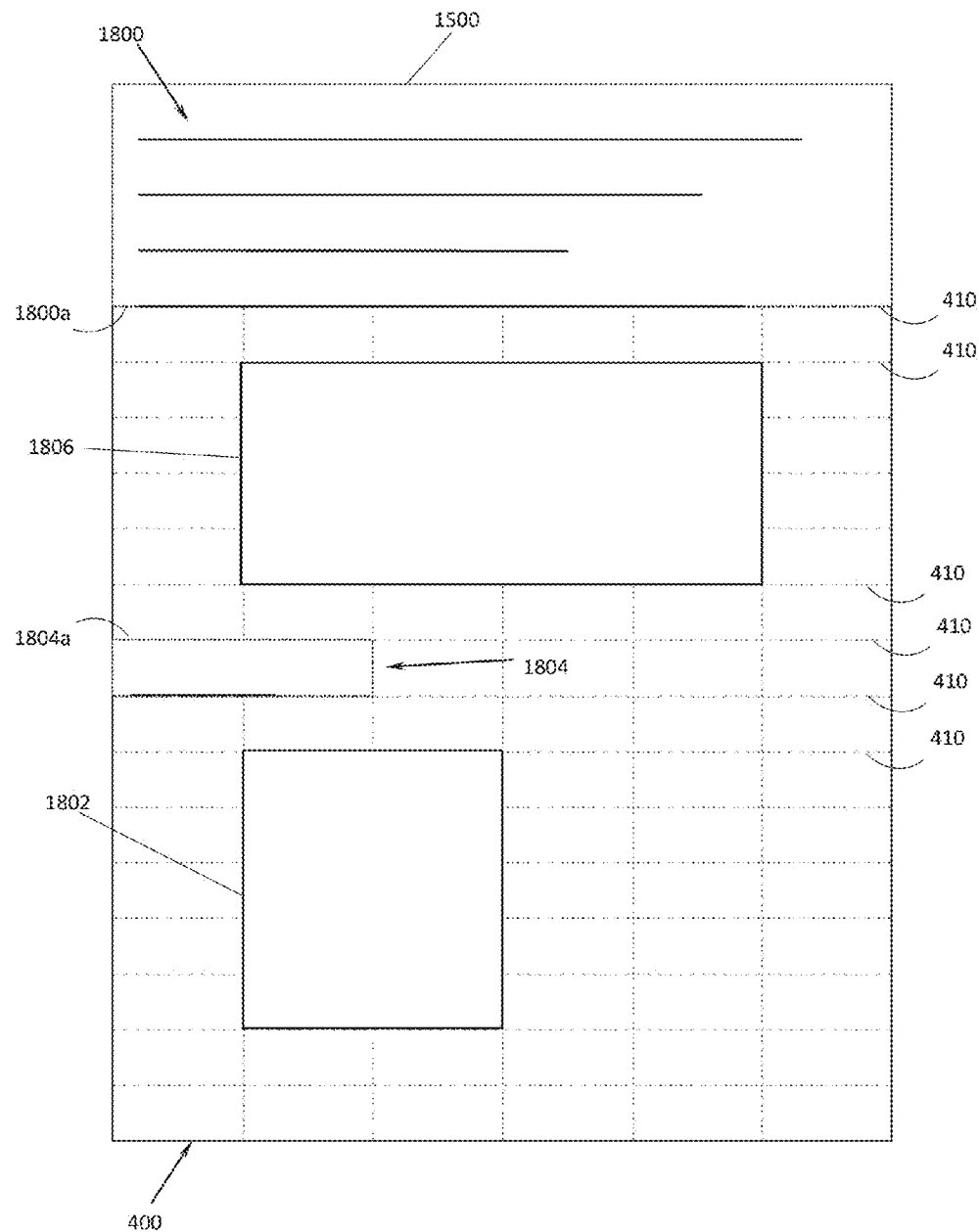
Figure 18E:
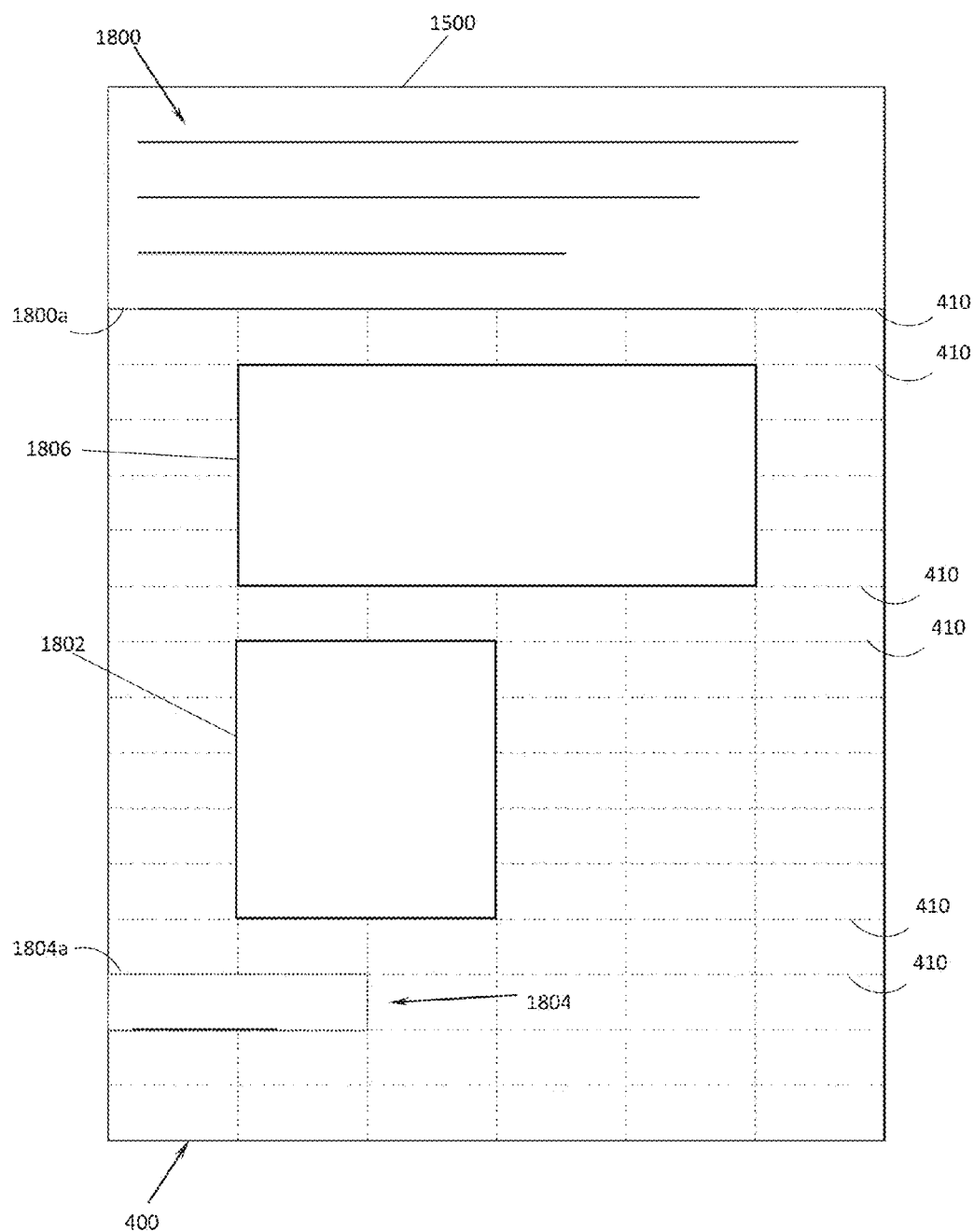

Whenever new content reaches existing content (leaving less than one empty line therebetween), the whole content below is moved one line down to reintroduce the one empty line spacing. Similarly, each time new content is written on an empty line between object blocks, the content below is moved one line down. Similarly, each time a block is added upstream on a new line the content below is moved down and there should always be a line above and below the block. An example of this is shown in FIG. 18D, in which an object block 1806 is dropped onto the line 410 below the paragraph 1800 (such that there is a spacing of one LPU therebetween) and the paragraph 1804 and the block 1802 are consequently moved down so that there is a spacing of one LPU between the new block 1806 and the paragraph 1804, with no relative layout change between the blocks 1802 and 1804. This example is further extended in FIG. 18E where the block 1802 is moved above the paragraph 1804 and dropped one LPU spacing below the block 1806 with consequential downward movement of the paragraph 1804 so that one LPU spacing remains between the lower side of the boundary 1802a of the block 1802 and the upper side of the boundary 1804a of the block 1804.

Figure 19A:
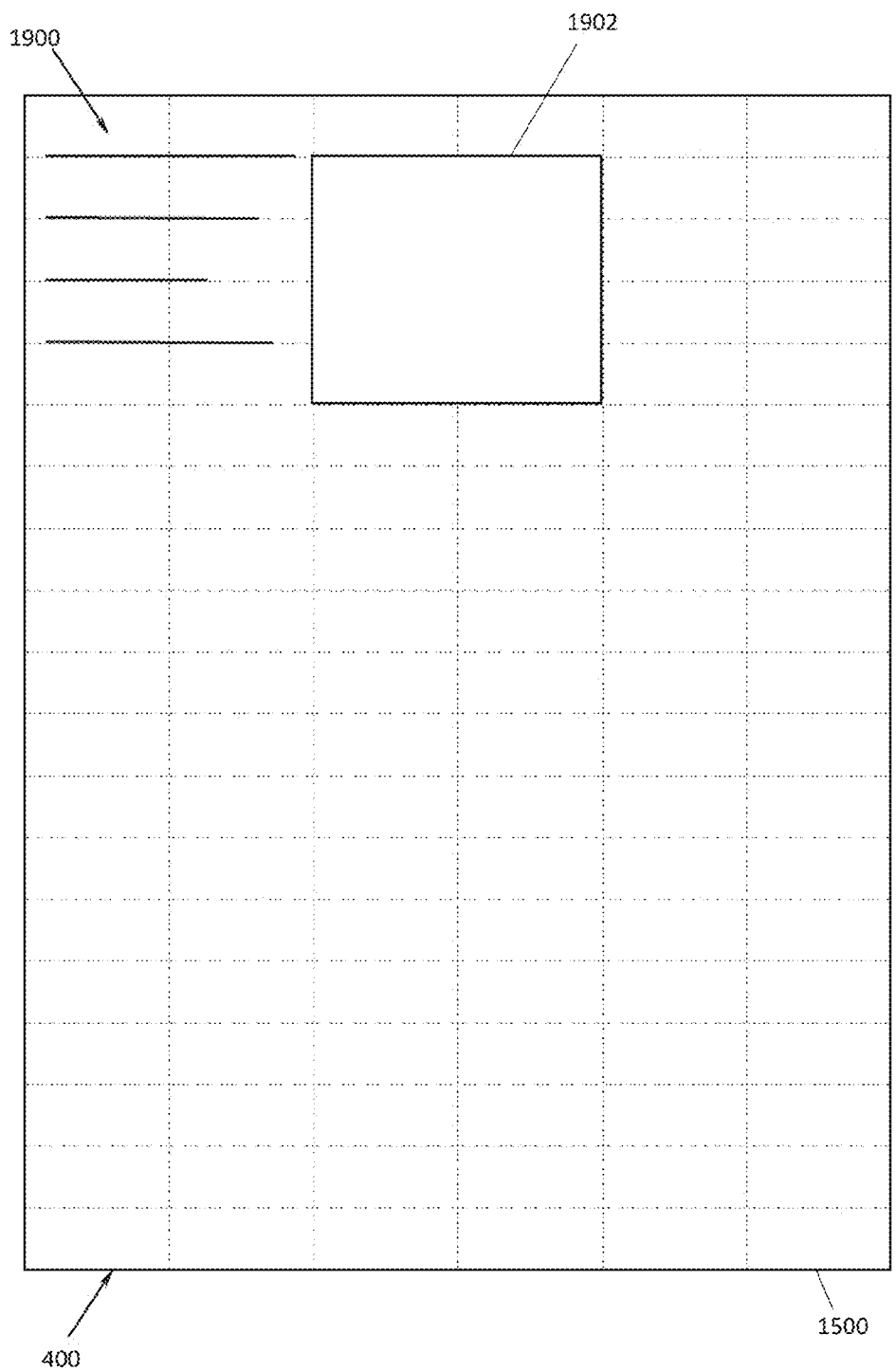
FIGS. 19A to 19C shows a schematic view of part of the scroll page with object blocks and example operations thereon.
Figure 19B:
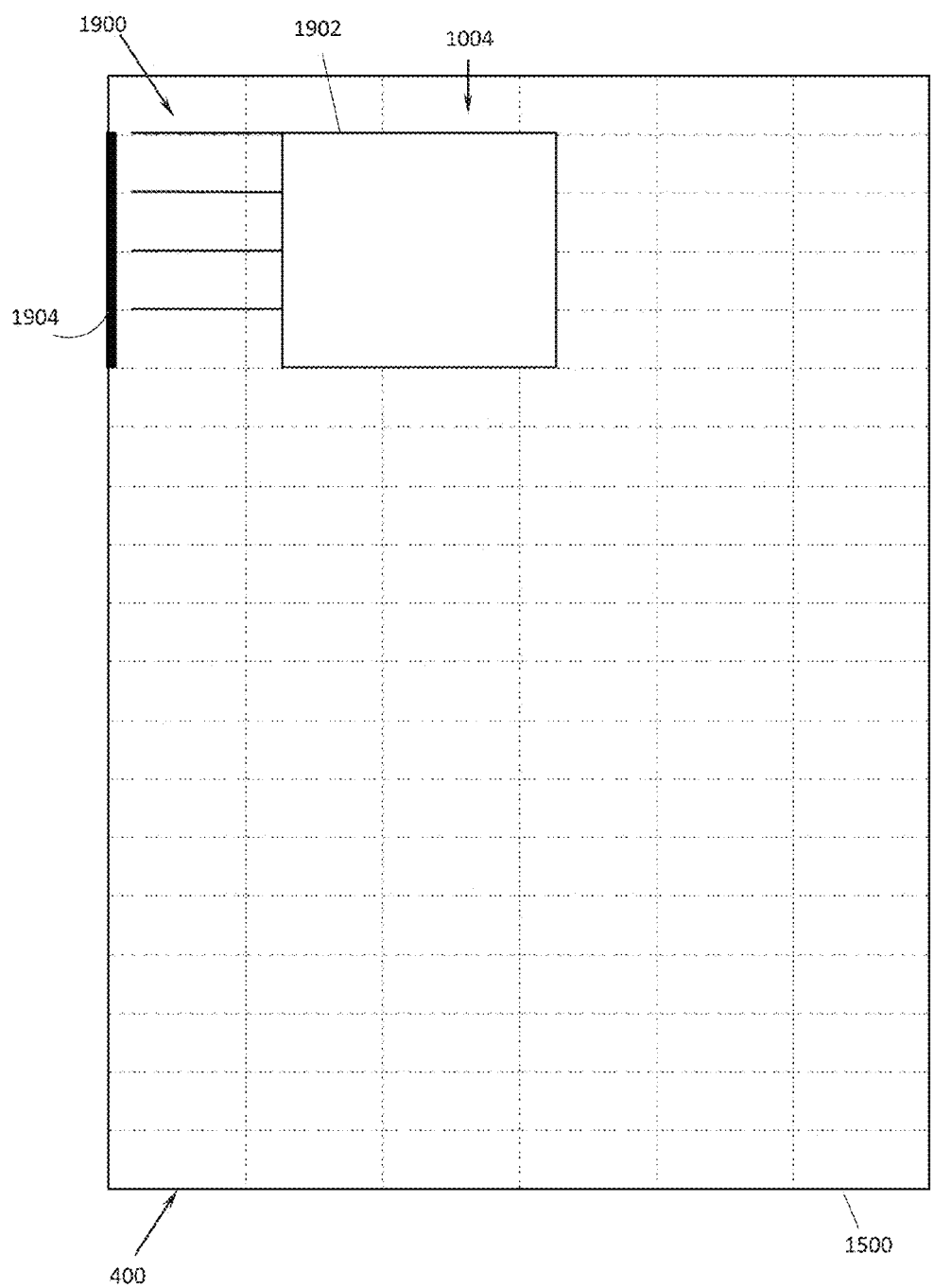
Figure 19C:
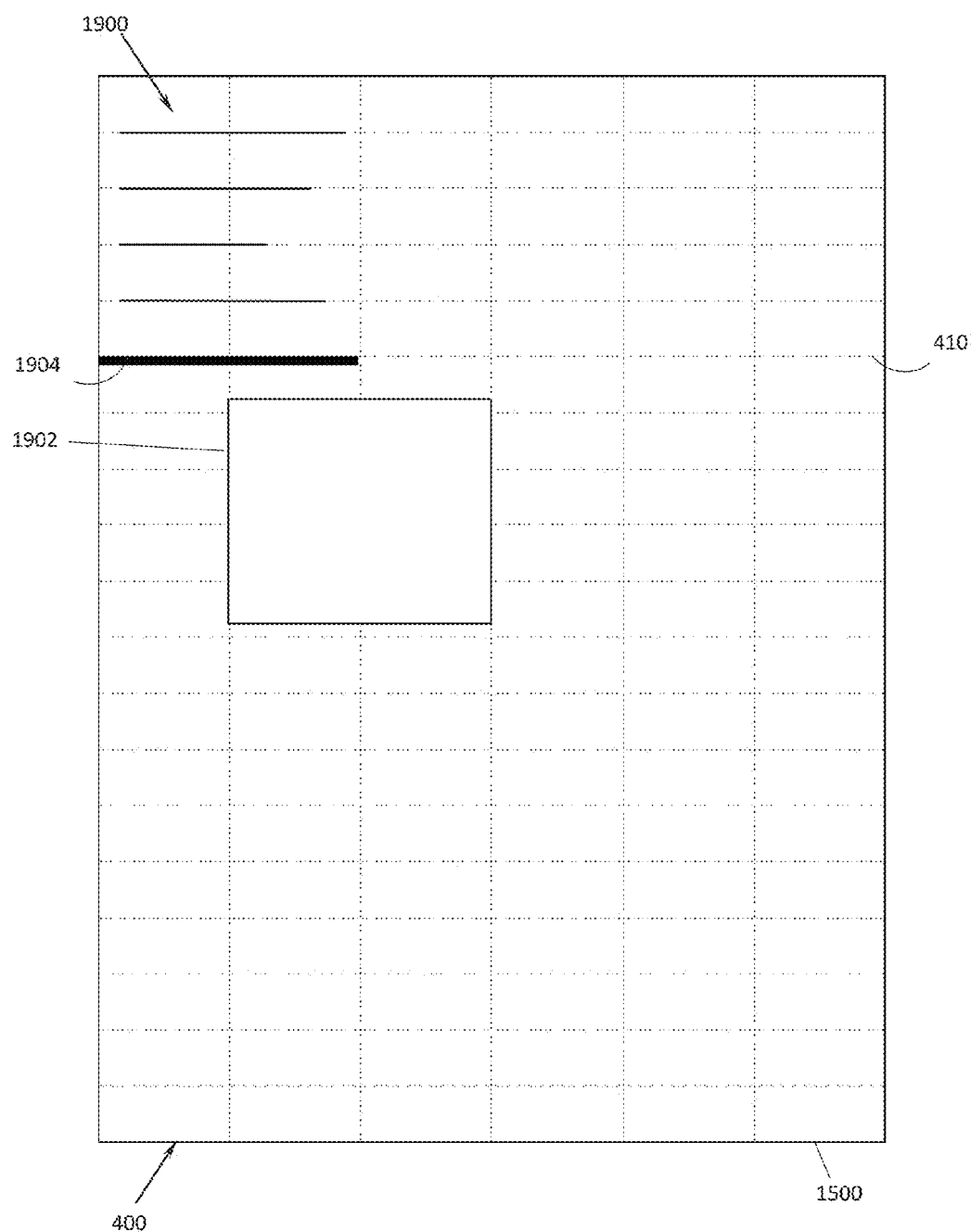

As described earlier, blocks can be dragged & dropped or pushed & dropped from their current position in the scroll page 400 to a new position, or resized, perhaps with consequential movement of other blocks and with guiding mechanism for users. For example, FIGS. 19A to 19C show an operation in which a paragraph 1900 and a non-text block 1902 (e.g., containing an image) are laid out and the non-text block 1902 is moved. The initial position of the block 1902 shown in FIG. 19A is horizontally adjacent the paragraph 1900. If the block 1902 is moved horizontally as shown in FIG. 19B from its initial position, during this movement a caret 1904 is displayed showing the next available horizontal position in which the block 1902 can be dropped, e.g., in the example shown the block 1092 has been moved over the paragraph 1900 and therefore the next available drop position is on the left margin where the caret 1904 is displayed. Dropping the block 1902 in this suggested position will cause consequential horizontal movement of the paragraph 1900 snapped to the next available column of the alignment grid 1500, e.g., the third column 1004. Similarly, if the block 1902 is moved vertically as shown in FIG. 19C from its initial position, during this movement the caret 1904 is displayed showing the next available vertical position in which the block 1902 can be dropped, e.g., in the example shown the block has been moved below the paragraph 1900 and therefore the next available drop position is on the line 410 below the paragraph 1900. Similar mechanisms can be used when resizing object blocks. By guiding users in this way, alignment of objects to other objects or to the alignment grid itself is provided as much as possible. Besides blocks, text selected in a paragraph can itself be inserted inside another paragraph by drag & drop (or other editing mechanisms such as push, copy, cut, paste) or if dropped in or pushed to empty space, a new text block is created with that text.

When moving existing content, the operations described earlier can be used with the corresponding consequential behavior of the layout. When creating new text content, such as a new paragraph, users simply need to handwrite on the next available line of the line pattern background, following the empty line between rule described earlier. When creating new non-text content, such as a drawing or equation, if users were to simply begin inputting the non-text content on the next available line for example, the HWR system 114 would be required to detect the input of the non-text content so that the handwriting recognition is not carried out on the new content. Alternatively, users can be provided with a mechanism to indicate that non-text content is to be input. Conventionally this has been done through menu selections or the use of specialized styli, such as a drawing pen versus a writing pen. The present system and method simplifies this indication by leveraging existing touch interface actions known to users.

That is, in order to input non-text content users merely double tap on empty space upon which the application automatically creates a block area or canvas in which the user can insert an image, drawing, diagram, equation, etc. In this way, a double tap on empty space is interpreted as the user desiring to create a block object which has a different context than just text. The application 112 can then use other recognition mechanisms to determine and recognize the actual content input, if handwritten, such as the systems and methods described in US Patent Application Publication US 2015/0228259, US Patent Application Publication No. 2016/0154998 filed Dec. 2, 2014 entitled "System and Method for Recognizing Geometric Shapes", and European Application No. 15290183.1 filed Jul. 10, 2015 and US Patent Application Publication No. 2017/0011262 filed Sep. 30, 2015 both entitled "System for Recognizing Multiple Object Input and Method and Product for Same", all assigned to the present Applicant and the entire contents of which are incorporated by reference herein.

Like the block management so far described herein, the generation of the non-text input canvas is performed in accordance with the alignment grid/pattern. That is, when the page 400 in the viewable area 132 of the interface 104 is empty, the generated canvas takes all the available space in the viewable area 132. Alternatively, when the canvas is to be generated horizontally next to an object block, the generated canvas takes the available width to the corresponding margin/padding area and aligns to the height of the existing object block. Further, if there is content above the to-be-generated canvas, the generated canvas takes the available space below the existing block and an empty line is left between the existing block and the canvas (e.g., a spacing of one LPU so that it is not included in the content above. Further still, if there is content above and below the to-be-generated canvas, the generated canvas takes the available full width of the scroll page and the available height between the existing blocks with an empty line left above and below the canvas relative to the existing blocks (e.g., a spacing of one LPU top and bottom) so that it is not included in the existing content. FIGS. 20 and 21 show examples of two of these operations.

Figure 20A:
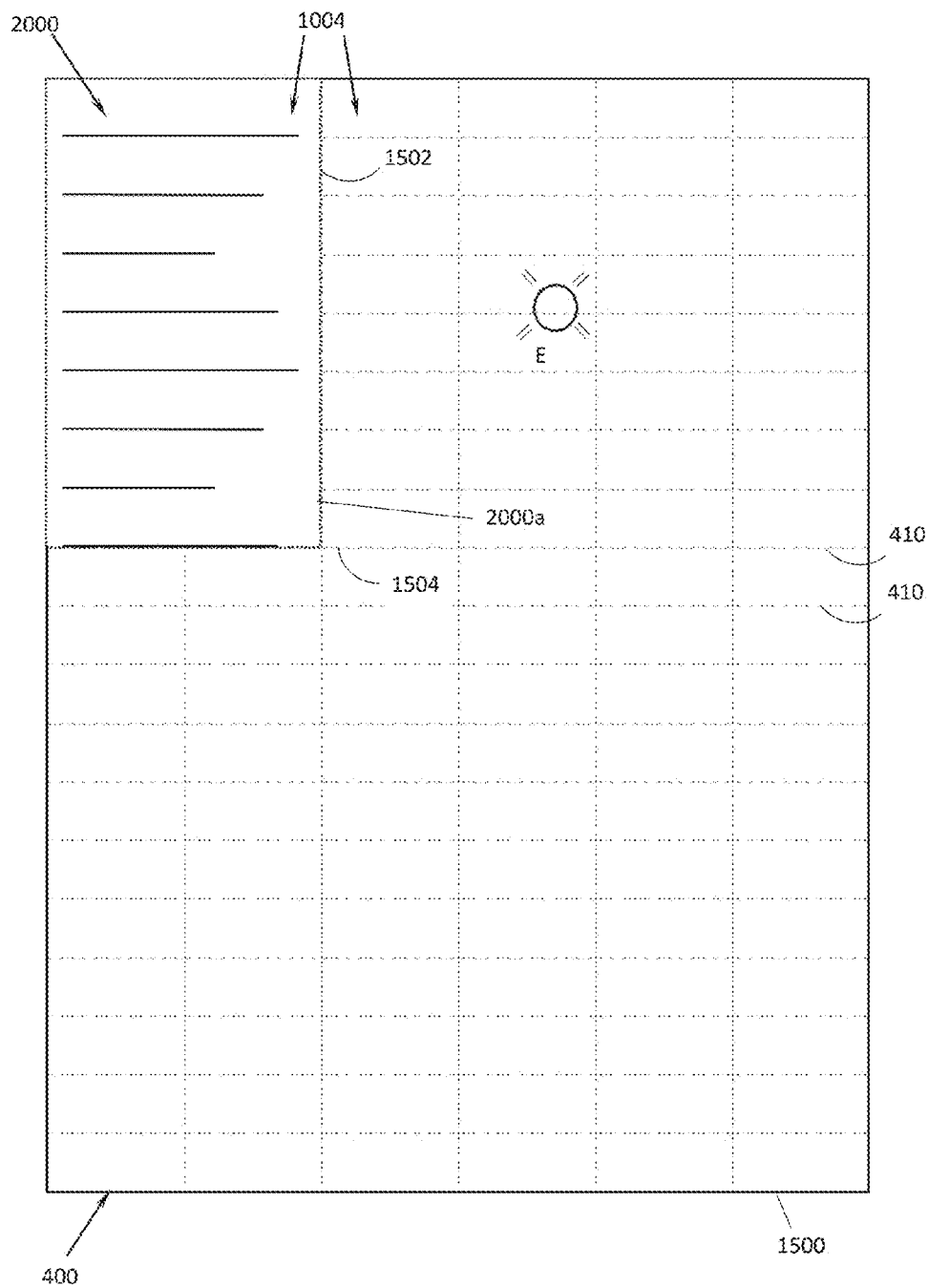
FIGS. 20A and 20B shows a schematic view of part of the scroll page with object blocks and example operations thereon.
Figure 20B:
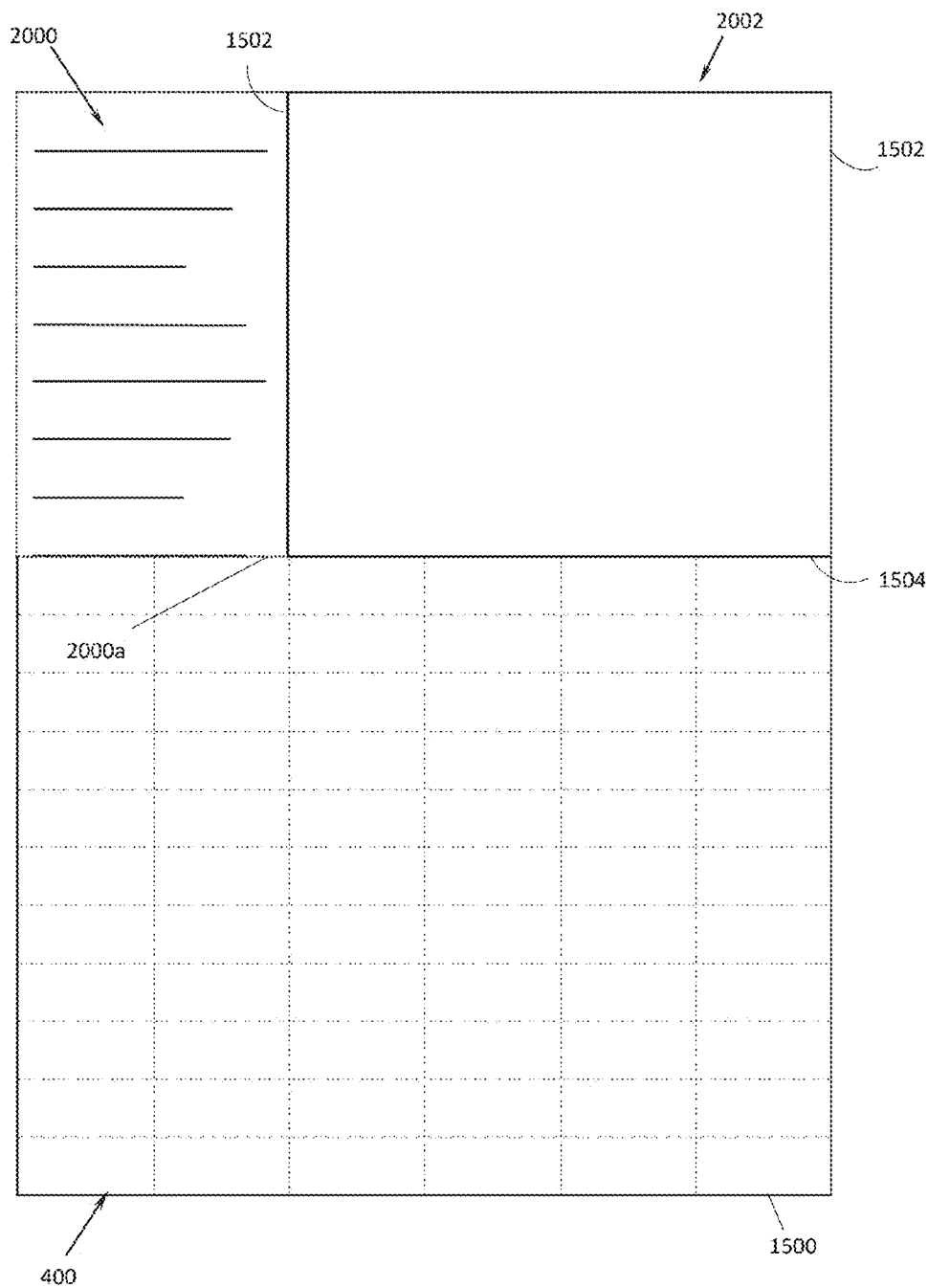

In FIG. 20A a paragraph 2000 is shown as a margin-aligned block spanning two columns 1004 and eight lines 410, such that the boundary 2000*a* of the block 2000 is aligned on the second vertical line 1502 and the eighth horizontal line 1504 of the alignment pattern 1500. In response to receiving a double tap gesture E to the right of the paragraph 2000 a block 2002 is created from the second vertical line 1502 to the last vertical line 1502 of the alignment pattern 1500 and with the same vertical extent as the paragraph 2000 (e.g., to the eighth horizontal line 1504) as shown in FIG. 20B. Non-text input within the block 2002 can then be performed.

Figure 21A:
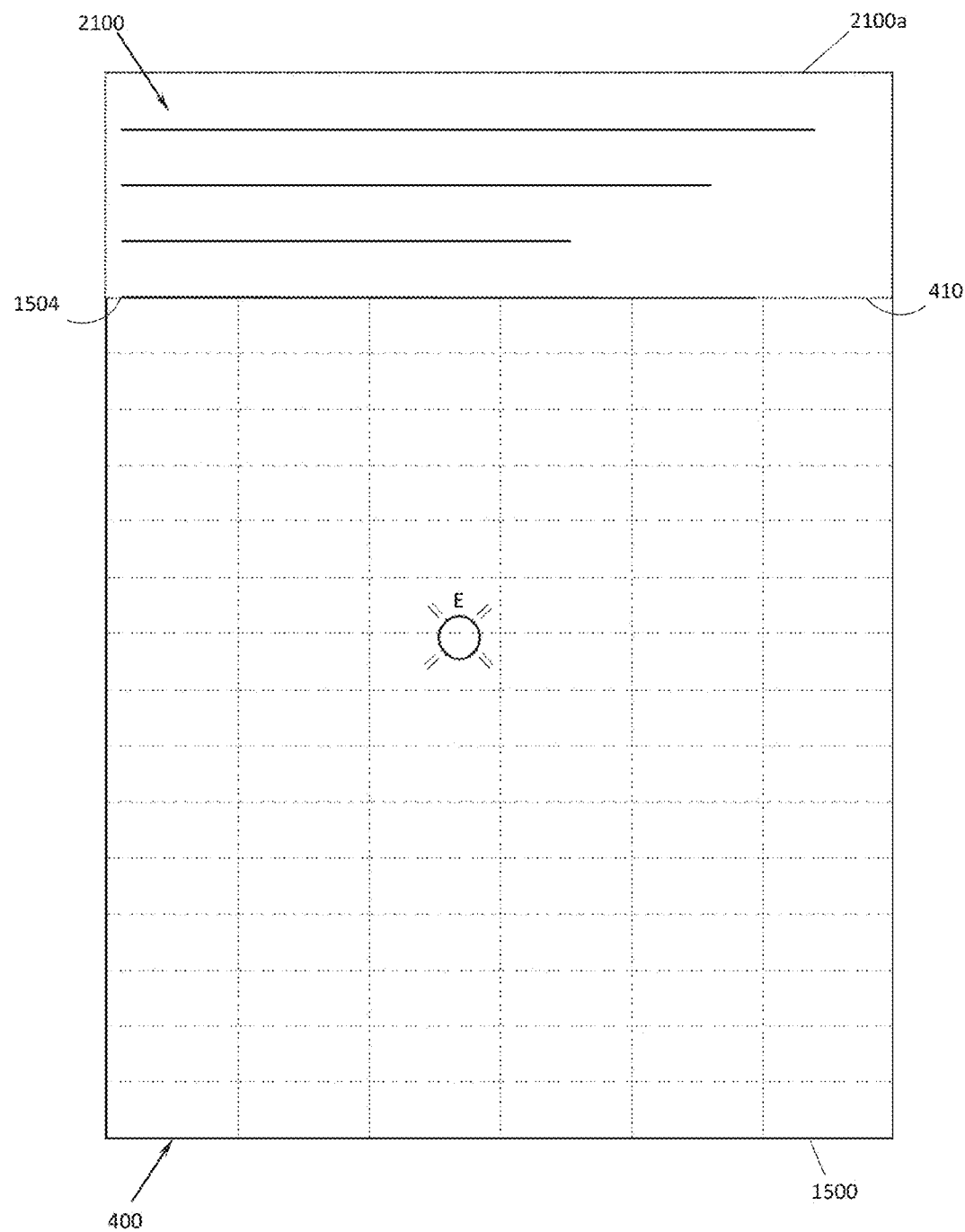
FIGS. 21A and 21B shows a schematic view of part of the scroll page with object blocks and example operations thereon.
Figure 21B:
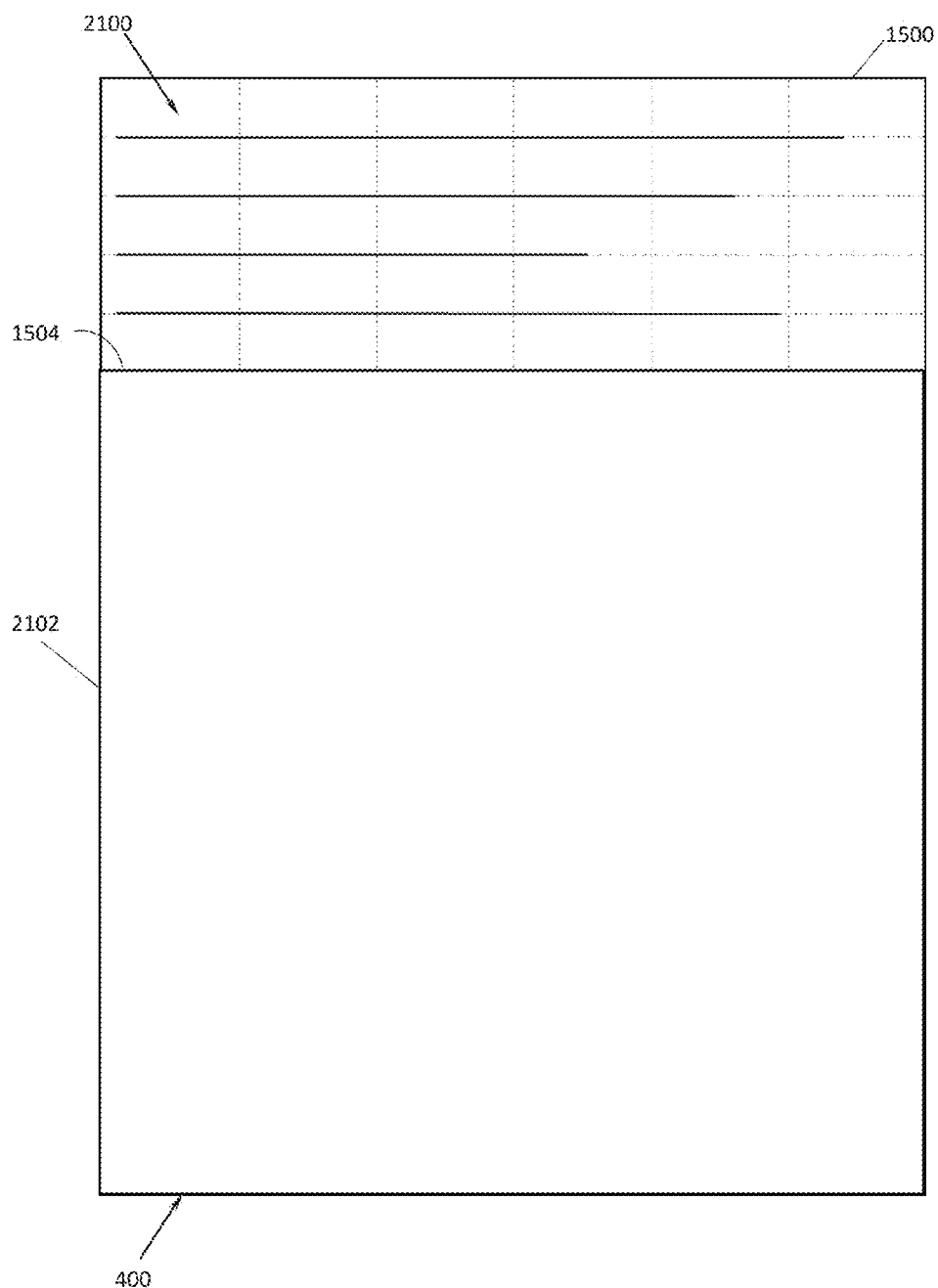

In FIG. 21A, a paragraph 2100 is shown as a full page width (two margin-aligned) block spanning all six columns 1004 and four lines 410, such that the boundary 2100*a* of the block 2000 is aligned on the fourth horizontal line 1504 of the alignment pattern 1500. In response to receiving a double tap gesture E below the paragraph 2100 a block 2102 is created from the fifth horizontal line 1504 of the alignment pattern 1500 to the vertical extent of the page 400 as shown in FIG. 21B. Non-text input within the block 2102 can then be performed. In a further example, if the canvas to be generated is too near the edge of the input area 408 of the scroll page 400 to provide meaningful content input, the scroll page could be automatically scrolled. With respect to the top and bottom extents of the input area 408, by setting a minimum canvas width and height (e.g., say, two columns and two LPUs), automatic scrolling could be achieved similar to that described earlier in relation to FIG. 9, since when a canvas is to be generated such that part of the minimum canvas overlaps the automatic scroll areas upon generation the scroll page will be automatically scrolled. Such a minimum canvas size also provides a way to ensure vertical overflow of a canvas below horizontally adjacent objects (e.g., to the left of the canvas) or of the horizontally adjacent objects (e.g., to the right of the canvas) when the canvas is to be created too close to the margin extents of the scroll page or between objects that are not sufficiently spaced apart.

Users may subsequently determine that the generated canvas is either too small or large for the purposes intended. As such, resizing of the created non-text block can be subsequently performed before or after content input. Resizing of all object blocks is possible under given conditions and with certain consequential actions on the layout. For example, resized objects snap to the alignment grid, resized content is always fully visible in the note (e.g., not cropped), except for images if necessary. With respect to image resizing, images imported into or as non-text blocks in the scroll page 400 are embedded within a bounding box that serves as a layout container. Image positioning within its bounding box is handled as following without user interaction:

image is scaled up/down so that it always covers the whole bounding box area (overflowing parts being cropped)

image always keeps its aspect ratio in any case (e.g., no stretching)

image is centered within its bounding box.

Resizing of images, and of other object blocks, is performed using handles (see FIG. 9) displayed around a selected image and bound with the bounding box, not the inner image itself. Access to the handles, with corresponding display of the block boundaries, is provided by the present system and method in a natural and well understood manner to users, such as by the user simply performing a single tap on the content to be resized/edited. As is understood by those skilled in the art, once displayed users touch or hover over the handles and drag/push the selected handle across the interface so as to provide different behaviors with dragging/pushing of corner handles causing scaling of the bounding box (moves two sides, thus keeping the bounding box aspect ratio) and dragging/pushing of side handles causing stretching of the bounding box (move single side, thus changing bounding box aspect ratio). Changing the bounding box aspect ratio has no impact on the inner image aspect ratio, rather the image is automatically scaled/centered.

Other types of non-text blocks and text blocks can be explicitly resized in the same manner. However, when a paragraph is resized the font size of the text content is not changed (i.e., scaled) only the paragraph's dimensions (see detail discussion later for exceptions). With respect to the layout, if a block is made smaller content below is moved upward and if a block is made larger content below is moved downward, in accordance with afore-described rules.

As previously described, automatic resizing of blocks also occurs due to user input of content within blocks. For example, when users write in a text block (e.g., adding to or continuing a paragraph), the block extends automatically as the users write, with alineas and font size being maintained (and with any consequential movement of lower content). Automatic resizing can also occur due to display of a note created on one device being subsequently displayed on a different device having a screen of a different size or a change in orientation of the device display, e.g., landscape to portrait. As described earlier, the users' created layout of note taking object blocks is respected as much as possible by the present system and method during such transitions, as is the content within the blocks themselves. As such, operations such as automatic resizing are kept to a minimum and only performed where necessary or where the users' original input is not adversely effected. Upon translation, if users desire resizing or scaling of content, they are able to perform such operations manually, for example, in the manner explained above.

As mentioned, the computing device 100 on which the application 112 is utilized may have an interface 104 which responds to a change in the orientation of the device from portrait to landscape and vice-versa. Accordingly, the layout and characteristics of content elements included in a note of a scroll page of the digital note taking application must also be responsive whilst following the same principles of minimal undesired effect on layout. The same applies to displaying a particular scroll page, or note book, on devices having different display sizes. The alignment grid, and in particular the layout pattern, of the present system and method provides an effective way of providing responsiveness to such transitions. An example transition is now described with reference to FIGS. 22A and 22B.

Figure 22A:
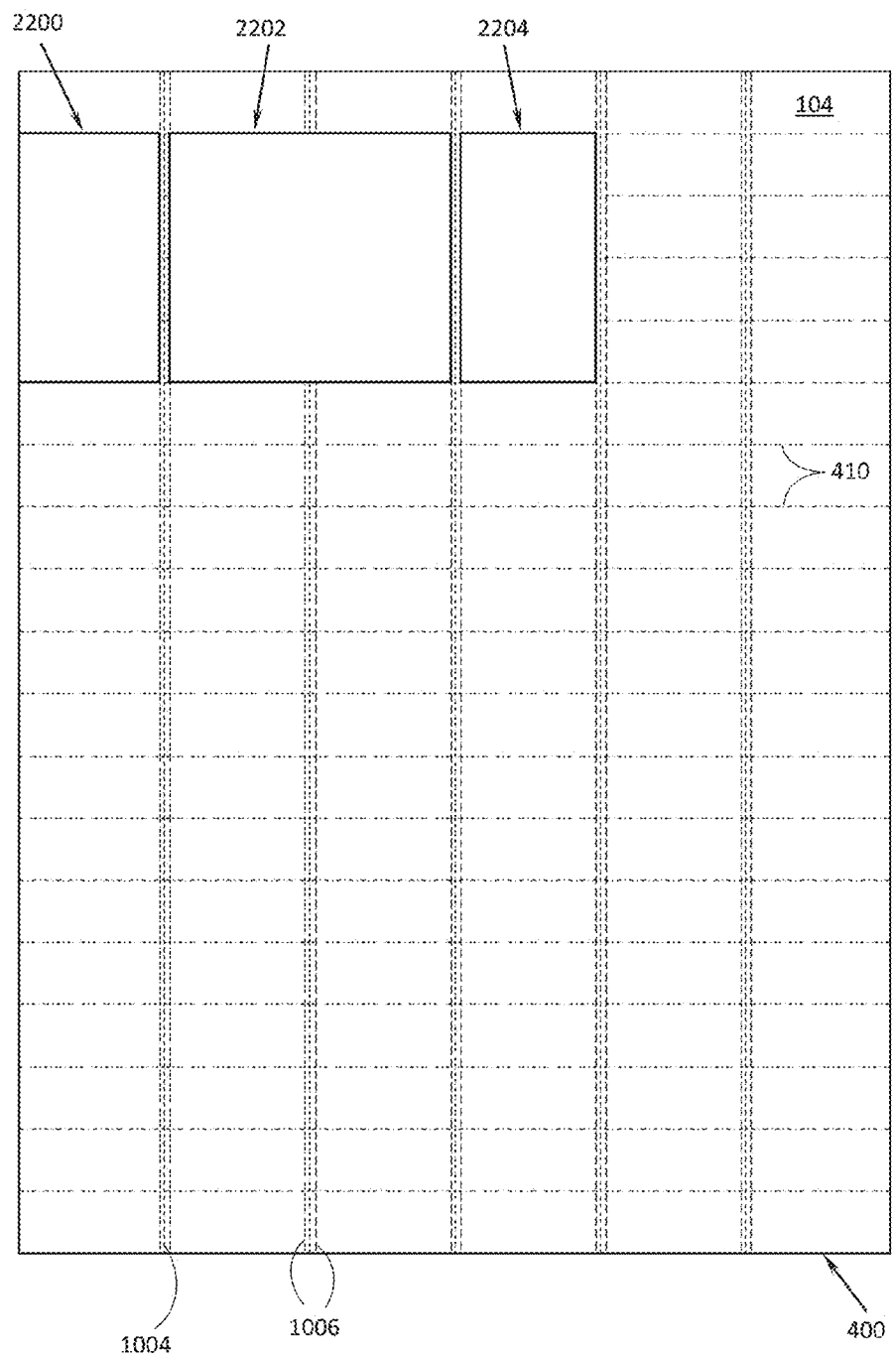
FIG. 22A shows a schematic view of a first alignment rendering of part of the scroll page with object blocks and FIG. 22B shows a schematic view of a second alignment rendering of part of the scroll page with the object blocks.

FIG. 22A shows an example of the scroll page 400 on a device interface 104 on which six columns 1004 of the layout pattern 1000 can be meaningfully provided. The column gutters 1006 of the columns 1004 are also shown. A first object block 2200 spans the first column 1004, a second object block 2202 spans the second and third columns 1004 and a third object block 2204 spans the fourth column 1004, where the blocks 2200, 2202 and 2204 are horizontally adjacent and the vertical boundaries of each block are aligned with the corresponding column gutters 1006, as previously described.

Figure 22B:
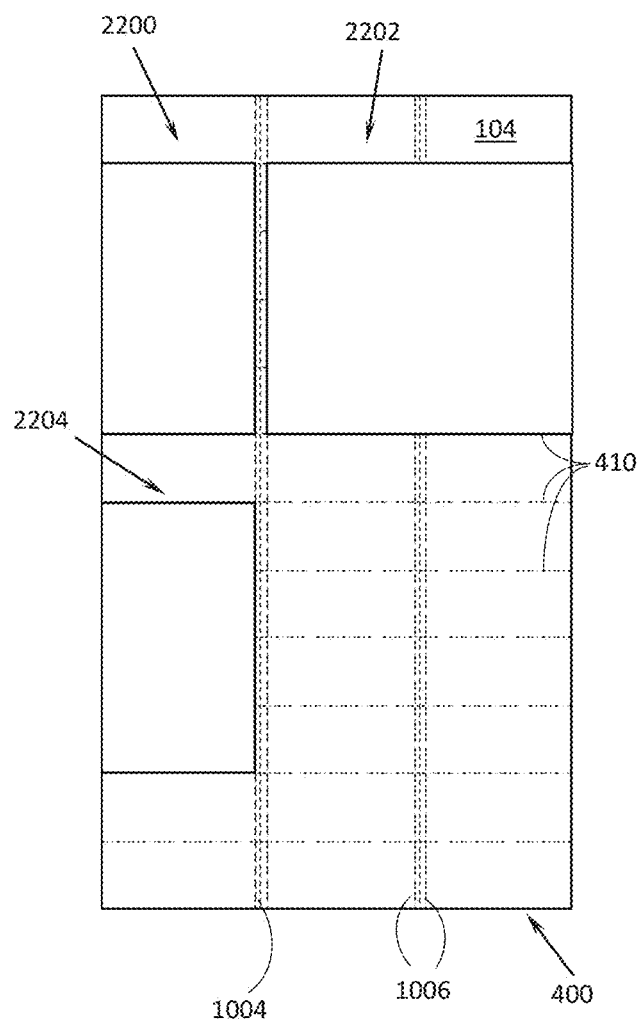

FIG. 22B shows the scroll page 400 translated to a different device interface 104 or the device interface 104 in a different orientation in which only three columns 1004 of the layout pattern 1000 can be meaningfully provided. Accordingly, while the first and second object blocks 2200, 2202 fit within the three columns 1004 of the translated scroll page 400, the third object block 2204 which spanned four of the columns 1004 in the scroll page 400 of FIG. 22A does not. Accordingly, the third block 2204 is moved vertically to the next available line 410 of the line pattern background (e.g., leaving a one LPU spacing between it and the closest block above) and is margin-aligned so as to now span the first column 1004 aligned with the corresponding column gutters 1006. Any content below is also moved downward as previously described. In this way, the original layout is maintained as much as possible whilst providing meaningful and well-sized display of the layout content in different views of the scroll page 400. For example, the margin-alignment of the vertically moved, previously floating, block is done so that it is clear that the block initially cam directly after the previously left-adjacent horizontal block.

By this responsive layout process, the present system and method is able to maintain layout in situations where a note is created/displayed by an initial device in an initial orientation and then sequentially displayed on smaller/larger devices in same/different orientations, where the display in the original (first) format is maintained when the note is displayed in that format again. In order to achieve this, the relative positioning of the object blocks in the layout relative to the alignment pattern needs to be known. The application 112 handles this by determining the relative block positions and creating sections or divisions of the scroll page to manage retention of block proximity when translating the scroll page view. When there is a horizontal/vertical overlay of more than one element/block in the vertical/horizontal direction a division is created. The elemental content of a division is not changed when the elements of the division are moved within the division either through direct action of users or due to translation of the scroll page in line with the viewable area of the device interface. The elemental content of a division is changed when elements are removed from the division or editing actions on the content are performed.

FIGS. 23A to 23F illustrate an example division scheme of the present system and method. In determining whether to divide the layout or not, the present system and method first determine in the vertical direction whether there are elements which horizontally overlap one another by checking the horizontal direction for each vertically displaced element, and whenever overlap is found the direction of the search changes from vertical to horizontal to vertical and so on.

Figure 23A:
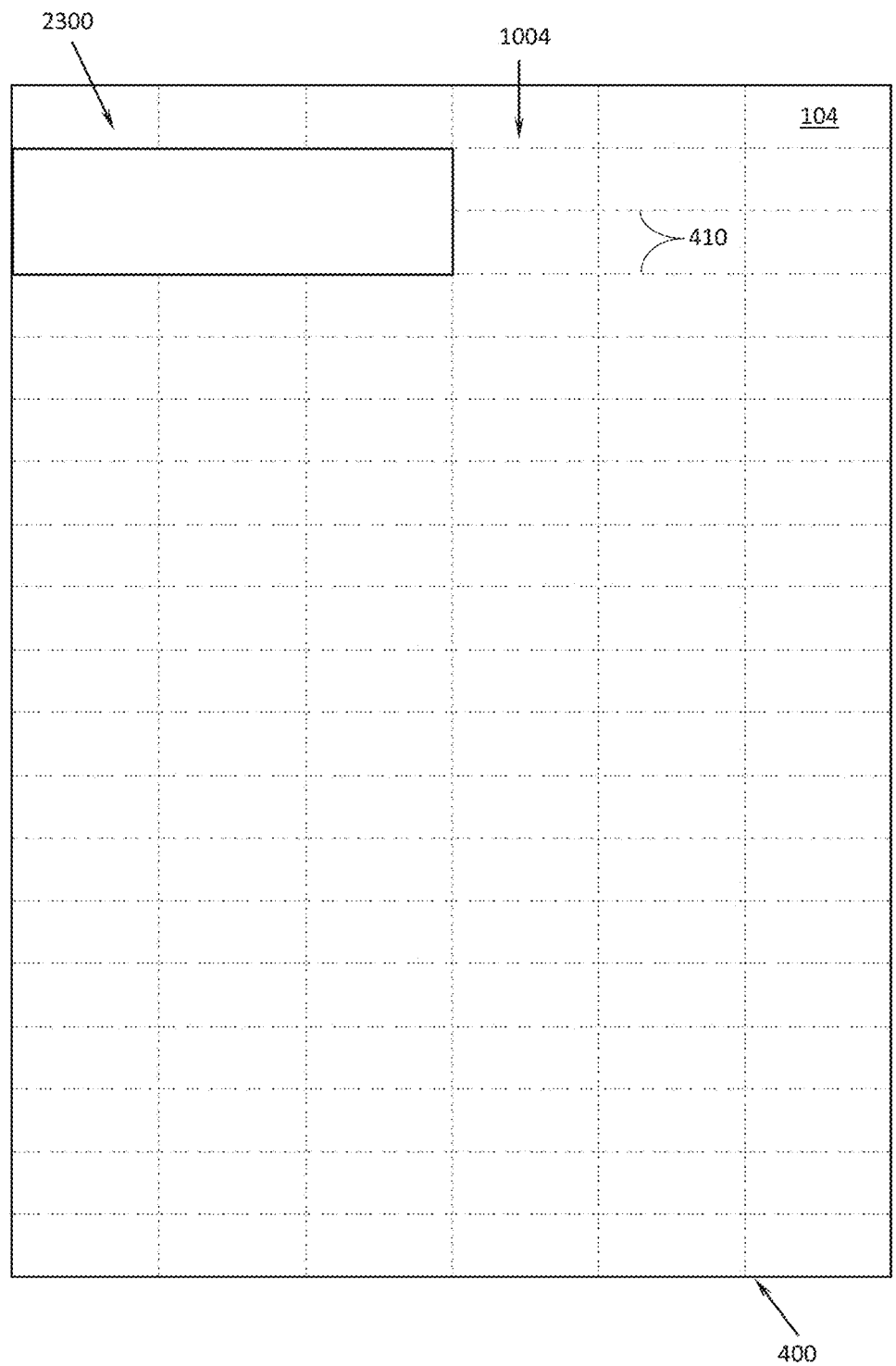
FIGS. 23A to 23F show a schematic view of a first alignment rendering of part of the scroll page with successive input of object blocks.

FIG. 23A shows an example of the scroll page 400 with one object block 2300 input in the interface 104. The block spans three columns 1004 and two LPUs 410. In determining whether to divide the layout or not, the present system and method first determine the presence of multiple vertical elements and then determine in the vertical direction whether there are elements which horizontally overlap by checking the horizontal direction for each vertically displaced element. Whenever overlap is found the direction of the search changes from vertical to horizontal to vertical and so on. Thus, in the example of FIG. 23 the following occurs:

A1. Processing begins at the block 2300 (being the first element in the vertical direction) and with a search of the vertical direction below (e.g., within the four column span of the block 2300) it is determined that there are no vertically overlapping blocks. Accordingly, a division is not created.

A2. Processing continues at the block 2300 and with a search of the horizontal direction to the left and right (e.g., within the two LPU span of the block 2300) it is determined that there are no horizontally adjacent blocks. Accordingly, a division is not created.

A3. Division processing ends, as there are no further blocks of content in either direction.

Figure 23B:
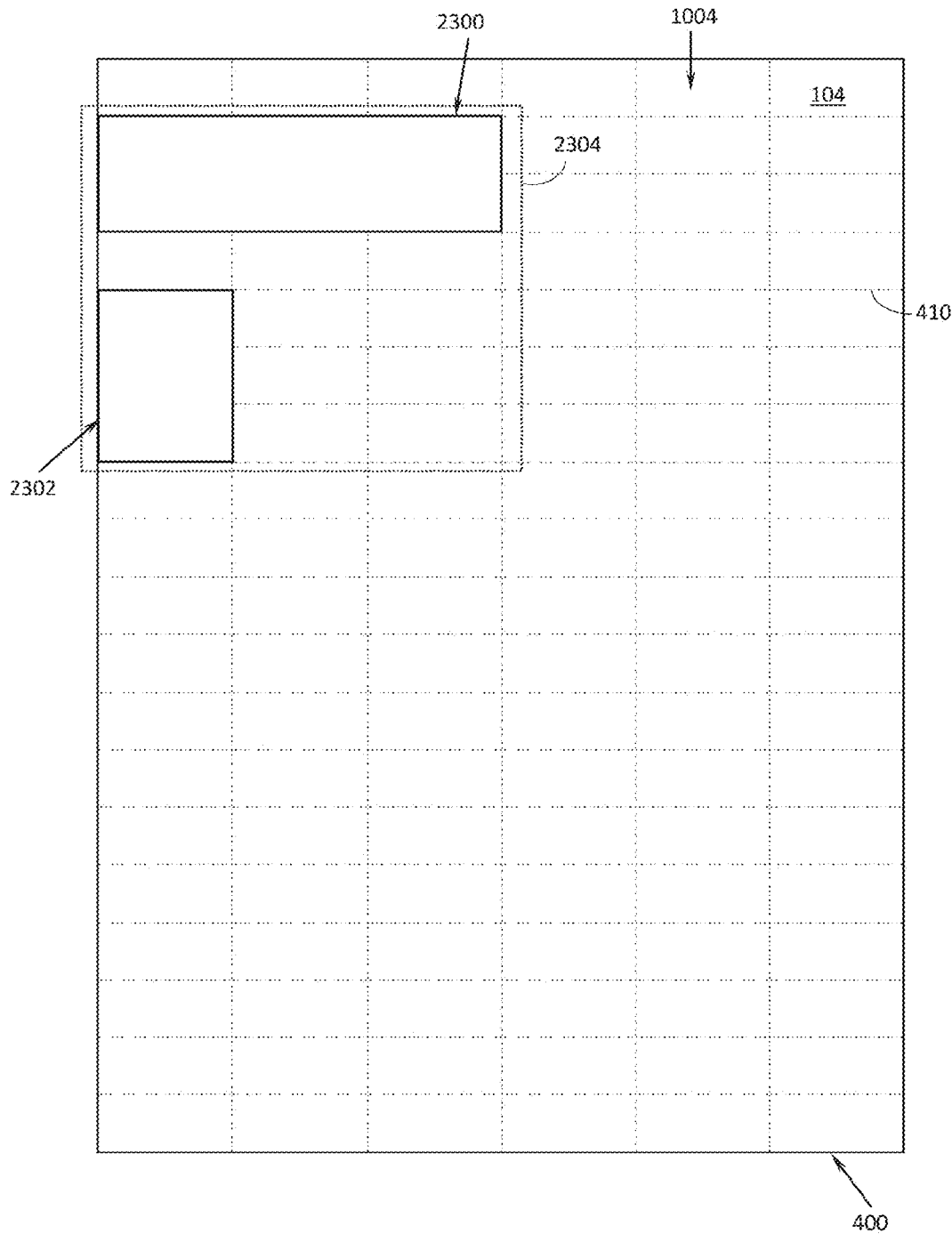

FIG. 23B shows the scroll page 400 with a second object block 2302 input below the first block 2300. The second block 2302 spans one column 1004 and three LPUs 410. As a further block has been input the following occurs:

B1. Step A1 is repeated but this time it is determined that the block 2302 is vertically overlapped with the block 2300. Accordingly, a division 2304 containing the blocks 2300 and 2302 is created.

B2. With the creation of the division 2304, it is determined whether any sub-divisions should be created at the block 2300 by repeating step A2 which achieves the same result in the present example.

B3. Processing continues at the block 2302 (being the next element in the vertical direction) and with a search of the vertical direction below (e.g., within the single column span of the block 2302) it is determined that there are no vertically overlapping blocks. Accordingly, the division 2304 is maintained (e.g., there is no need to extend the division to contain another block).

B4. With the confirmation of the division 2308, it is determined whether any sub-divisions should be created by processing continuing at the block 2302 and with a search of the horizontal direction to the left and right (e.g., within the three LPU span of the block 2302) it is determined that there are no horizontally adjacent blocks. Accordingly, a sub-division is not created.

B5. Division processing ends, as there are no further blocks of content in either direction.

Figure 23C:
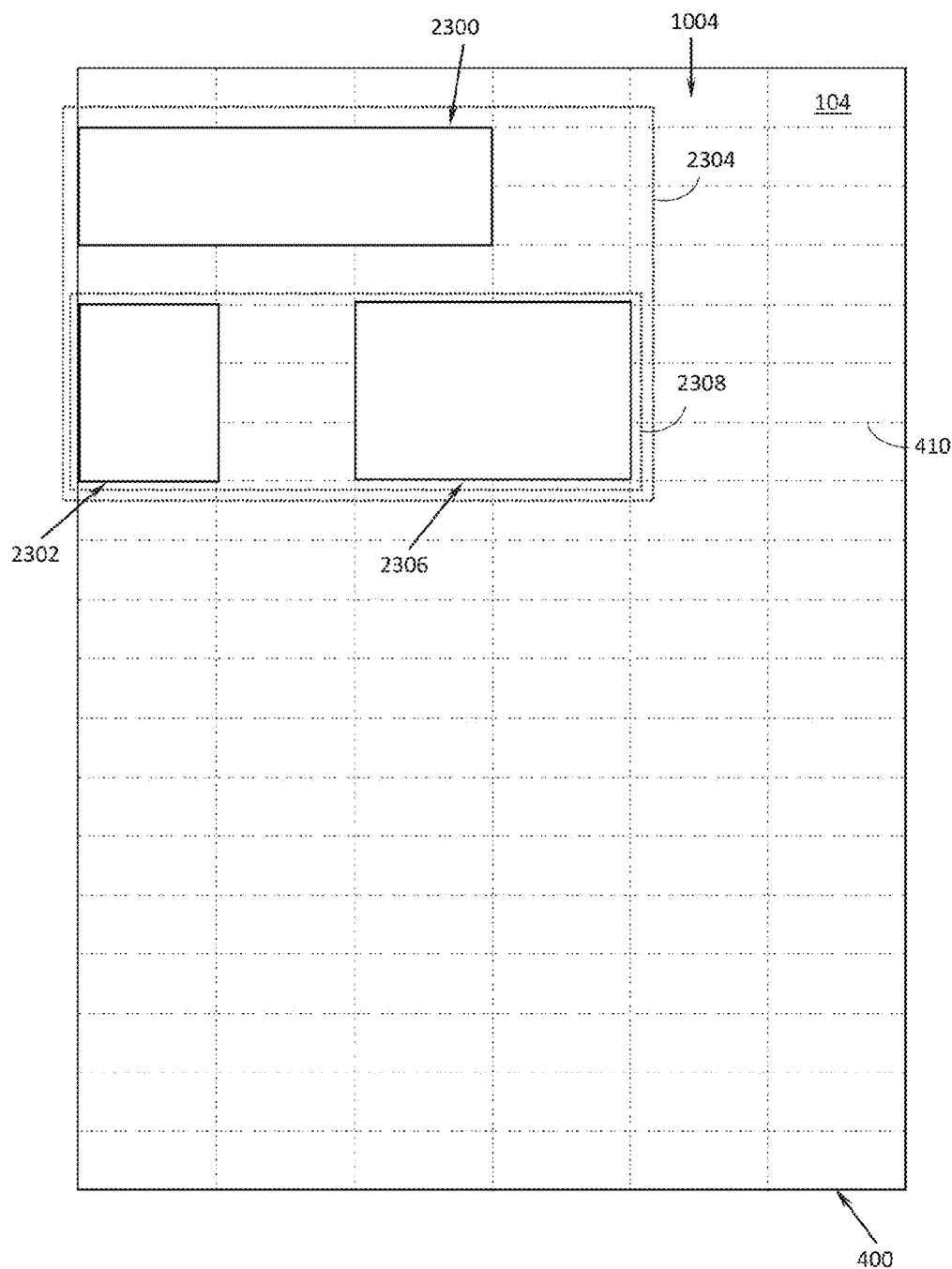

FIG. 23C shows the scroll page 400 with a third object block 2306 input horizontally adjacent the second block 2302. The third block 2306 spans three columns 1004 and three LPUs 410. As a further block has been input the following occurs:

C1. Steps B1 to B3 are repeated with resulting maintenance of the division 2304.

C2. Step B4 is repeated but this time it is determined that the block 2306 is horizontally adjacent on the right. Accordingly, the division 2304 is updated so as to contain all three blocks 2300, 2302 and 2306 and a sub-division 2308 containing the blocks 2302 and 2306 is created.

C3. With the creation of the sub-division 2308, it is determined whether any further elements are within the sub-division 2308 by processing continuing at the block 2306 (being the next element in the horizontal direction within the sub-division 2308) and with a search of the horizontal direction to the left and right (e.g., within the three LPU span of the block 2306) it is determined that only the block 2302 is horizontally adjacent on the left, which is already known. Accordingly, the sub-division 2308 is maintained (e.g., there is no need to extend the division to contain another block).

C4. With the creation and confirmation of the sub-division 2308, it is determined whether any further sub-divisions within the sub-division 2308 should be created by processing continuing at the block 2306 and with a search of the vertical direction below within the sub-division 2308 (e.g., within the three column span of the block 2306) it is determined that there are no vertically adjacent blocks within the sub-division 2308. Accordingly, a sub-division is not created.

C5. Division processing ends, as there are no further blocks of content in either direction.

Figure 23D:
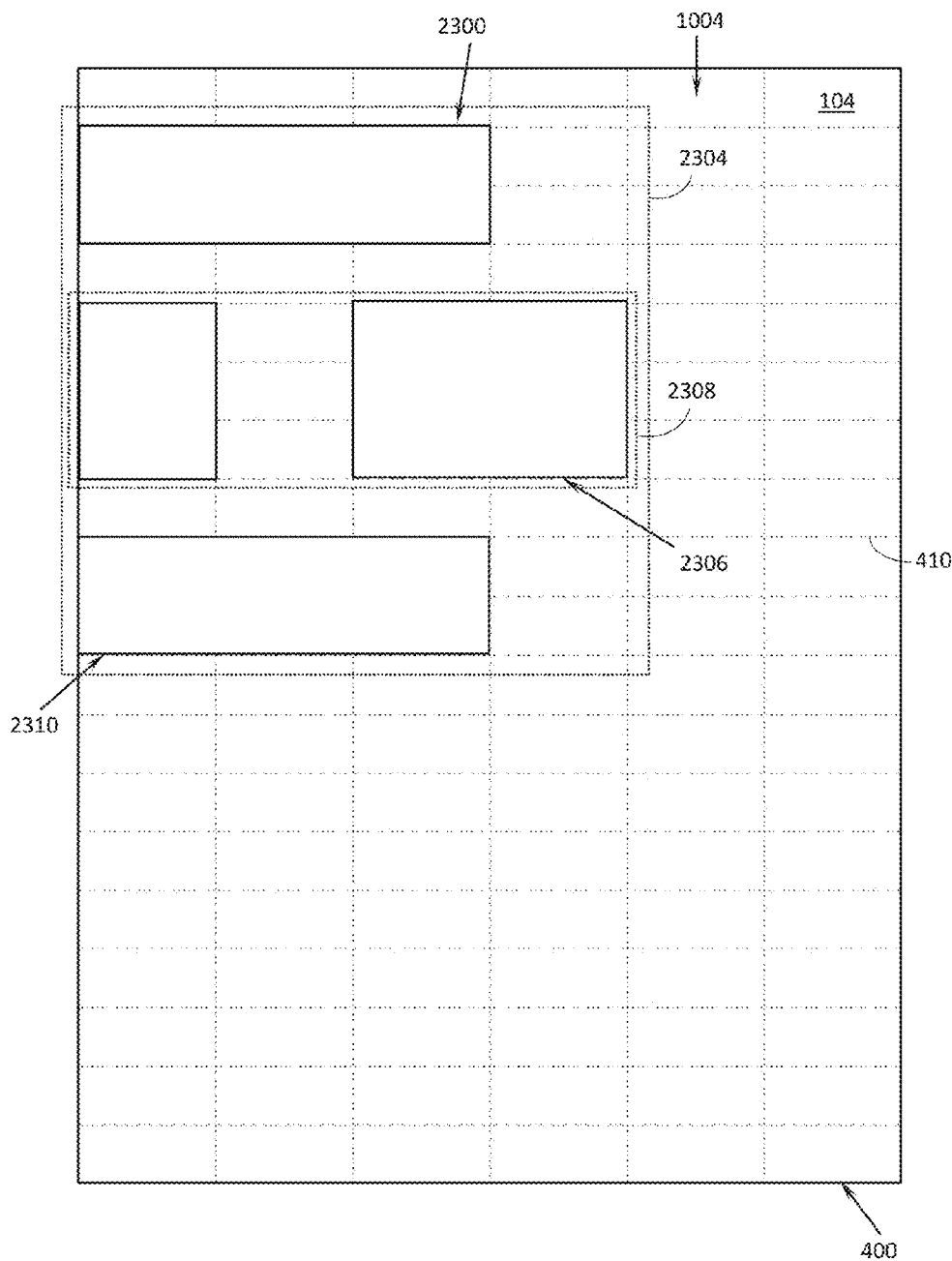

FIG. 23D shows the scroll page 400 with a fourth object block 2310 input below the existing blocks. The further block 2310 spans three columns 1004 and two LPUs 410. As a further block has been input the following occurs:

D1. Steps B1 and B2 are repeated with resulting maintenance of the division 2304.

D2. Step B3 is repeated but this time it is determined that the block 2310 is vertically overlapped with the block 2302. Accordingly, the division 2304 is updated to contain the blocks 2300, 2302, 2306 and 2310.

D3. Steps C2 to C4 are repeated with resulting maintenance of the updated division 2304 and the sub-division 2308.

D4. Division processing ends, as there are no further blocks of content in either direction.

Figure 23E:
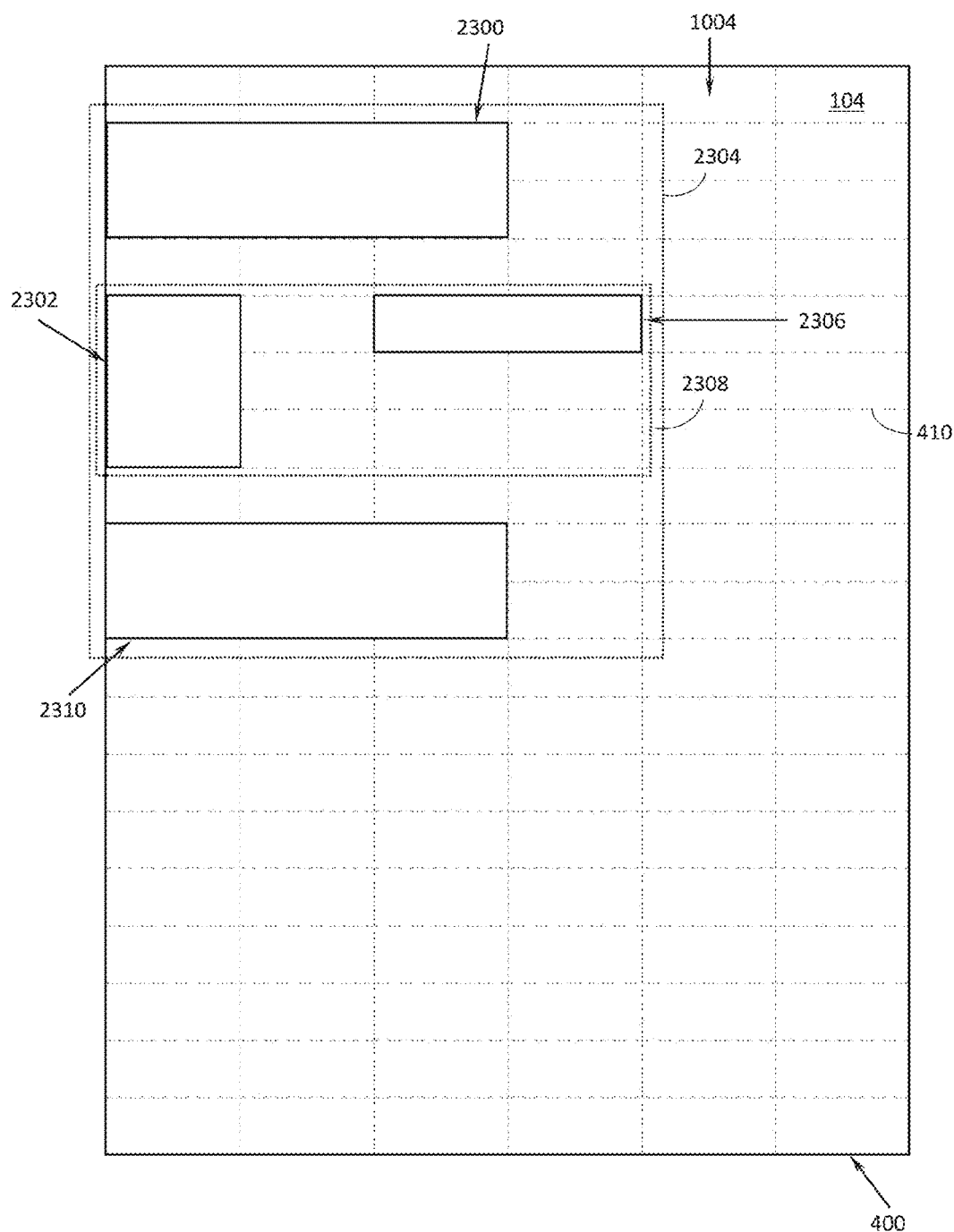

FIG. 23E shows the scroll page 400 with the third object block 2306 having been resized to still span three columns 1004 but now span one LPU 410 rather than three. As an editing operation on the layout has occurred, the division processing is performed but with the result that the existing divisions are maintained as they are since the relative layout of the blocks has not been changed.

Figure 23F:
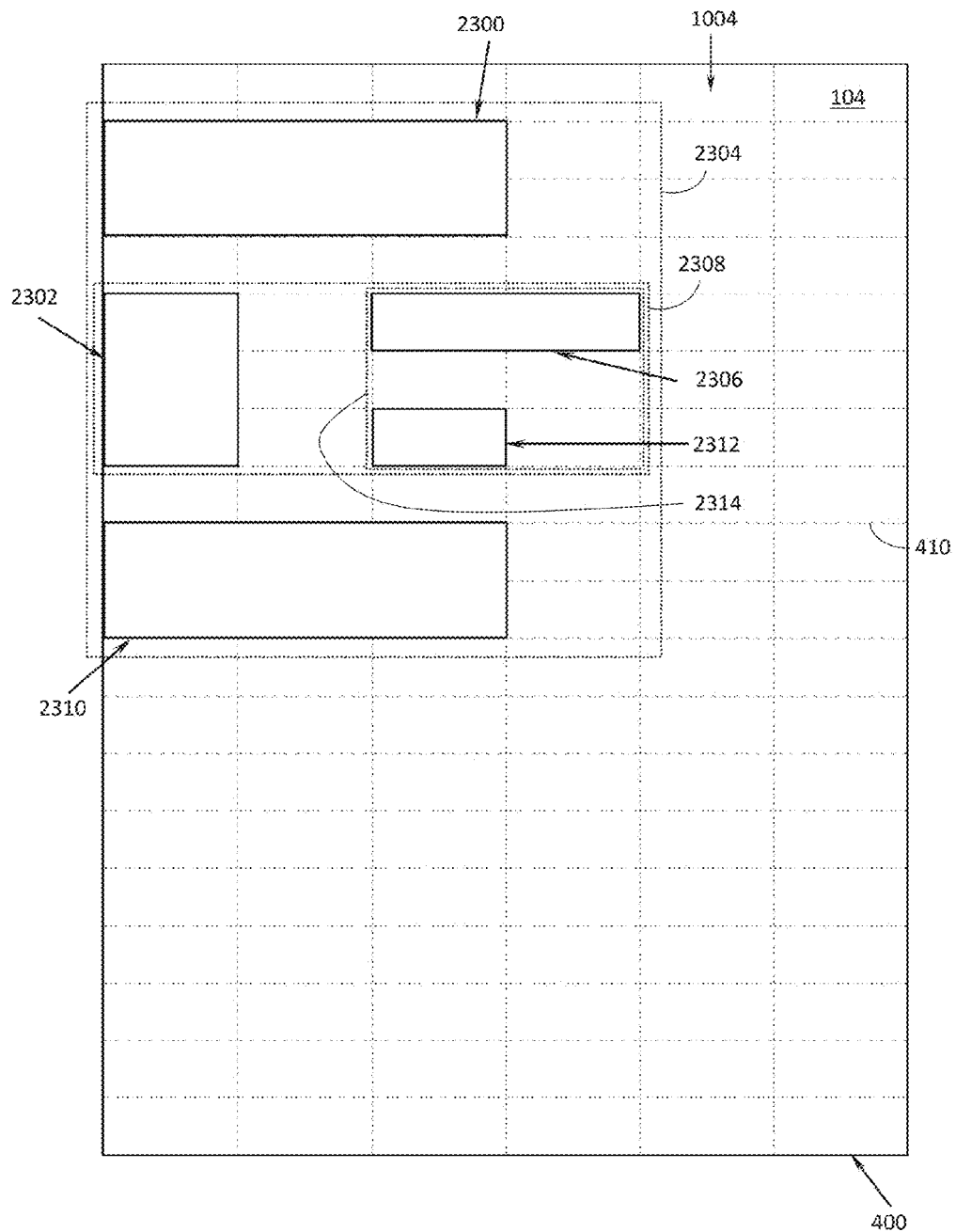

FIG. 23F shows the scroll page 400 with a fifth object block 2312 input below the (resized) third object block 2306. The further block 2312 spans one column 1004 and one LPU 410. As a further block has been input the following occurs:

F1. Steps D1 and D2 are repeated with resulting maintenance of the division 2304.

F2. Steps C2 and C3 are repeated with resulting maintenance of the division 2304 and the sub-division 2308.

F3. Step C4 is repeated but this time it is determined that the block 2312 is vertically overlapped with the block 2306. Accordingly, a further sub-division 2314 containing the blocks 2306 and 2312 is created.

F4. With the creation of the sub-division 2314, it is determined whether any further elements are within the sub-division 2314 by processing continuing at the block 2312 (being the next element in the vertical direction within the sub-division 2314) and with a search of the vertical direction below within the sub-division 2314 (e.g., within the three column span of the block 2312) it is determined that there are no vertically adjacent blocks within the sub-division 2314. Accordingly, the sub-division 2314 is maintained (e.g., there is no need to extend the division to contain another block).

F5. With the creation and confirmation of the sub-division 2314, it is determined whether any further sub-divisions within the sub-division 2314 should be created by processing continuing at the block 2302 and with a search of the horizontal direction to the left and right (e.g., within the single LPU span of the block 2312) it is determined that only the block 2302 is horizontally adjacent on the left, which is already known. Accordingly, a sub-division is not created.

F6. Division processing ends, as there are no further blocks of content in either direction.

The example layout of FIG. 23 is therefore divided into three divisions or sections. With the first or root division containing all content blocks, the second division containing three blocks and the third division containing two blocks. In the example of FIG. 23 the divisions are created, updated and processed incrementally as input is made to the application 112. These divisions are therefore stored in the memory 108, for example, by the application 112 as they are created and updated so that the order of the blocks is maintained through movement of individual blocks within or between the divisions either through user interaction or display/orientation changes (described in relation to a specific example later). The division processing is also applicable to an already created layout of blocks (e.g., when an existing note is loaded on the application 112). Whilst the root division and first level sub-division (e.g., the sub-division 2304) are shown in FIG. 23 as surrounding the blocks contained therein, it is understood that these higher level divisions basically divide the width of the scroll page 400 into sections.

Figure 24:
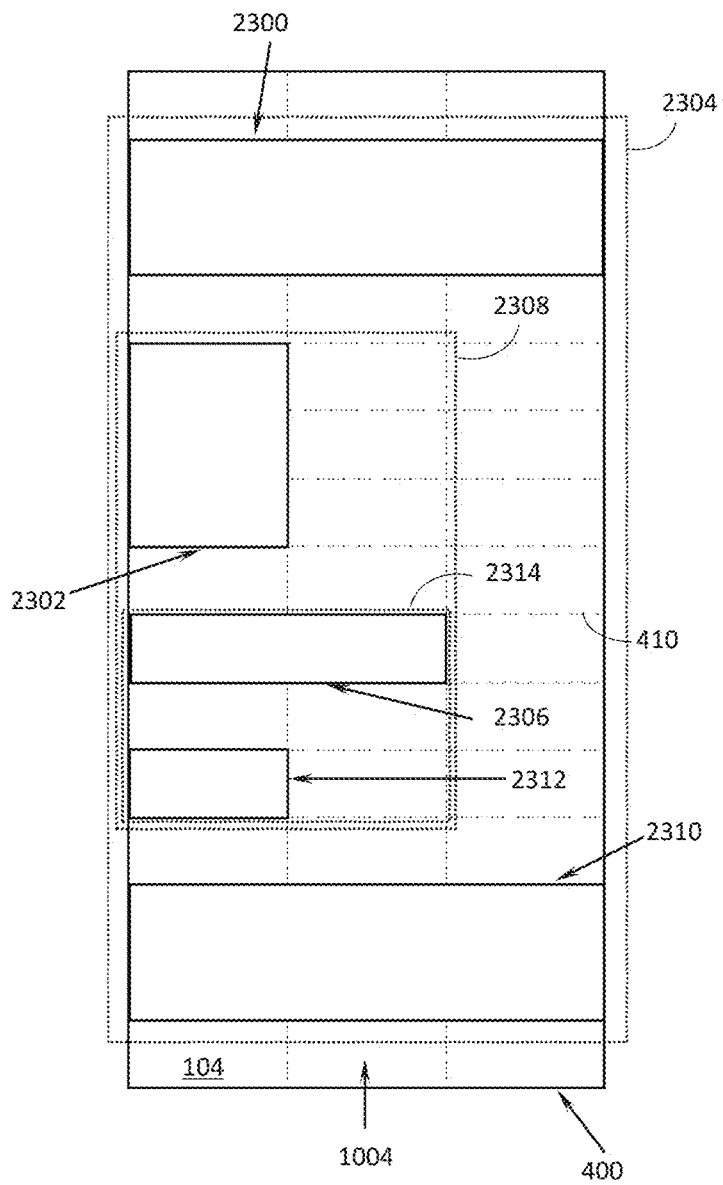
FIG. 24 shows a schematic view of a second alignment rendering of the part of the scroll page of FIG. 23 with the object blocks.

FIG. 24 shows the scroll page 400 of FIG. 23 translated to a different device interface 104 and/or device interface 104 in a different orientation. In response to the translation, the application 112 has rendered the scroll page 400 with three columns 1004 of the layout pattern 1000. Accordingly, while the blocks 2300 and 2310 of the root division 2304 fit within the three columns 1004 of the translated scroll page 400, the combined blocks 2302, 2306 and 2312 of the sub-division 2308 which spanned four of the columns 1004 in the scroll page 400 of FIG. 23 do not. However, unlike the situation depicted in FIG. 22A, since the blocks 2306 and 2312 are further contained in the sub-division 2314, then the sub-division 2314 as a whole is moved vertically to the next available line 410 of the line pattern background with consequential movement of the content block 2312 (e.g., leaving a one LPU spacing between the upper and lower blocks of the sub-division 2314 and the closest blocks above and below) with the left-most block (i.e., the block 2306) being margin-aligned. In this way, the original layout is maintained as much as possible, both in the main vertical flow of elements and in the horizontal order of elements across the width of the scroll page, whilst providing meaningful and well-sized display of the layout content in different views of the scroll page 400. Since the vertical and horizontal orders are maintained, the display of FIG. 24 is properly translated back to the display of FIG. 23F (e.g., the layout to that original input) when the original device orientation or size is restored.

In the example of FIG. 23, there was sufficient horizontal space (e.g., columns) in the divisions for the content added to those divisions. On the other hand, if added content or objects do not fit into the available width of the scroll page 410 within a division, all objects of the division may be automatically resized (as described earlier) depending on where the added object is input or dropped within the division and the objects to the right and below consequently moved down. Resizing of digital ink paragraphs or text blocks also involves reflow of the digital ink onto the more or less lines of the line pattern background. This reflow is handled so that the meaning and integrity of the paragraph is maintained. Accordingly, a particular paragraph of digital ink (and typeset text—see later) may be reflowed differently to another paragraph, and in any case, the minimum width of a paragraph is governed by the minimum word width (with or without hyphenation) of the text within the paragraph.

Automatic resizing may also be performed with a change of orientation or format so that the position of a block or paragraph in the layout and its percentage of the vertical occupation in the width of the scroll page is respected. For example, for handwritten text in a paragraph that has a certain relative vertical position and occupies a certain percentage of the viewable area width, say 75%, the same relative position and percentage is applied when changing the device orientation or size by reflowing the text so that more words can fit into the paragraph or the height of the paragraph is changed or the size of the text characters is adjusted accordingly. Text size is particularly relevant to the typesetting of the digital ink.

The manner of converting the input digital ink to typeset text has an impact on the layout as well. This is because, characters handwritten on either paper or on-screen are typically much larger than typeset text, which is generally rendered using standard OS settings (e.g., 16 px font size and 24 px line height) and are generally of varying size and alignment (the line pattern background assists in reducing the extent of these variations however). Accordingly, when a paragraph of digital ink is typeset the resulting typeset text paragraph is much smaller. An example of the relative sizes of a paragraph before and after typesetting is shown in FIG. 25 in which a simple multiline paragraph of digital ink 2500 having a span of six lines 410 (e.g., six LPUs) shrinks down to a multiline paragraph 2502 of only three lines (e.g., no longer a measure of LPUs) of typeset text when typeset. This is not such an issue for vertically laid out paragraphs which are typeset one-by-one or all together after writing is completed since the relative layout of the paragraphs remains the same. However, for horizontally laid out paragraphs and non-text blocks adjacent the paragraphs which are typeset drastic changes in the layout may occur if automatic movement of the surrounding object blocks is performed.

Alternatively, the adjacent blocks can be left as is, such as by not resizing the block (boundaries) of the paragraph which has been typeset. However, since users are unaware of the existence of the blocks, since the block boundaries are only displayed during movement and editing for example, the size of the resultant typeset paragraph may seem odd with respect to the surrounding elements causing users to attempt moving those blocks closer to the typeset paragraph which may not be allowed due to the size of the enlarged block surrounding the typeset paragraph.

Figure 26:
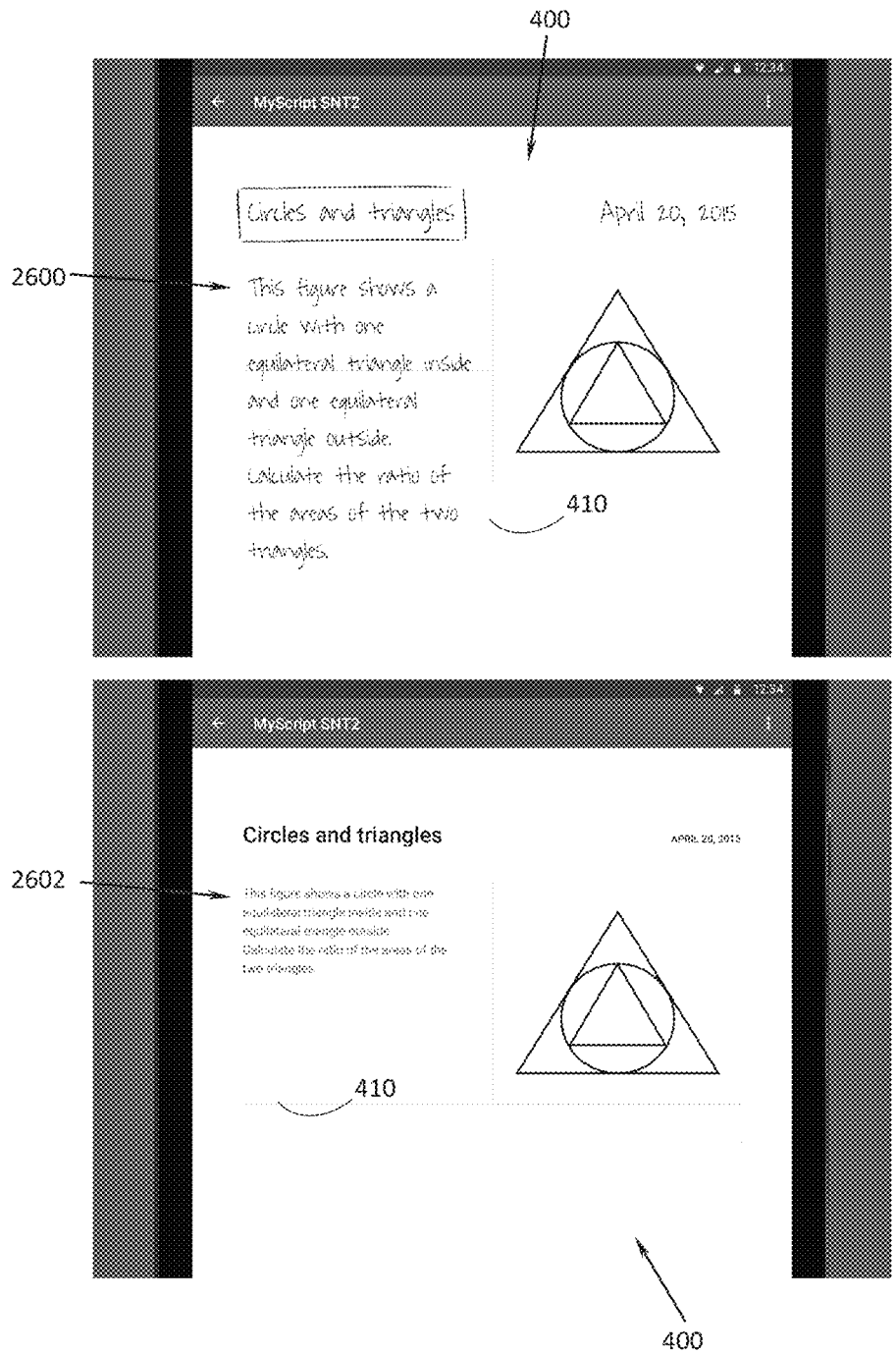
FIG. 26 shows schematic views of an example visual rendering of the scroll page on a portion of the device input surface showing a typesetting operation on digital ink.

It is clear that handwriting requires a larger space than typeset for content to be input correctly (e.g., a larger line height) and the line pattern background is generally needed to assist the recognition process. Accordingly, since the line height of the digital ink is larger than that of the typeset ink, the present and system method removes display of the line pattern background from typeset paragraphs thereby making the content much clearer and readable, and ready to be shared. An example of this is shown in FIG. 26 in which a digital ink paragraph 2600 having the line pattern background 410 displayed is converted into a typeset paragraph 2602 with display of the line pattern background suppressed in the text block 2602 containing the typeset paragraph.

Figure 27:
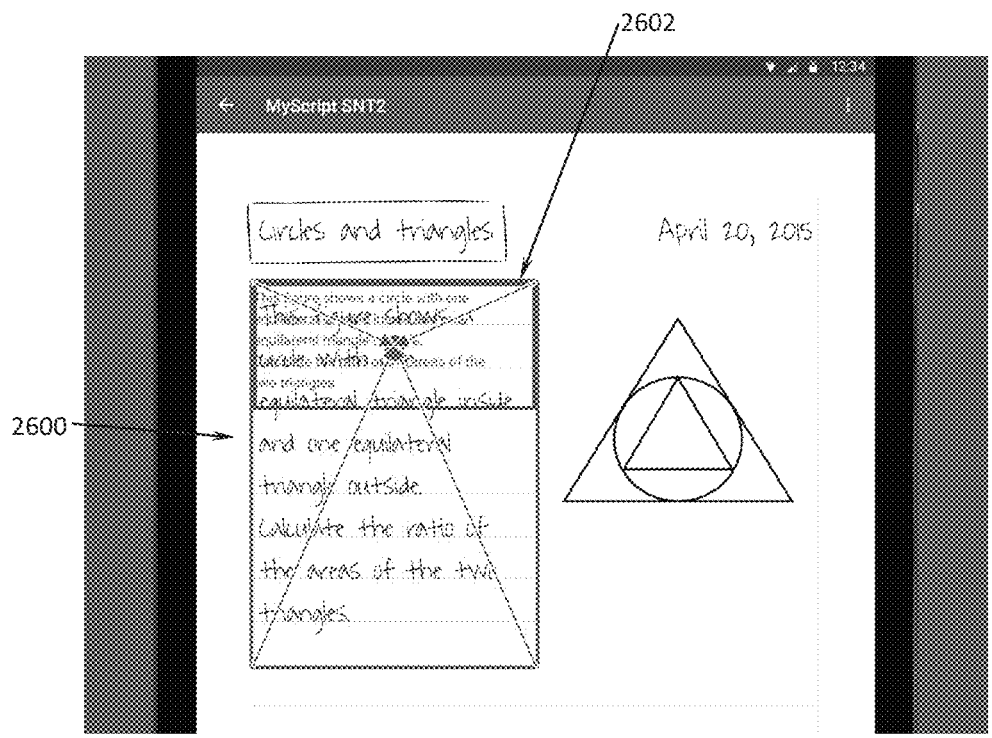
FIG. 27 shows a schematic view of the scroll page of FIG. 26 showing an animation of the typesetting operation.

Transitioning from handwriting to typeset needs to be quick to prevent distracting users from content input. Accordingly, in the present system and method a simple, natural and well-understood mechanism to manually typeset paragraphs is provided and animation of the transformation is used with a simple mix of transparency (0% to 100%) and scaling (0% to 100%). In one example, when a user desires to typeset a paragraph, they simply double tap on the paragraph and in the resultant animation the origin of the transformation is aligned with the absolute middle of the smallest state (being typeset). An example of such transform animation is shown in FIG. 27 in which the transformation from the digital ink paragraph 2600 to the typeset paragraph 2602 is shown. If the user is unhappy with the size of the typeset paragraph in relation to the other elements they can resize the paragraph block, for example, through performing a single tap on the content to select the content, as described earlier. Further, reversal of the transformation may be provided by re-performing a double tap on typeset content. Alternatively, users could see the animation and resultant typeset paragraph, which either temporarily replaces or overlays the digital ink paragraph (as shown in FIG. 27) by performing other natural and well understood operations, such as a long press or hover over the digital ink paragraph, before committing to the transformation.

Once a paragraph is typeset users may desire to change or add content to the typeset content by handwriting. The present system and method supports this in a manner which adheres to the afore-described rules for producing good quality and shareable digital notes. This is done by requiring the typeset paragraph to be displayed in a larger format. In this larger format, the line pattern background is displayed in the typeset paragraph block with the font size of the typeset text enlarged so as reside on the lines of the line pattern background. In this way, any handwritten text or editing gestures supported by the HWR system 114, such as strike-through, scratch-out, overwrite, insertion, etc., are made in relation to the LPU thereby supporting proper recognition. The temporary transformation to the larger typeset size can be achieved, for example, by the user performing a simple and well understood operation, such as a single- or multi-point gesture like a pinch-out. In this situation the new handwritten text remains in this format, e.g., the paragraph is a mix of typeset and digital ink, until the user performs conversion (e.g., in the manner described earlier) at which the enlarged typeset text reverts to the usual sizing at the same time as the added digital ink being typeset to the same size. In this way, it is unnecessary for the HWR system 114 to perform re-recognition of all the paragraph content and the layout is maintained.

Additional to typesetting, simple and well understood gestures may be performed by users to interact with, edit and create new content within the notes. For example, when inserting a non-text canvas as described with reference to FIGS. 20 and 21, full screen mode of that canvas may be entered, for example, by users performing a double tap on the inserted canvas area. Further, within a digital ink or typeset paragraph, interaction with specific text, e.g., words, phrases, sentences, may be done, for example, by users performing a long-press or hover over the text to be selected with or without resultant selection handles for changes to the selection (as described earlier). Further, in the spaces of the input area 408 outside of the defined object blocks, editing gestures supported by the HWR system 114, such as strike-through, scratch-out, insertion, etc., could be performed by users to add or suppress space about existing elements (with consequential downstream movement of any object blocks below) without movement or resizing of the elements themselves.

As discussed earlier, the provision of the line pattern background as a guide element assists in directing users in entering handwriting in a well-defined manner. This assists in the recognition and interpretation of the input by the present system and method, and in the provision of responsive display of digital ink (non-beautified and beautified) and typeset ink representing the 'raw' ink of the handwriting by the present system and method. As also discussed, the ability for users to further interact with the content of their input through editing is also assisted through displaying the digital and typeset ink in relation to the line pattern background.

As described earlier, the vertical rhythm may be based on the typeset text size with the LPU provided as a multiple of this typeset text size. In this way, all typeset content and non-text blocks which are ruled by their own rem-based principles remain vertically aligned with the line pattern background that is displayed for input. Further, other typographic settings are made relative to this value in order to provide a vertically-responsive rhythm, so that changing of this one value (through gestures, menus and the like) makes the whole layout of the content of a note change accordingly.

Figure 28A:
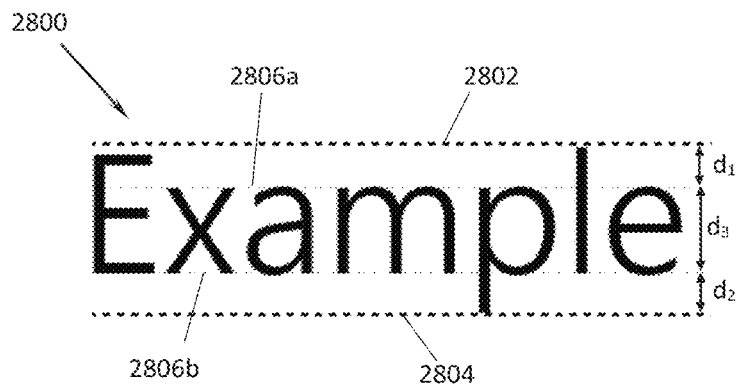
FIG. 28A shows typical parameters of typeset ink.

Typically default font sizes for digital display of fontified or typeset characters (e.g., digital objects) are set based on readability and device display characteristics. FIG. 28A shows the typical parameters of typeset ink for an example text word 2800, being "Example". The text 2800 has an upper extent (illustrated as dashed line 2802) defined by the ascenders of the text characters, e.g., the character "1", and a lower extent (illustrated as dashed line 2804) defined by the descenders of the text characters, e.g., the character "p". These extents are spaced from respective upper and lower nominal extents (illustrated as dashed lines 2806a and 2806b, respectively) which define the nominal height of the text characters without ascenders and descenders. The upper extent line 2802 is spaced a distance $d_1$ from the upper nominal extent line 2806a. The lower extent line 2804 is spaced a distance $d_2$ from the lower nominal extent line 2806b. The nominal extent, i.e., the distance between the upper and lower nominal extent lines 2806a and 2806b, is a distance $d_3$. Accordingly, the font size or text height, D, is defined as $d_1+d_3+d_2$.

As described earlier, internet browsers usually have a default font size set as 16 dp (e.g., one rem=16 px). Within this font size the text has a 4 dp ascender height ($d_1$), a 8 dp nominal height ($d_3$) and a 4 dp descender height ($d_2$), providing a well balanced fontification. Other default font sizes are possible however, such as 18 dp and 15 dp, or values less or more than these. Such font sizes based on the vertical rhythm (dp)/rem units are generally provided by the operating system 110 of the digital device 100. As such, different devices have different rendering metrics in millimeters, for example, depending on the screen resolution and any soft scaling (device to pixel ratio) used. Table 4 shows some example device rendering metrics at the 16 dp/1 rem default font size.

TABLE 4

| Product | Screen resolution (dpi) | Soft scaling (%) | Font size (mm) |
|---|---|---|---|
| iPad Pro | 264 | 200 | ~6.15 |
| Surface Pro 3 | 215 | 150 | ~5.67 |
| Surface Pro 4 | 267 | 200 | ~6.08 |

Figure 28B:
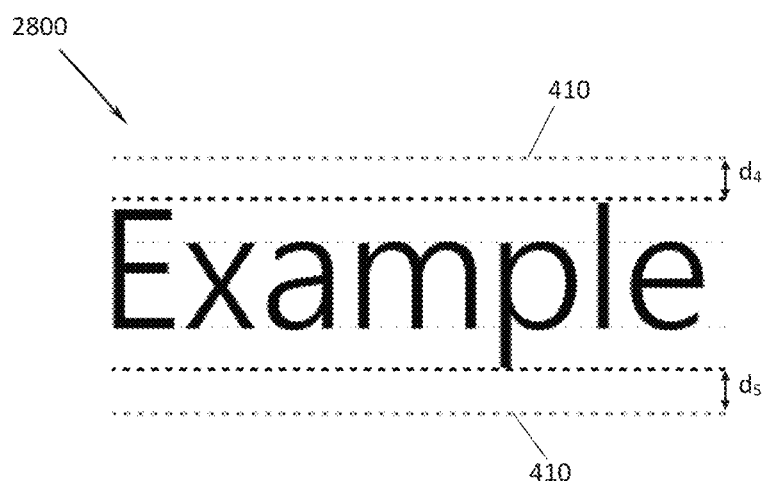
FIG. 28B shows spacing of a line pattern element of the alignment elements with respect to the parameters of the typeset ink of FIG. 28A.

In the present system and method however, the typeset text size is set so that it provides sensible display of the typeset ink while providing sufficient and sensible space for handwritten characters. Accordingly, sufficient space is provided above and below the upper and lower extents of the typeset text size to allow for sensible input of handwriting. This additional space defines the parameters of the line pattern background 410. FIG. 28B shows this additional spacing to form the horizontal lines of the line pattern 410 with the line 410 above the text 2800 being spaced a distance $d_4$ from the upper extent line 2802 and the line 410 below the text 2800 being spaced a distance $d_5$ from the lower extent line 2804. The values of $d_4$ and $d_5$ may be set based on typical line spacing used for paper, for example.

For paper, many line spacing standards are in use around the world with respect to the different styles of handwriting. For example, Table 5 summarizes some standards of A4 notebook paper for Latin-based script.

TABLE 5

| Region | Paper type | Spacing (mm) |
|---|---|---|
| United States | Wide (or Legal) | ~8.73 |
| | Medium (or College) | ~7.14 |
| | Narrow | ~6.35 |
| France | Seyès | ~8 |
| Europe (DE/UK) | Lineatur 1 | ~5 - 5 - 5 (3 lines) |
| | Lineatur 2 | ~4 - 4 - 4 (3 lines) |
| | Lineatur 3 | ~3.5 (block lines) |

While there is some variation in paper based horizontal line spacing, as seen from Table 4, these line spacing standards provide a guide as to what is deemed acceptable for handwriting. However, typographic rules on screen are different from print. For example, for paper space is an issue due to its inherent constraints unlike on screen (as described earlier) whereas scrolling on screen needs 'aired' or spaced text to help readability unlike paper where text can be tightly spaced if desired. Default typographic text is best read with a line height in-between 1.4 and 1.6 times its font size. Accordingly, the LPU for the handwritten input of the present system and method is set at about 1.4 to about 1.6 times the default typeset text size, e.g., about 1.4×1 rem to about 1.6×1 rem. Setting the LPU line height factor to be a regular number that can be multiplied easily avoids non-integer sizing, which would lead to blurred rendering.

Table 6 shows the values for the 'Products' of Table 3 when the LPU is set at 1.5 times the font size, e.g., a line height factor of 1.5 is used. In the example of FIG. 28B, this provides a 8 dp line padding with a 4 dp upper padding ($d_4$) and a 4 dp lower padding ($d_5$) since 1.5×16 dp (default typeset text size; 1 rem)=24 dp. This default line height defines the vertical rhythm unit and the grid pattern onto which all objects are aligned, using only multiples of 1.5 rem heights.

TABLE 6

| Product | Screen resolution (dpi) | soft-scaling (%) | LPU (mm) |
|---|---|---|---|
| iPad Pro | 264 | 200 | ~9.23 |
| Surface Pro 3 | 215 | 150 | ~8.50 |
| Surface Pro 4 | 267 | 200 | ~9.13 |

As can be can seen from Table 5, this provides a line spacing which is in the range of the paper standards of Table 4. Accordingly, in the present system and method the resulting physical height of the LPU depends on the device screen resolution and soft scaling factor since typeset-related metrics are used for the line pattern. That is, the handwriting is linked and integrated with the typeset font size by using the typeset font size as a unit for the handwriting line pattern, rather than sizing with 'real world' fixed metrics, such as millimeters, or adapting the sizing based on the handwriting itself, as is conventionally done.

In the present system and method further consideration is also given to the guidance of users in respecting the afore-described layout features, such as paragraphing and object block positioning relative to the alignment grid, when setting the value of the LPU. In particular, during handwriting input the line pattern background may be masked in certain areas in order to guide users where they can sensibly handwrite in the input area 408. For example, for any typeset text blocks on the page 400 the line pattern 410 may be masked within the bounding boxes of those blocks so that any further handwriting input is made while respecting the layout requirements, such as leaving a blank line between paragraphs.

Figure 29A:
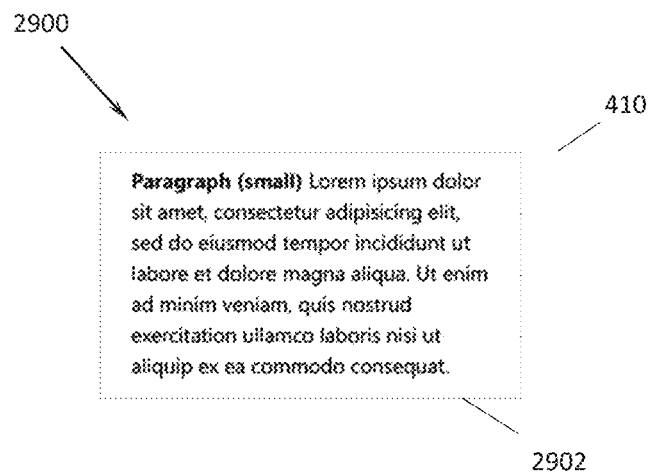
FIG. 29A shows an example typeset ink block rendered with a bounding box relative to the line pattern element.
Figure 29B:
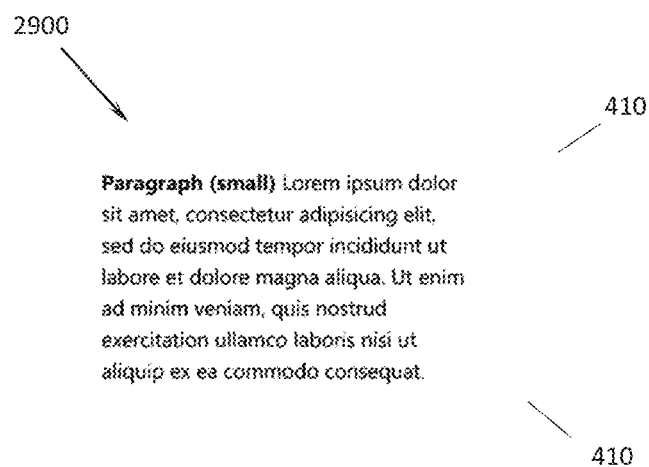
FIG. 29B shows an example masked rendering of the line pattern element within the bounding box.

FIG. 29A shows a typeset text block 2900 with a bounding box 2902 with the line pattern 410 completely unmasked. As can be seen, users may consider that handwriting can be input anywhere about the paragraph corresponding to the text block 2900, which may cause that input to be undesirably added to the paragraph of the text block 2900 if written too close. FIG. 29B shows the line pattern 410 as masked within the bounding box 2902. This provides users with some understanding of the treatment of the typeset paragraph by the application 112. The term "mask" is understood to mean that rendered display of the line pattern background is not made by the present system and method in the display locations of the scroll page 400 said to be "masked", such that the as-displayed line pattern background acts as a guide element for further handwriting input.

This offers users with a real-time preview of the output content and prevents the line pattern from interfering with readability of that content. In providing such masking however, the extent of the masking needs to be considered. This is because, if the line pattern is masked only within the bounding box of text blocks, for example, while leaving unmasked lines surrounding the blocks, as shown in FIG. 29B, users may be confused as to whether they may or may not write on the visible lines. That is, in FIG. 29B the lines 410 immediately above and below the text block 2900 are not supposed to host any writing (since they are too close to the paragraph) yet they remain visible. To prevent this, lines outside of object block bounding boxes should also be masked to a certain extent. In this way, users know that they may write anywhere there is a line. In the present system and method the extent of this masking is made with respect to the parameters of the line pattern background, and therefore the default typeset text size, as follows.

Figure 30A:
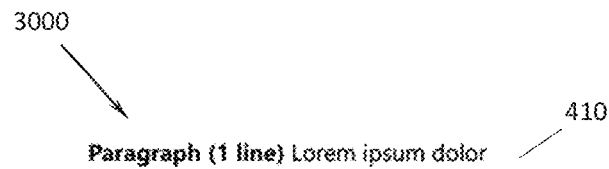
FIG. 30A shows an example alignment of an example typeset ink block with the line pattern element.

As described earlier, the spacing between object blocks is handled by aligning the bounding boxes of the blocks with the alignment pattern 1000, not the content itself. For example, aligning the typeset text content itself with the line pattern 410 results in the rendered display shown in FIG. 30A, in which a typeset text block 3000 defining a one line sentence of the default typeset text size is aligned on the line pattern 410. This rendering is not preferable. Aligning the bounding box with the alignment pattern is done by providing inner-padding which defines each bounding box.

Figure 30B:
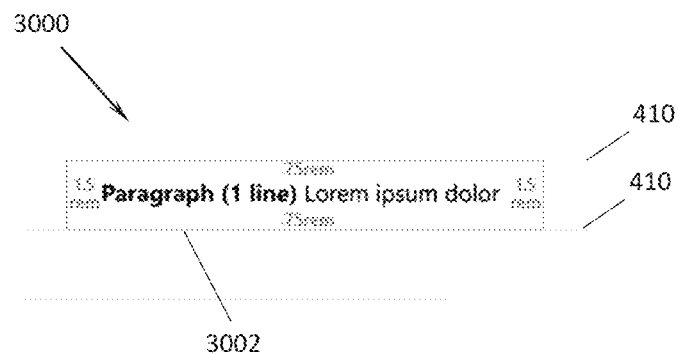
FIG. 30B shows another example alignment of the typeset ink block rendered with a bounding box.
Figure 30C:
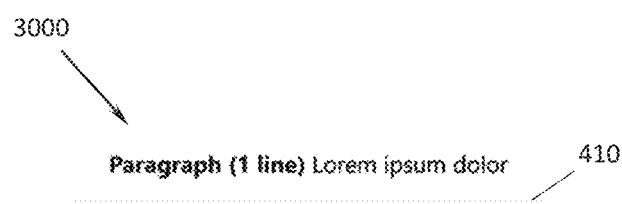
FIG. 30C shows the example alignment of FIG. 30B without rendering of the bounding box.

FIG. 30B shows the text block 3000 with a bounding box 3002 defined by a (vertical) inner-padding of about 0.75 rem (e.g., about 0.5 LPU) above and below the full extent of the text size (i.e., such as shown in FIG. 28A) and a (horizontal) inner-padding of about 1.5 rem (e.g., about 1.0 LPU) on the left and right sides of the extent of the text with respect to the columns 1004 (and the gutters 1006). In this way, the text block bounding boxes are aligned along their top left corner, e.g., at coordinates (0,0), with the alignment pattern resulting in the rendering shown in FIG. 30C. That is, the typeset text is not rendered within about 0.75 rem of the top and bottom of the bounding box and within about 1.5 rem of the left and right sides of the bounding box relative to the alignment pattern. In this way, vertical alignment and spacing issues, such as due to horizontal decays of side-by-side text blocks, are avoided. It is understood that padding amounts of the bounding box may be set to values greater or lesser than these values, depending on the desired typesetting format and actions, such as reflow.

Figure 31A:
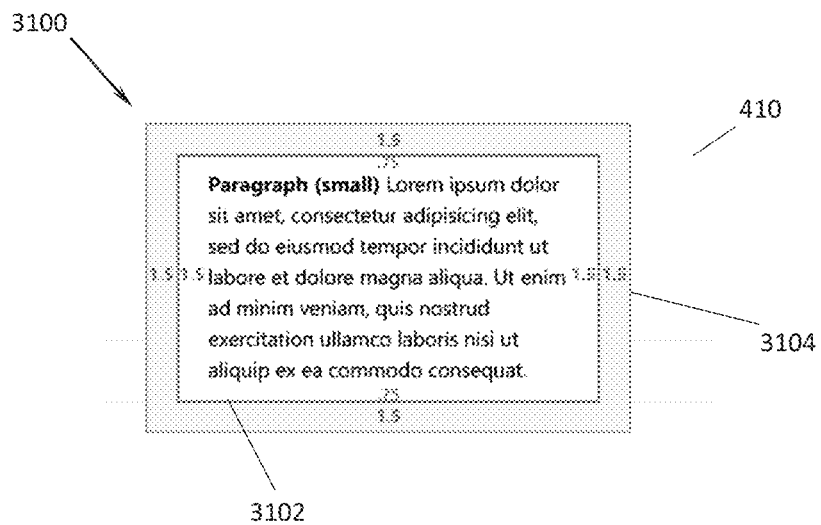
FIG. 31A shows an example masked rendering of the line pattern element relative to a bounding box of an example typeset ink block.

As the line pattern is masked inside the text block bounding boxes, thereby integrating some spacing through the inner-padding, this inner-masking may be complemented by the provision of outer-masking. As described earlier, the LPU defines the ideal available height for handwriting input. Accordingly, any displayed line of typeset text should have at least one LPU of empty space above and below. Thus, the outer-masking can be based on the LPU in order to mask or obscure the lines 410 immediately above and below the block. For example, FIG. 31A shows a typeset text block 3100 defining a paragraph with a bounding box 3102 having inner-padding or inner-masking as described above, and an outer-masking area 3104 defining space from the bounding box 3102 of about 1.5 rem (e.g., about 1 LPU) around each side. This line pattern mask of the combined inner-masking area 3102 and the outer-masking area 3104 results in the rendered display of the block 3100 shown in FIG. 31B.

As the bounding boxes are aligned with the gutters 1006 of the alignment pattern 1000, the inner-masking is relative to the inter-gutter space of the columns 1004 whereas the outer-masking is relative to the width of the gutters 1006 themselves. Accordingly, the gutter width may be set at 1.5 rem (e.g., 1 LPU) thereby creating a regular outer-masking that fits with global visual balance and provides sufficient space about the typeset paragraphs. That is, horizontally adjacent (or overlapped) blocks are separated by a width of two gutters 1006 (e.g., 3 rem or 2 LPUs) in line with the specifications described earlier, and vertically adjacent (or overlapped) blocks are separated by an empty line 410 (e.g., 2 LPUs). Of course, it is understood that if the set value of the LPU is different then the value of the outer-masking is similarly different.

Figure 31B:
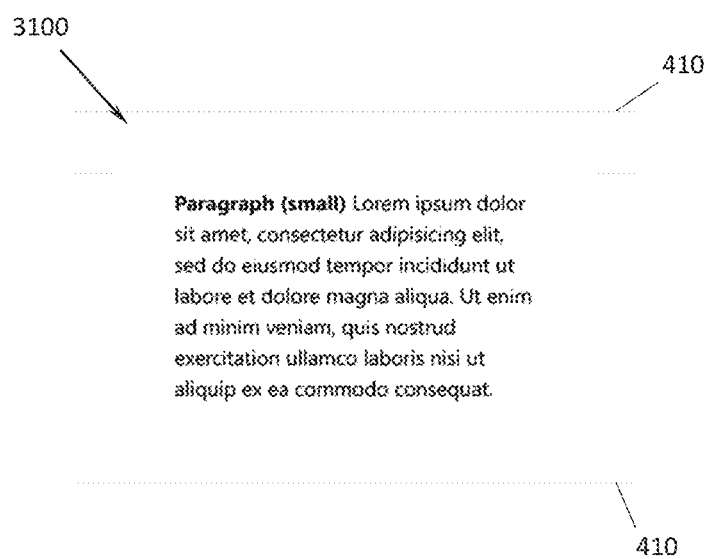
FIG. 31B shows the masked line pattern element of FIG. 31A without the bounding box of the typeset ink block.

While the object blocks may be sized according to the LPU, text block height is defined by the text content within the block which might not be a round multiple of the LPU. That is, the LPU based outer-masking works well for paragraphs having an odd number of lines of text. For example, as shown in FIG. 31B in which the paragraph 3100 has seven lines of text, the last line of text is more than one LPU above the next displayed line 410. However, paragraphs with an even number of lines of text define blocks have a non-round LPU multiple height and therefore end just between two lines of the line pattern. In this case, when the 1.5 rem outer-masking is added the text block aligns with the next available line 410 which is too close to the current paragraph for writing.

Figure 32A:
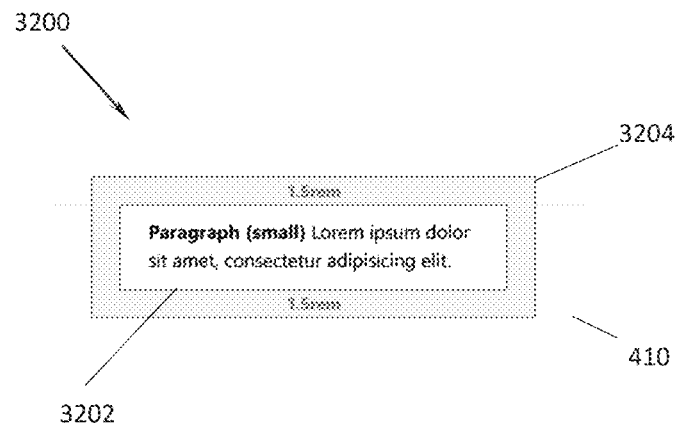
FIG. 32A shows an example masked rendering of the line pattern element relative to a bounding box of an example typeset ink block.
Figure 32B:
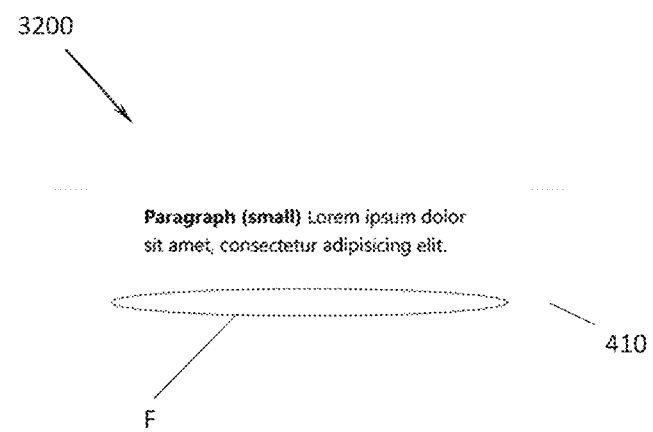
FIG. 32B shows the masked line pattern element of FIG. 32A without the bounding box of the typeset ink block.

For example, FIG. 32A shows a typeset text block 3200 defining a paragraph having two lines of text. The block 3200 has an inner-masking area 3202 and an outer-masking area 3204, both defined as described earlier. The effect of this line pattern mask is shown in FIG. 32B in which the line 410 immediately below the paragraph 3200 remains visible in the area indicated by circle F. As can be seen, the last line of text in the paragraph 3200 is less than one LPU from this line 410.

Figure 32C:
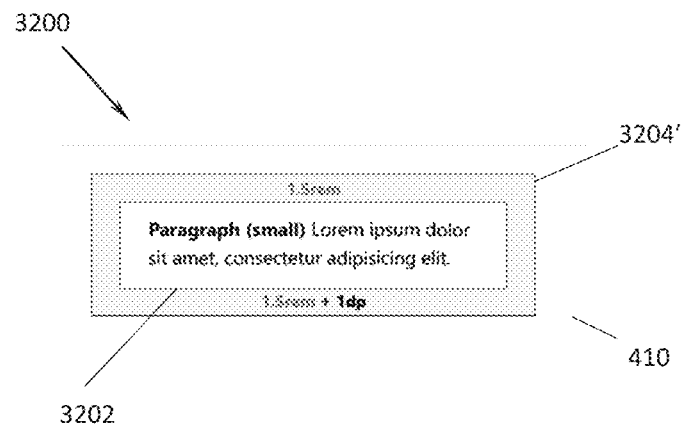
FIG. 32C shows another example masked rendering of the line pattern element relative to the bounding box of the typeset ink block.
Figure 32D:
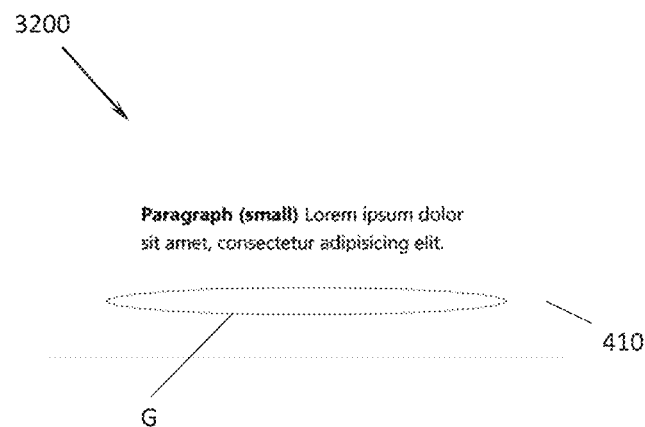
FIG. 32D shows the masked line pattern element of FIG. 32C without the bounding box of the typeset ink block.

In order to prevent this situation an extra padding amount is added to the outer-masking and therefore the mask itself. Adding an extra one dp to the outer-masking of one LPU is sufficient to ensure that the line immediately below even-numbered typeset text paragraphs (and therefore all typeset text blocks) is masked as well, making the next available line appear one LPU further down. This is shown in FIGS. 32C and 32D, in which an outer-masking area 3204' is defined about the block 3200 having a padding amount of 1.5 rem+1 dp at the lower side of the block 3200, thereby resulting in the masking of the line 410 immediately below the block 3200 in the area indicated by circle G. It is understood that a greater value for the extra outer-padding is possible.

The above-described masking may apply to any text block whether it contains digital or typeset ink, or a combination thereof. However, in order to optimize guidance for handwriting input, the masking for handwritten text blocks may be managed differently. This is because, unlike typeset text blocks in which it may be desired to discourage handwriting close to the typeset paragraphs, for handwritten or digital ink text blocks users are to be allowed to continue input of content for the handwritten paragraphs. Accordingly, the line pattern 410 within the digital ink blocks and immediately above and below the digital ink text blocks should be visible, that is unmasked. However, in order to respect block spacing in the horizontal extent, e.g., spacing of columnar blocks or paragraphs, outer-masking relative to the gutters 1006 of the alignment pattern 1000 is used in a manner similar to that for the typeset text blocks.

Figure 33A:
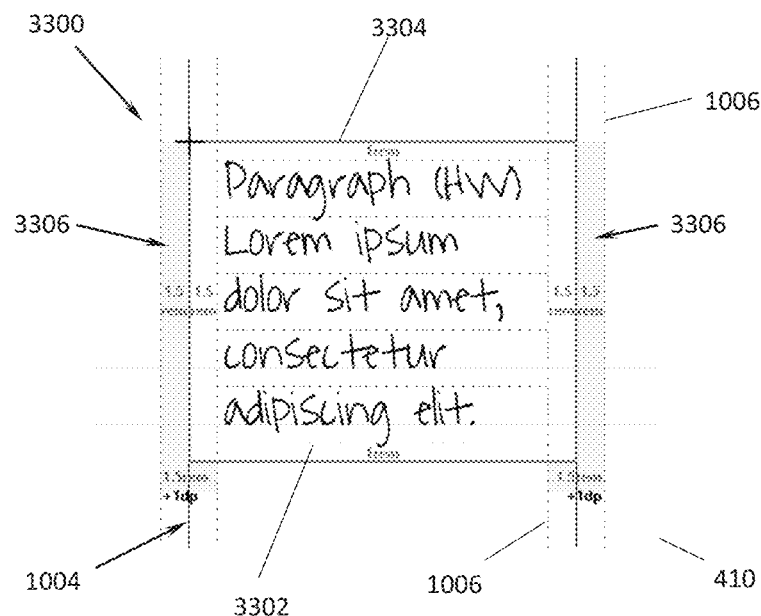
FIG. 33A shows an example masked rendering of the line pattern element relative to a bounding box of an example digital ink block rendered from handwritten input to the scroll page.

For example, FIG. 33A shows a digital ink block 3300, rendered from a handwritten paragraph input to the input area 408 of the scroll page 400. Like the typeset ink blocks, the digital ink block 3300 is defined with a bounding box 3302 by the present system and method to align with the alignment pattern 1000. In particular, the bounding box 3302 is aligned with the gutters 1006 of the column(s) 1004 in which the block 3300 is located, as illustrated. These adjacent gutters 1006 are defined as the horizontal portions of an outer-masking area 3304 of the block 3300. The vertical portions of the outer-masking area 3304 are defined in the illustrated example as one rem, however a value of 0.75 rem could be used like the typeset ink blocks, or a larger or smaller value could be used.

The smaller value of the outer-masking below and above the digital ink block 3300 means that the lines 410 immediately above and below the paragraph are not obscured thereby indicating to users that further handwriting input can be made on those lines. While this provides users with relative freedom of input, it may cause issues with respect to the paragraphing requirements described earlier. Accordingly, the outer-masking with the adjacent gutters 1006 may be extended beyond the inter-column outer-masking at least below the paragraph in order to indicate this paragraphing requirement. For example, as shown in FIG. 33A the inter-gutter outer-masking extends 1.5 rem+1 dp (e.g., 1 LPU+1 dp) below the block 3300, where the extra outer-masking amount of one dp is to ensure masking of the line 410 below the paragraph 3300 in a manner similar to that discussed above for the even-lined typeset ink paragraphs.

Figure 33B:
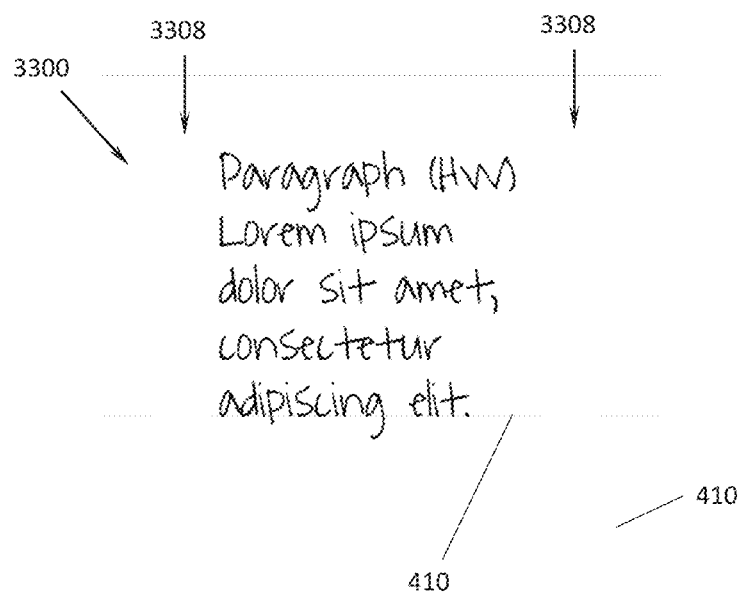
FIG. 33B shows the masked line pattern element of FIG. 33A without the bounding box of the digital ink block.

This spacing may be sufficient to provide guidance for users for further handwriting input in the vertical flow relative to the paragraph 3300, however there may still be a tendency for users to input further handwriting in the gutters 1006 of the adjacent column(s) 1004 to that (those) of the block 3300 since the lines 410 will still be displayed in that area. Accordingly, as shown further in FIG. 33A the horizontal portion of the outer-masking area 3304 of the digital ink block 3300 is extended into an extra outer-padding area 3306 to incorporate the adjacent gutter 1006 of the adjacent column 1004. Accordingly, the horizontal portion of the outer-masking has a value of 1.5 rem+1.5 rem=3 rem (or 2 LPUs). The horizontal portions 3304 and 3306 of the outer-masking forms a padded horizontal outer-masking area 3308 providing the gutter masking shown in FIG. 33B. As can be seen, the line pattern 410 is visible behind, and immediately above and below the handwriting content of the paragraph 3300 but not within the adjacent gutters providing a clear indication for users of where further handwriting input can be accepted without that input being added to the existing paragraph.

By defining the line pattern masking areas or zones about the (digital or typeset ink) blocks relative to the alignment pattern it is possible to sensibly render display of adjacent content blocks. That is, because the horizontal outer-masking is defined by and within the gutters 1006 of the alignment pattern 1000, the outer-masking of horizontally adjacent blocks can be shared (i.e., overlapped) such that extra unnecessary space is not provided between them, e.g., a digital ink block is not separated from a horizontally adjacent digital ink block by 6 rem or a horizontally adjacent typeset ink block by 4.5 rem, but by 3 rem in either case. Further, because the vertical outer-masking is defined by the line pattern 410 of the alignment pattern 1000, the outer-masking of vertically adjacent blocks can also be shared (i.e., overlapped) such that extra unnecessary space is not provided between them, e.g., a typeset ink block is not separated from a vertically adjacent typeset ink or digital ink block by 3 rem+2 dp, but by 3 rem in either case.

With respect to the example of FIG. 33, upon input of further handwriting on the line 410 immediately below the block 3300 the bounding box 3302 by the present system and method is extended to incorporate that further input content such that the outer-masking area 3304 includes the inner-gutter masking of the next immediate line 410 in the vertical flow.

The afore-described masking or selective non-display of the line pattern background is used to guide preferable input of handwriting to aid the recognition performed by the HWR system 114 and the responsive handling of content layout by the application 112 more generally. Handwriting line pattern masking is also used by the present system and method to aid detection and recognition of content layout structures themselves. In one example of the present system and method line pattern masking is used to aid input and detection of handwritten lists, in particular bulleted and numbered lists. This example is now described with respect to FIGS. 34 to 40.

In digital typesetting, textual lists are typically structured in hierarchical fashion. That is, list items and their dependent list items in the hierarchy are separated on contiguous lines usually with indentation from the initial margin (being the left margin for left-to-right written languages for example) and/or symbols being used to indicate the level of each item within the hierarchy.

Figure 34:
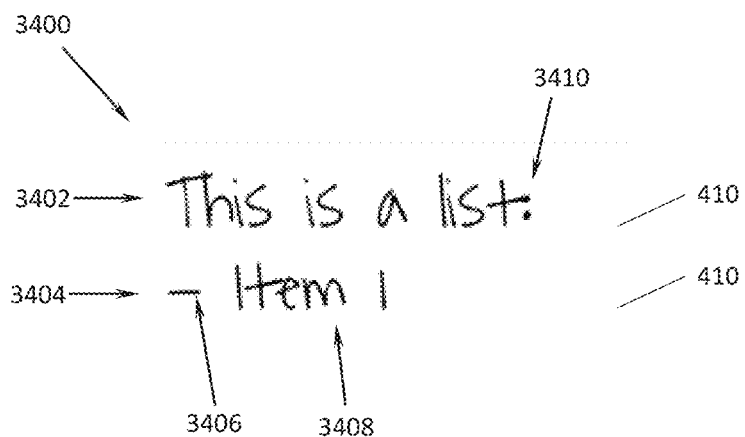
FIG. 34 shows an example digital ink list rendered from handwritten input to the scroll page.

FIG. 34 shows an example of a digital ink list 3400 rendered from handwritten input to the input area 408 of the scroll page 400. The list 3400 has a header or base (first level) list item 3402 of text on a first line 410 and a dependent (second level) list item 3404 on the subsequent line 410. The second level item 3404 includes a symbol 3406, being a dash, followed by text 3408, being the phrase "Item 1". This handwritten list has the general appearance of a digital typeset or typed list, where the first item 3402 is substantially aligned with the left margin (or at least the column boundary adjacent the left side of the block in which the list 3400 is located) and the second item 3404 is positioned on the subsequent line 410 with the text 3408 thereof indented to the right relative to the first item 3402 and designated with the symbol 3406 which is substantially aligned with the first item 3402.

As the user has input the content 3400 using a list structure, this structure should be respected when the handwritten content is converted to typeset or digital objects. Accordingly, the application 112 and/or the HWR system 114 is configured to detect the list structure. This can be done at least in part, for example, by analyzing the relative geometry of the recognized content of the input 3400. For example, in the simplest form, the application 112, or the HWR system 114, is configured to detect the relative locations of the recognized content of the first and second items 3402 and 3404 and implements a language model which determines that the second item 3404 is a list item since the recognized dash 3406 is at the beginning of a line 410 relative to the left margin or adjacent column boundary and is followed by the recognized text 3408.

Similarly, the application 112, or the HWR system 114, may determine the list hierarchy of the first and second items 3402 and 3404 since the second list item 3404 is preceded on the immediate line 410 above by the left-aligned recognized text of the first item 3402 which does not include a symbol, such as a dash, and which is followed by the relatively detected indented text content 3408 of the second list item 3404. The detected indent of the text content 3408 with respect to the left margin or column boundary may also be considered without relation to adjacent items. Further, the first item 3402 includes a grammatical mark 3410, being a colon, at the end of the content thereof, which could be further used by the present system and method to determine the list hierarchy.

The determination of list items and list hierarchies may be achieved by using a probabilistic approach similar to that used by the HWR system 114 for recognition of the handwriting itself, as described earlier. That is, input elements are assigned a probability score based on the recognized content of the elements and this score is modified based on the detected relative locations of the elements to indicate the likelihood of the elements and associated recognized content being part of a list. For example, the probability scores for list inclusion of recognized elements or symbols typically used in lists such as bullet points, stars, dashes, hyphens, arrows, tildas, hashes, or characters such as numbers and letters with or without accompanying marks (e.g., parentheses, circles, etc.) which are detected as being at the beginning of a line of text, recognized elements or symbols typically used in lists such as colons, semi-colons, commas which are detected as being at the end of a line of text, and recognized text that is indented relative to text on adjacent lines are assigned so as to enhance the likelihood of list item inclusion and list hierarchy detection. It is understood however that other methods are also possible. Further, the language model could be for example that of the HWR system 114 itself or a dedicated language model.

Using such a combination of recognition and geometry is effective for detecting lists for well-ordered input of handwritten list items. However, non-ideal input such as misalignment, badly written or recognized list symbols, etc., lead to false-positive detection and false-negative detection of lists and their hierarchies. Accordingly, the present system and method uses line pattern masking as described earlier to optimize list detection. As can be seen in FIG. 34, the dash 3406 of the second list item 3404 has the line 410 rendered thereunder. Accordingly, the input of any further list items on the lines 410 below the second list item 3404 requires users to neatly or properly write and align the symbol and text content of those items with respect to the earlier items of the list in order to ensure proper detection of the list upon typesetting; the success or failure of which is not known until the typeset conversion is performed. Guidance on this proper alignment can be provided through masking of the line pattern in certain locations relative to the recognized and detected list content.

Figure 35:
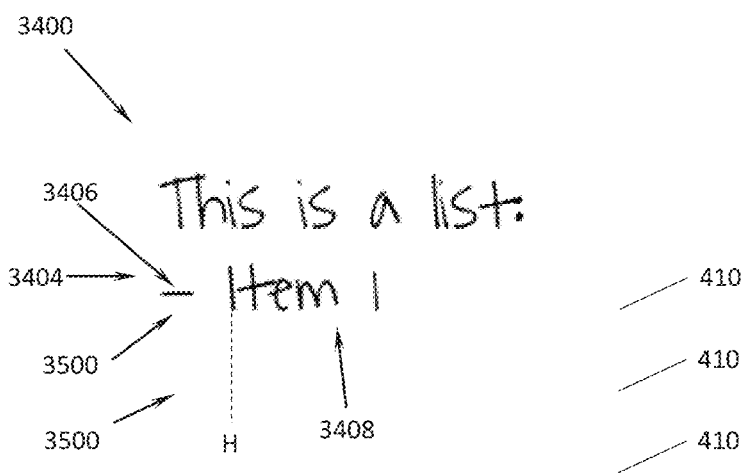
FIG. 35 shows an example masked rendering of the line pattern element relative the digital ink list of FIG. 34.

For example, FIG. 35 shows the digital ink list 3400 of FIG. 34, however unlike FIG. 34, the portion of the line 410 underneath the recognized dash 3406 of the detected second list item 3404 is masked as a partial-masking area 3500 while the line 410 underneath the recognized text portion 3408 of the detected second list item 3404 remains displayed. That is, the line 410 is not displayed from the left-most extent (e.g., the left margin or column boundary) to the beginning of the recognized text content of the detected list item. Further, the partial-masking area 3500 is repeated on the subsequent line 410 below the partially-masked line 410 of the second list item 3404 so that the termination of the partial-masking of both lines 410 is aligned as indicated by dashed line H. Furthermore, the next subsequent line 410 is not masked. In this way, users are provided with recognition feedback during handwriting input, as the partial-line masking indicates that potential list input has been detected by the present system and method, and with guidance of the proper placement of further list items and their elements for proper recognition (discussed in detail below).

The masked areas 3500 may be provided as separate areas or zones each spanning in the vertical direction at least one LPU (e.g., so that each line 410 is masked) or provided as a single (combined) area or zone spanning in the vertical direction at least two LPUs (e.g., so that both lines 410 are masked). The horizontal extent of the masked area(s) or zone 3500 is provided to align with the beginning of the text content after a recognized list symbol and/or a detected indent relative to preceding detected list items and/or the left margin or column boundary. Alternatively, or additionally, the masked zone 3500 is displayed to span in the horizontal direction by a predetermined (and settable, e.g., via UI menus or the like) value, for example based on the LPU such as two to four LPUs, as soon as a list symbol is detected in order to guide users in the placement of the subsequent list text. This set horizontal span may be adjusted upon input of subsequent list item text so as to align therewith.

Figure 36:
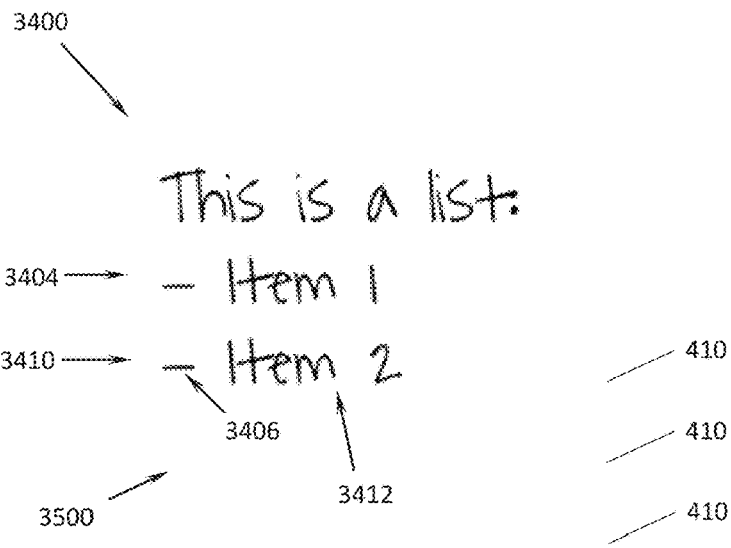
FIG. 36 shows another example masked rendering of the line pattern element relative to the digital ink list with example additional input.

The partial-masking of the line pattern background effectively provides different zones for further list element input if so desired by the user. That is, the masked portion 3500 of the partially-masked lines 410 provides a list symbol input zone and the unmasked portion of the partially-masked lines 410 provides a list content input zone. For example, FIG. 36 shows the list 3400 as displayed in FIG. 35 with additional input 3410 on the line 410 immediately following the second list item 3404. The input 3410 includes the symbol 3406 in the masked zone 3500 of the respective line 410 and text 3412, being the phrase "Item 2", in the unmasked zone of the respective line 410. The input 3410 is therefore detected by the present system and method as a dependent (second level) list item at least due to detection of the recognized dash 3406 in the list symbol zone and/or the recognized text 3412 in the content input zone. As a result, the partially-masked area 3500 is extended to the subsequent line 410 beneath the line 410 containing the new list item 3410.

The application 112 may be configured to insist user adherence to certain list creation behaviors. For example, new dependent list items may only be detected/recognized when an appropriate symbol (such as the dash of the illustrated examples) is input relative to new content on a new (next) line. Alternatively, or additionally, continued input of content in the content input zone with or without input of a leading symbol(s) in the symbol input zone may be allowed for detection of new dependent list items. In this latter case, the present system and method may display a digital ink rendered list symbol in the symbol input zone preceding the content input zone in which the new recognized input has been detected. For example, for the example list 3400 shown in FIG. 35 the dash 3406 of the list item 3410 may be rendered as a copy of the dash 3406 of the list item 3404 or in a digital ink font of the user or the operating system 110 of the digital device 100, for example. Such automatically displayed list symbols may be rendered with reduced emphasis, such as with transparency or greyed out, to allow users to indicate whether the symbol should be included or not, such as through gesture interaction with the automatically displayed symbol, in manner similar to that described earlier (e.g., a single tap). In this way, additional recognition feedback is provided to users.

Alternatively, or additionally, if an initial dependent (second level) list item is detected based on relative indentation of content alone, that is a leading symbol is not present, the present system and method may be configured to display the masked and unmasked zones with or without automatic display of (generic) list symbols. As such, the present system and method detects lists and new hierarchical list items from handwritten input of elements on contiguous lines that are similarly arranged and/or have similarly characteristics. On the other hand, the input or non-input of list symbols by users may be characteristic of the different hierarchical meanings for additional list items, and therefore the mixture of content input on contiguous lines with and without leading symbols may be respected by the present system and method.

Figure 37:
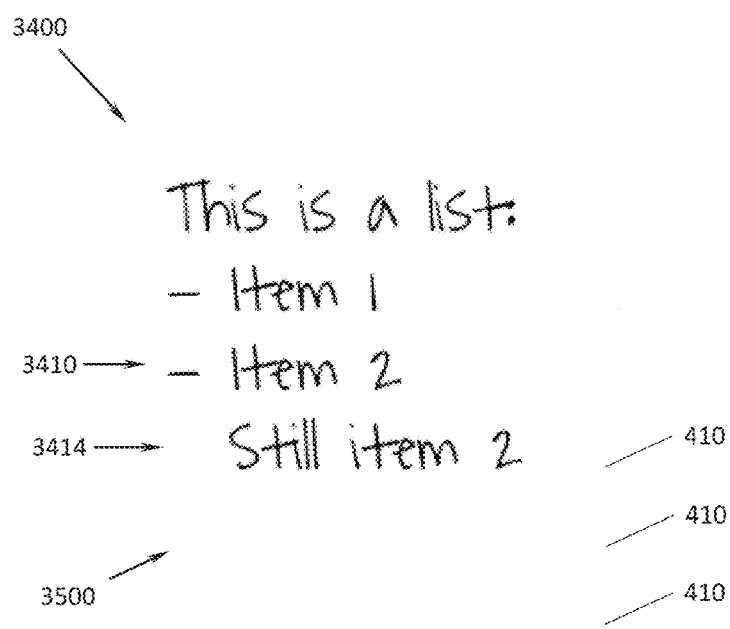
FIG. 37 shows another example masked rendering of the line pattern element relative to the digital ink list with further example additional input.

For example, FIG. 37 shows the list 3400 as displayed in FIG. 36 with additional input 3414 on the line 410 immediately following the list item 3410. The input 3414 contains text, being the phrase "Still item 2", in the unmasked zone of the respective line 410 only. In this case, the present system and method considers the text 3414 as being an extension of the list item 3410, rather than as a new, individual list item. Accordingly, if automatic list symbol rendering is otherwise performed, such a list symbol is not added to the text 3414. As the text 3414 is detected as part of the second level list item 3410, the partially-masked area 3500 is extended to the subsequent line 410 beneath the line 410 containing the text 3414, as shown in FIG. 37. In the example of FIG. 37 the contiguous input is made as a next entry on the next line and is aligned with the preceding input based on guidance provided by the present system's and method's display of line pattern background in response to the recognized and detected input. Such guidance for alignment is also performed for contiguous input that is made as a continuation of the preceding line's content (e.g., in a sentence bridging contiguous lines 410), thereby providing digital ink text 'wrapping' of list content across contiguous lines.

Figure 38:
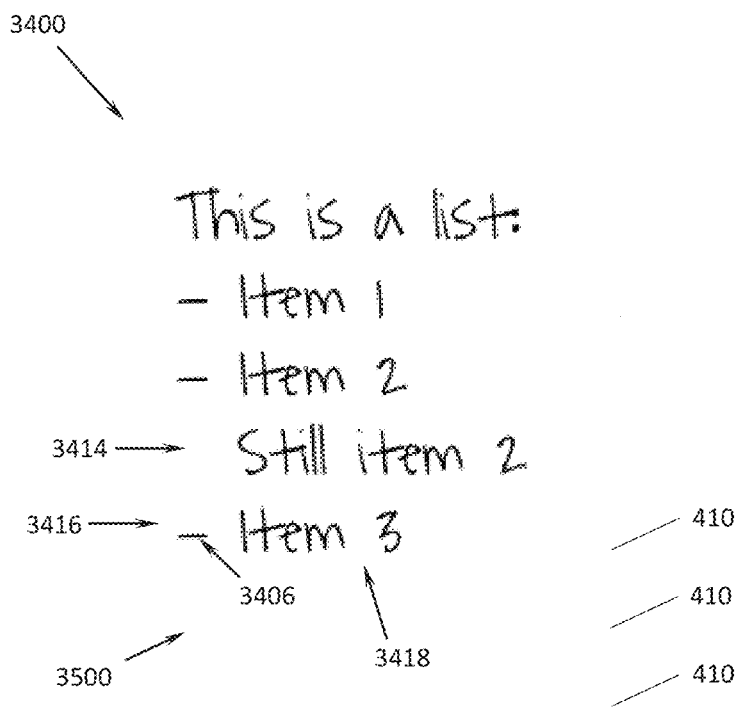
FIG. 38 shows another example masked rendering of the line pattern element relative to the digital ink list with further example additional input.

Continuing on with the above example, FIG. 38 shows the list 3400 with additional input 3416 on the line 410 immediately following the text 3414. The input 3416 includes the symbol 3406 in the masked zone 3500 of the respective line 410 and text 3418, being the phrase "Item 3", in the unmasked zone of the respective line 410. The input 3416 is therefore detected by the present system and method as a dependent (second level) list item at least due to detection of the recognized dash 3406 in the list symbol zone and/or the recognized text 3418 in the content input zone. As a result, the partially-masked area 3500 is extended to the subsequent line 410 beneath the line 410 containing the new list item 3416. Accordingly, the detected list structure and hierarchy is preserved by the present system and method despite the mixed input of the user and guidance for proper list input is clearly maintained.

As described above, the display of the list symbol or indent zone and the list content zone through partial-masking of the line pattern background provides visual guidance for user input of list elements. However, this may also provide guidance for, and assist the detection of, the completion of a list. That is, since in the illustrated examples the line 410 following the partially-masked line 410 that is contiguous with the last line 410 containing list item input is not masked, users are guided to make new non-list input by handwriting on that unmasked line 410. In this way, the present system and method detects this new input as a new paragraph as the empty line 410 requirement between paragraphs is observed. In an alternative example however, lists may be handled by the present system and method as a class of text block which is different to a paragraph or which may be an integral part of a paragraph. That is, continued input on the line directly beneath the last list item may be handled as the beginning of a new paragraph or a new list, or as part of the same paragraph which contains the list.

Figure 39:
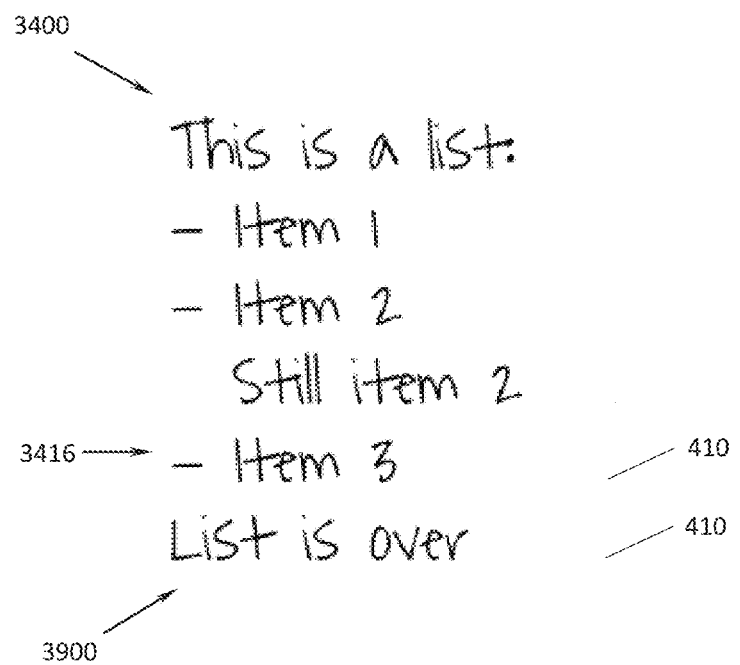
FIG. 39 shows an example digital ink block rendered from handwritten input to the scroll page below the digital ink list of FIG. 38.

In any of these cases, the input of handwriting on the line contiguous with the last line of list item input is detected as non-list content or list content of a new list. This is achieved by handling the input of recognized text within the list symbol or indent zone as such non-list or new list content. For example, FIG. 39 shows the list 3400 as displayed in FIG. 38 with additional input 3900 on the line 410 immediately following the list item 3416. The input 3900 contains text, being the phrase "List is over", in the masked zone 3500 of the respective line 410 (as it is shown in FIG. 38). In this case, the present system and method considers that since the recognized text 3900 as input in the masked zone 3500 is not recognized as a list symbol, then it is text of a new paragraph 3900. As the text 3900 is detected as not being part of the list 3400, the partially-masked area 3500 on the respective line 410 is omitted (that is, the line 410 is fully rendered) so as to be displayed underneath the whole of the text 3900, as shown in FIG. 39.

Figure 40:
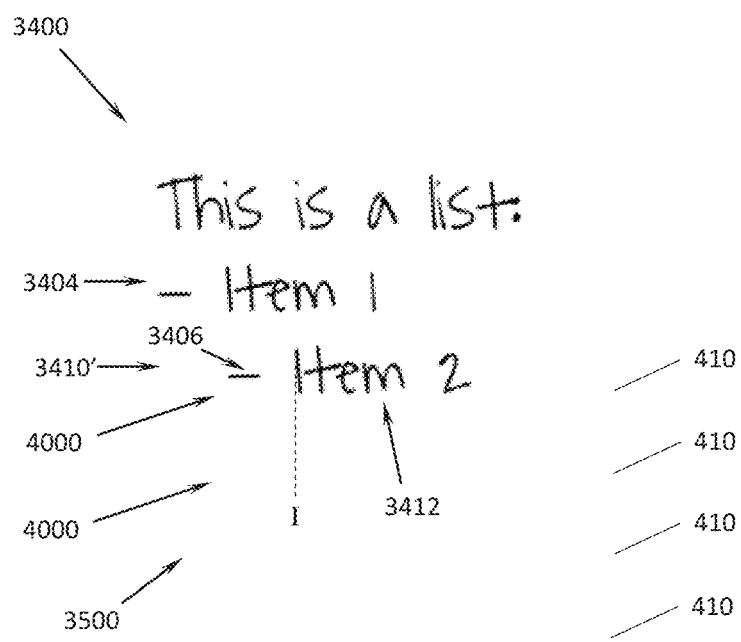
FIG. 40 shows another example masked rendering of the line pattern element relative to the digital ink list of FIG. 35 with example additional input.

In this example, the detection of the input of content other than an expected list symbol in the list symbol or indent zone is handled by the present system and method as non-list content (unless subsequent input results in its detection as a first level list item). Similarly, the detection of input of content other than expected text at (at least) the beginning of the content input zone may be handled by the present system and method as new hierarchical list input. For example. FIG. 40 shows the list 3400 as displayed in FIG. 35 with additional input 3410' on the line 410 immediately following the second list item 3404. The input 3410' includes the symbol 3406 and the text 3412 of the input 3410 of FIG. 36, but unlike FIG. 36 both the symbol 3406 and text 3412 are input in the unmasked or content input zone of the respective line 410 (as it is shown in FIG. 36). As before, due to the relative colocation of the recognized symbol 3406 and the recognized text 3412, the present system and method detects the input 3410' as a dependent list item. However, the relative location (e.g., indentation) of the input 3410' to the preceding input 3404 and/or the left margin or column boundary results in the detection of the list item 3410' as a dependent (third level) list item in the hierarchy of the detected list 3400.

Based on this determination, the portion of the line 410 underneath the recognized dash 3406 of the detected third list item 3410' is masked as a partial-masking area 4000 while the line 410 underneath the recognized text portion 3412 of the detected second list item 3404 remains displayed. That is, the line 410 is not displayed from the left-most extent (e.g., the left margin or column boundary) to the beginning of the recognized text content of the detected list item. Further, the partial-masking area 4000 is repeated on the subsequent line 410 below the partially-masked line 410 of the third list item 3410 so that the termination of the partial-masking of both lines 410 is aligned as indicated by dashed line I. The following line 410 is masked as the partial-masking area 3500 in order to preserve the hierarchical list structure of the second list item 3404.

The present system and method provide an application which allows users, such as students, academic and working professionals, to take handwritten notes, such as during lectures, meetings and brainstorming sessions, on their computing devices in a meaningful and shareable format akin to word processed documents. The present system and method further allow natural writing to be input since the writing is made on (ruled) lines and is guided by adaptive display of those lines with respect to detected layout of recognized written content, and paragraphs and other layout elements are respected responsive to orientation (i.e., portrait or landscape) and device display capacity.

Further interaction with the handwritten or typeset text, or non-text content, created in a note, such as editing the content, manipulating the layout of the notes, or converting or adding the notes into a document, can be performed directly within the application itself without the need to import the note into a separate document processing application. As such, the original layout of the handwritten notes is maintained, as is the actual input handwriting itself, the digital ink. Accordingly, annotations, decorations, special layout, etc. is maintained for easy comprehension of the notes taken.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for digital note taking on computing devices, each computing device comprising a processor and at least one non-transitory computer readable medium for recognizing handwriting note taking input under control of the processor, the at least one non-transitory computer readable medium configured to:
cause display of, on a display interface of a computing device, a guide element for handwriting input;
cause display of, on the display interface, digital ink in a block layout based on a layout of blocks of the handwriting input and a property of a viewable area of the computing device display interface,
wherein the guide element is displayed based on the digital ink block content and layout and typeset ink block content and layout formed from the recognized handwriting input;
detect, under control of the processor, list content elements of the handwriting input based on the recognized handwriting input and relative locations of recognized content elements of the handwriting input;
detect, under control of the processor, a hierarchical structure of the detected list content elements based on the detected list content elements; and,
cause the display of the guide element to guide handwriting input of further list content elements in a list layout.

2. The system according to claim 1, wherein the guide element comprises a plurality of substantially parallel lines displayed on the display interface.

3. The system according to claim 2, wherein the displayed spacing between each of the plurality of substantially parallel lines is based on a display size of the typeset ink.

4. The system according to claim 1, configured to:
define, under control of the processor, the list layout in accordance with a layout of the detected list content elements.

5. The system according to claim 1, wherein the property of the viewable area is the size of the viewable area.

6. A method for digital note taking on computing devices, each computing device comprising a processor and at least one non-transitory computer readable medium for recognizing handwriting note taking input under control of the processor, the method comprising:
causing, with the at least one non-transitory computer readable medium, display of, on a display interface of a computing device, a guide element for handwriting input;
causing, with the at least one non-transitory computer readable medium, display of, on the display interface, digital ink in a block layout based on a layout of blocks of the handwriting input and a property of a viewable area of the computing device display interface, wherein the guide element is displayed based on the digital ink block content and layout and typeset ink block content and layout formed from the recognized handwriting input;

detecting, with the at least one non-transitory computer readable medium, list content elements of the handwriting input based on the recognized handwriting input and relative locations of recognized content elements of the handwriting input;

detecting, with the at least one non-transitory computer readable medium, a hierarchical structure of the detected list content elements based on the detected list content elements; and, causing the display of the guide element to guide handwriting input of further list content elements in a list layout.

7. The method according to claim 6, wherein the guide element comprises a plurality of substantially parallel lines displayed on the display interface.

8. The method according to claim 7, wherein the displayed spacing between each of the plurality of substantially parallel lines is based on a display size of the typeset ink.

9. The method according to claim 6, comprising:

defining, with the at least one non-transitory computer readable medium, the list layout in accordance with a layout of the detected list content elements.

10. The method according to claim 6, wherein the property of the viewable area is the size of the viewable area.

11. A non-transitory computer readable medium having a computer readable program code embodied therein, said computer readable program code adapted to be executed to implement a method for recognizing input of handwriting note taking to a computing device, the computing device comprising a processor and at least one system non-transitory computer readable medium for recognizing the input under control of the processor, the method comprising:

causing, with the at least one non-transitory computer readable medium, display of, on a display interface of a computing device, a guide element for handwriting input;

causing, with the at least one system non-transitory computer readable medium, display of, on the display interface, digital ink in a block layout based on a layout of blocks of the handwriting input and a property of a viewable area of the computing device display interface, wherein the guide element is displayed based on the digital ink block content and layout and typeset ink block content and layout formed from the recognized handwriting input;

detecting, with the at least one non-transitory computer readable medium, list content elements of the handwriting input based on the recognized handwriting input and relative locations of recognized content elements of the handwriting input;

defining, with the at least one non-transitory computer readable medium, the list layout in accordance with a layout of the detected list content elements; and, causing the display of the guide element to guide handwriting input of further list content elements in a list layout.

12. The non-transitory computer readable medium according to claim 11, wherein the guide element comprises a plurality of substantially parallel lines displayed on the display interface.

13. The non-transitory computer readable medium according to claim 12, wherein the displayed spacing between each of the plurality of substantially parallel lines is based on a display size of the typeset ink.

14. The non-transitory computer readable medium according to claim 11, wherein the method comprises:

detecting, with the at least one non-transitory computer readable medium, a hierarchical structure of the detected list content elements based on the detected list content elements.

* * * * *